(12) United States Patent
Craparo

(10) Patent No.: US 11,201,900 B1
(45) Date of Patent: Dec. 14, 2021

(54) METHODS AND SYSTEMS FOR MULTIMEDIA COMMUNICATION WHILE ACCESSING NETWORK RESOURCES

(71) Applicant: Hio Inc., Philadelphia, PA (US)

(72) Inventor: Jason Tyler Craparo, Lansdale, PA (US)

(73) Assignee: Hio Inc., Philadelphia, PA (US)

(*) Notice: Subject to any disclaimer, the term of this patent is extended or adjusted under 35 U.S.C. 154(b) by 0 days.

(21) Appl. No.: 17/178,934

(22) Filed: Feb. 18, 2021

Related U.S. Application Data

(60) Provisional application No. 63/125,894, filed on Dec. 15, 2020.

(51) Int. Cl.
*G06F 15/16* (2006.01)
*H04L 29/06* (2006.01)

(52) U.S. Cl.
CPC ...... *H04L 65/4038* (2013.01); *H04L 65/1016* (2013.01); *H04L 65/1069* (2013.01); *H04L 65/1089* (2013.01); *H04L 65/1093* (2013.01)

(58) Field of Classification Search
USPC .......................... 709/204, 201, 202, 203, 227
See application file for complete search history.

(56) References Cited

U.S. PATENT DOCUMENTS

| | | | | |
|---|---|---|---|---|
| 8,370,766 B2* | 2/2013 | Selig | ..................... | G06F 40/174 715/810 |
| 8,756,501 B1* | 6/2014 | Karam | ................ | G06F 3/04842 715/700 |
| 2008/0024593 A1 | 1/2008 | Tsirinsky et al. | | |
| 2009/0015659 A1 | 1/2009 | Choi | | |
| 2010/0066804 A1 | 3/2010 | Shoemake et al. | | |
| 2012/0317483 A1 | 12/2012 | Shapiro et al. | | |
| 2013/0169742 A1* | 7/2013 | Wu | ........................ | H04N 7/152 348/14.08 |
| 2013/0185368 A1* | 7/2013 | Nordstrom | .............. | H04W 4/21 709/206 |
| 2013/0212192 A1* | 8/2013 | Yerli | ...................... | G06Q 10/00 709/206 |
| 2014/0253665 A1 | 9/2014 | Nietfeld et al. | | |
| 2014/0313282 A1 | 10/2014 | Ma et al. | | |
| 2015/0195490 A1 | 7/2015 | Oyman | | |
| 2015/0319203 A1* | 11/2015 | Jeremias | ............ | G06Q 30/0641 715/753 |
| 2017/0099456 A1 | 4/2017 | Tang et al. | | |
| 2017/0116339 A1* | 4/2017 | Stein | ................... | G06F 16/9535 |
| 2017/0311368 A1* | 10/2017 | Kandur Raja | ........ | H04W 76/14 |
| 2018/0013980 A1 | 1/2018 | Oyman | | |
| 2021/0076003 A1 | 3/2021 | Jiang et al. | | |
| 2021/0110802 A1* | 4/2021 | Estes | .................... | G10H 1/0066 |

* cited by examiner

*Primary Examiner* — Lan Dai T Truong
(74) *Attorney, Agent, or Firm* — Knobbe, Martens, Olson & Bear LLP

(57) ABSTRACT

Methods and systems configured to enable communications among user concurrently accessing a website are described. A communication system detects that at least a first user and a second user are concurrently accessing a third party website via respective first user and second user devices. At least partly in response to detecting that the first user and the second user are concurrently accessing the third party website, corresponding indications are transmitted to the first user device and the second user device. The first user and the second user are enabled to communicate with each other via one or more communication channels and to securely share content with each other.

27 Claims, 75 Drawing Sheets

FIG. 30

Network / Connect

Chat / Discussions

Tables

Here Now
- list of people online now

Open threads/forums
- list of channels directed by the admin
- want to include 5 standard channels(new tech, open positions, etc tbd)
- number refers to number of total posts or comments(to illustrate the amount of activity)

Open Tables Now
- jump into a live video chat of 2,4,6, or 8 people
- currently on event software

Recent
- people who have visited the site in the last 24hrs but aren't currently on the site
- feature focused on community building

Direct messages
-compilation of all hio interactions
- could the dm rules be platform specific? (i.e. chamber of commerce only maintains the dms - future facing not

Upcoming Tables
- host moderated events
- standing tables at certain times of day ?
- do tables have themes for topics or discussions?

Connections
- list of people that user has already connected with

Announcements

FAQs & tutorials

Sales / News / Release / Updates

FAQ's

Groups

Co-browsing

SITE MAP
FIG. 4A

TABLES

NETWORK-CONNECTIONS

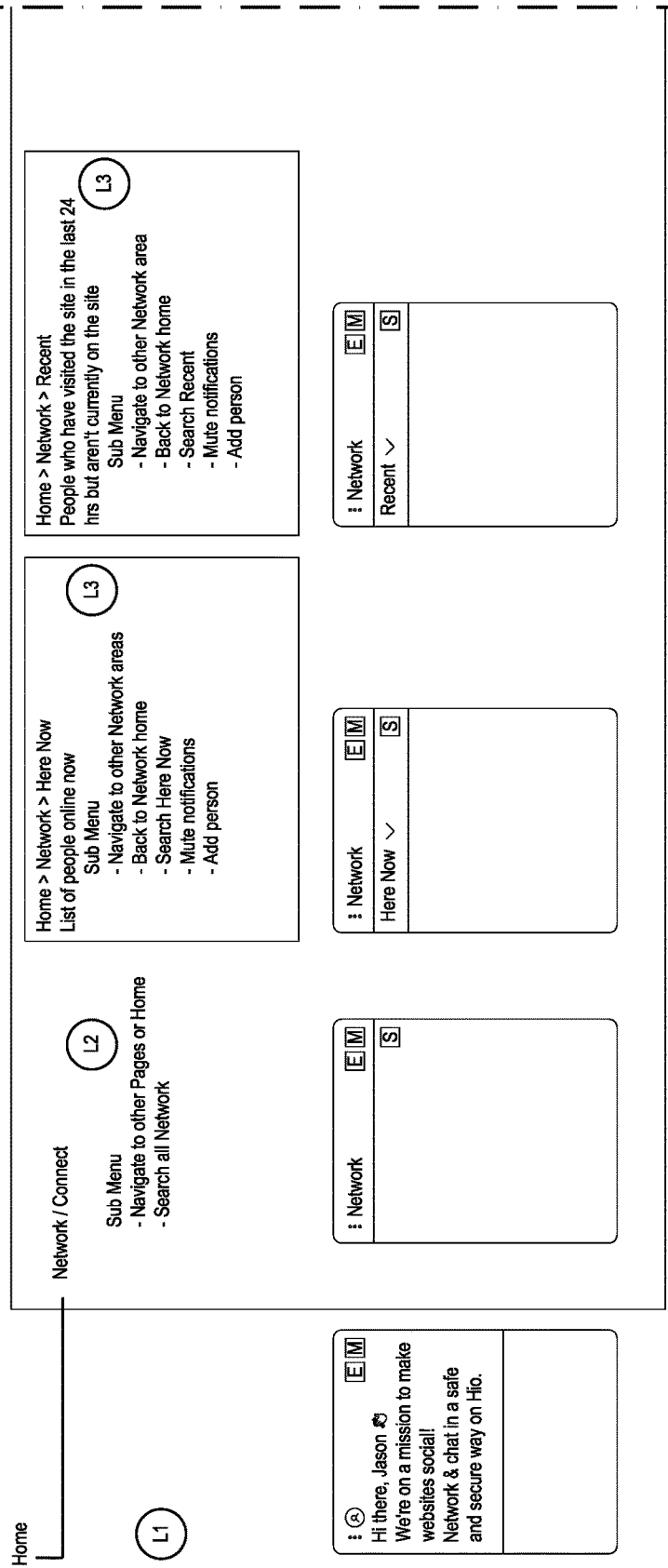
FIG. 4E₁

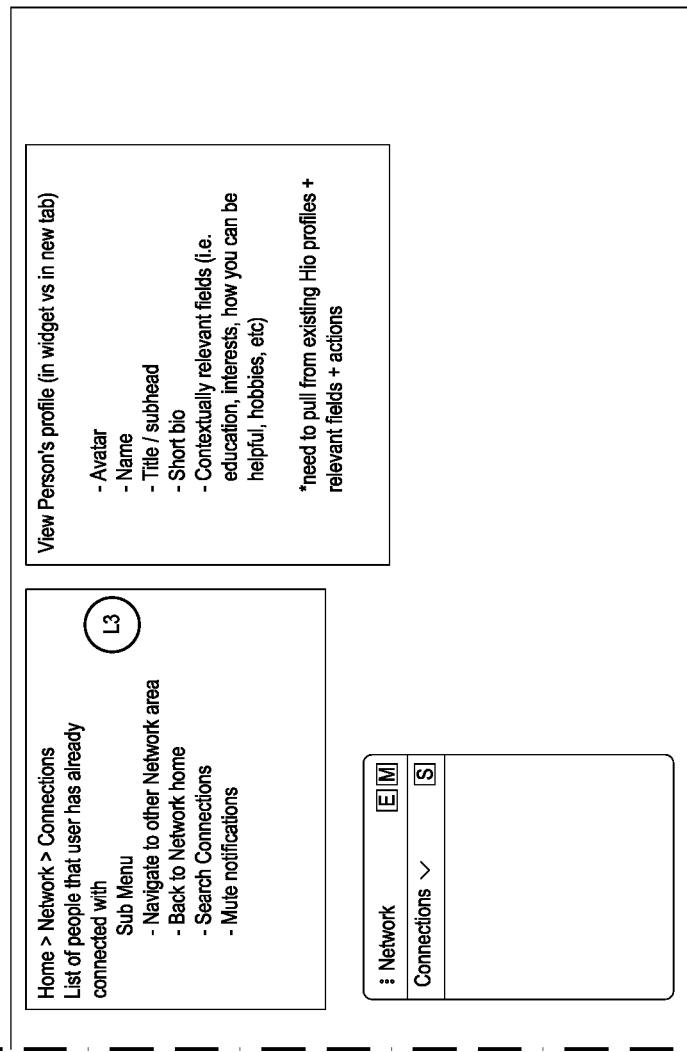

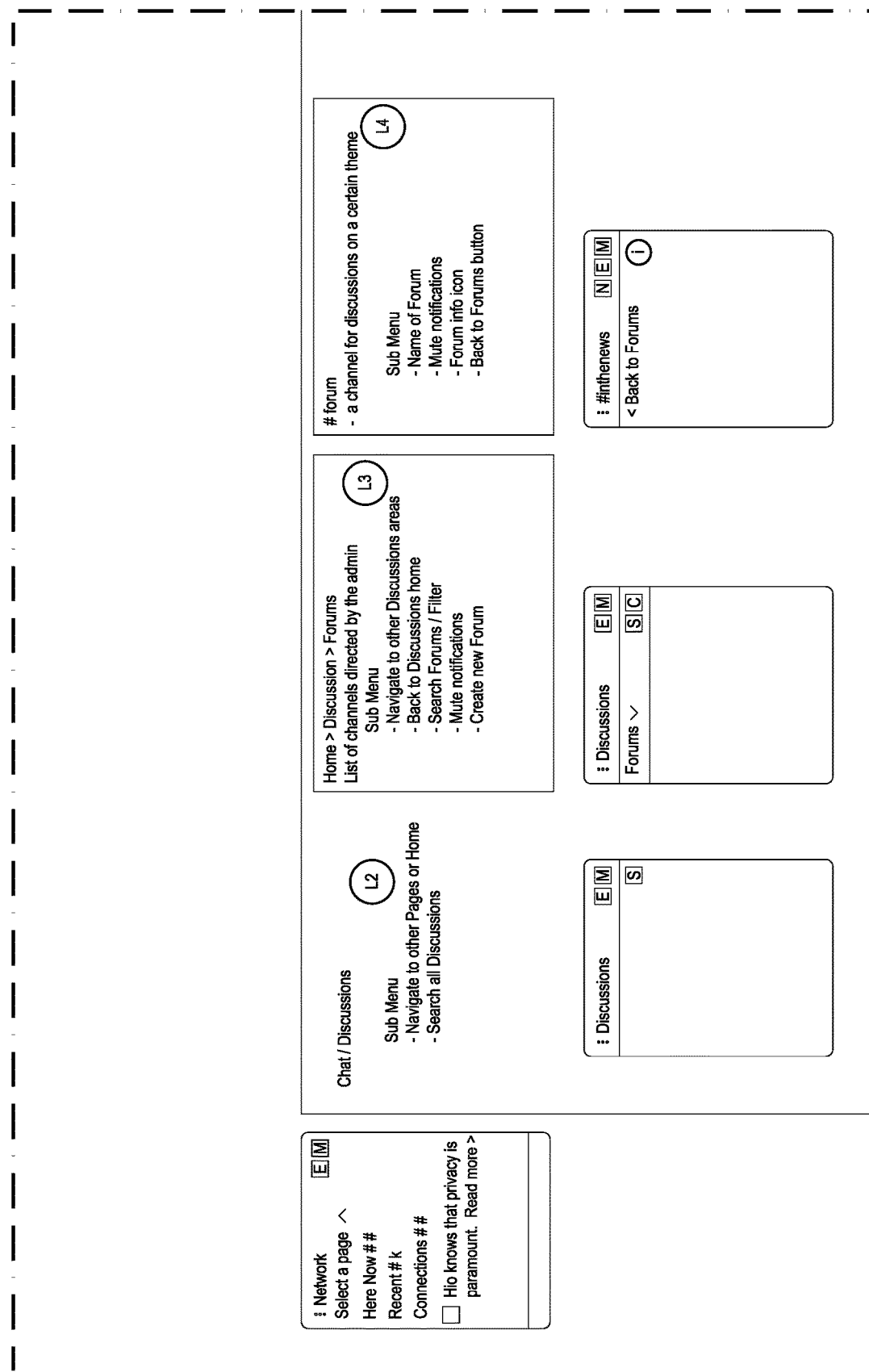

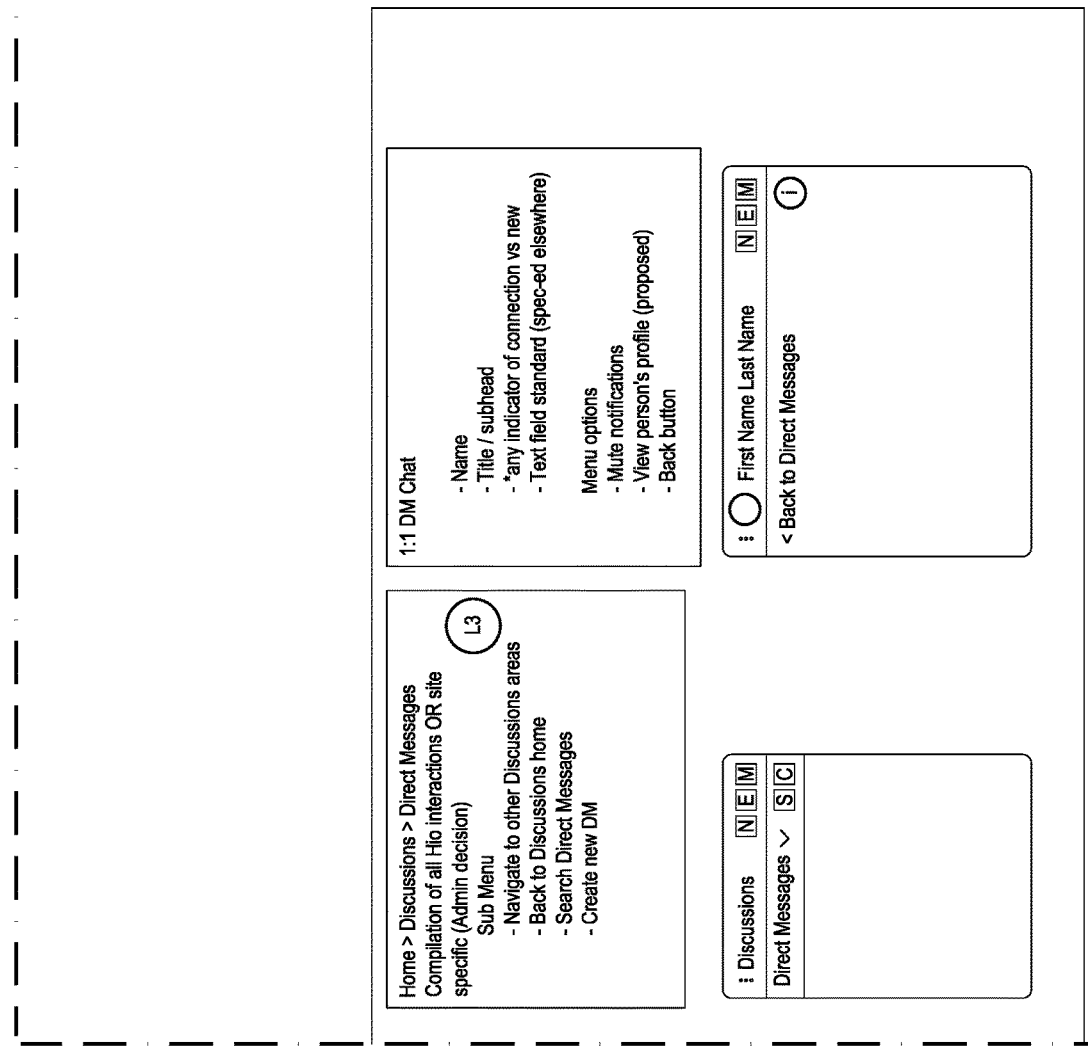
FIG. 4E₄

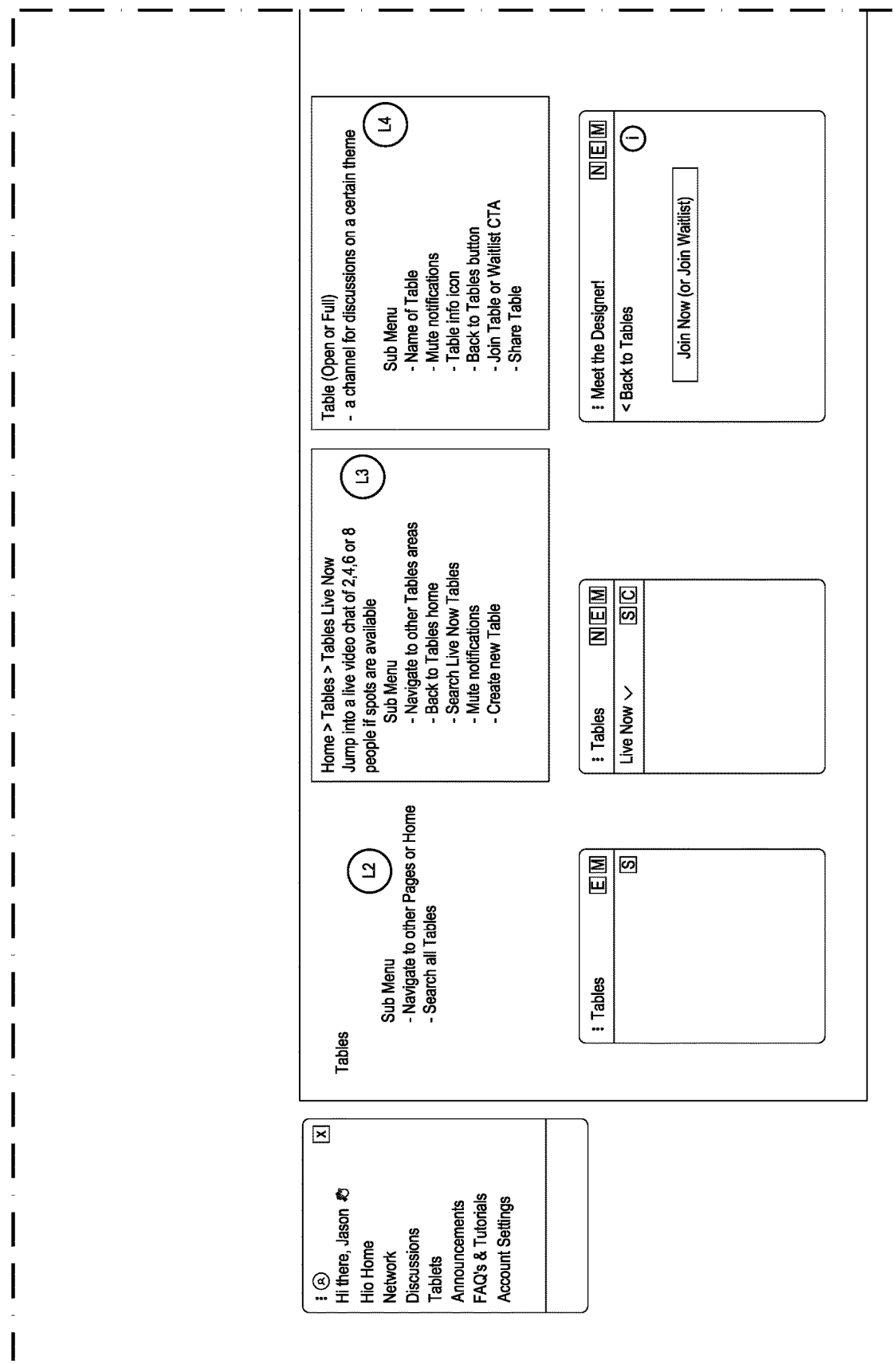
FIG. 4E5

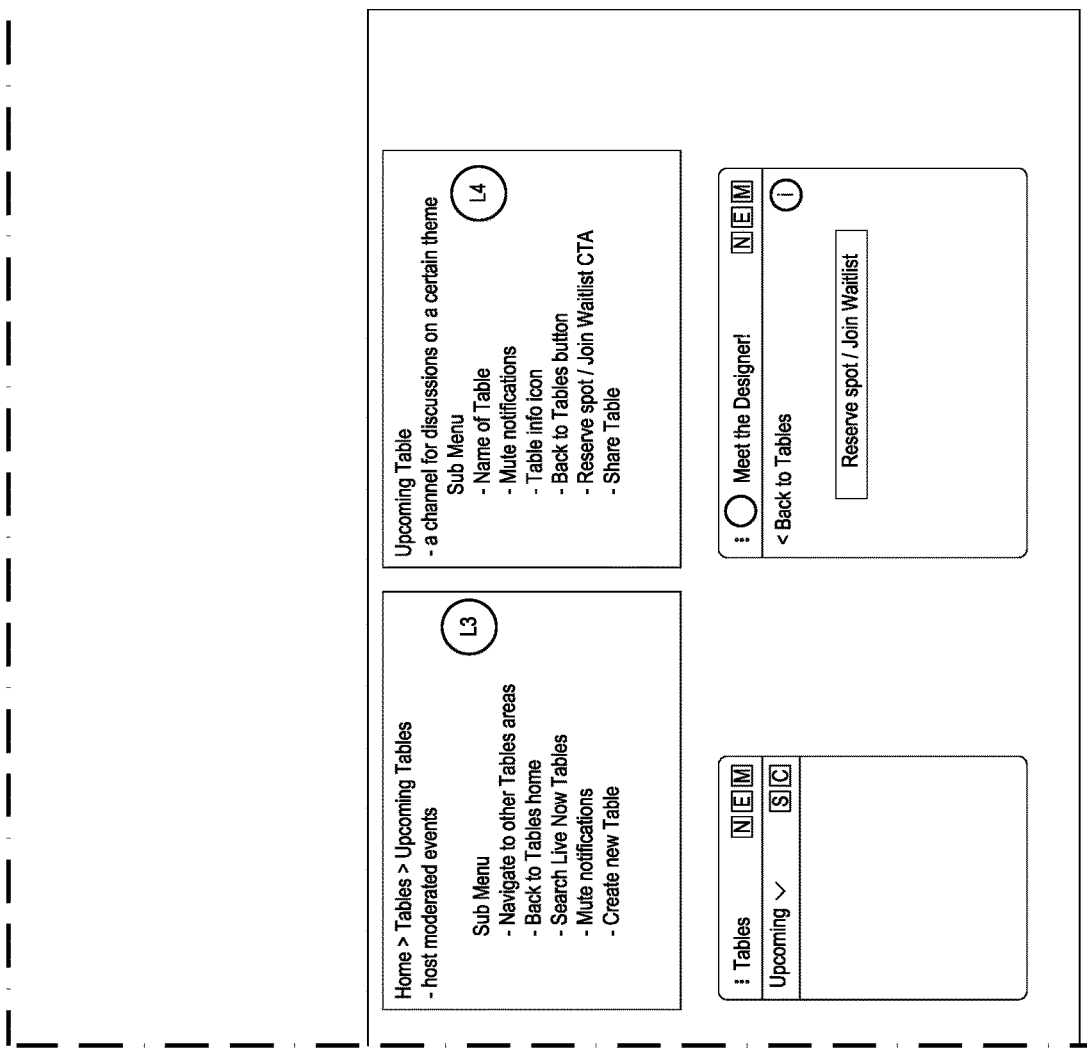
FIG. 4E₆

METHODS AND SYSTEMS FOR MULTIMEDIA COMMUNICATION WHILE ACCESSING NETWORK RESOURCES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to enabling users accessing a network resource to communicate with each other.

Description of the Related Art

Users accessing a network resource, such as a website, often do so in isolation. To the extent that a website may enable users to collaborate, such collaboration often necessitates prior scheduling among participants. Further, each website that offers such collaboration conventionally requires its own collaboration system, each with their own user experience, making it challenging for users to adapt to and adequately utilize such collaboration and associated communication tools. Further, conventional collaboration tools lack many desirable communication features.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a communication system configured to enable users to communicate with each, the communication system comprising: a network interface; at least one processing device operable to: detect, via data received from a first user device over a network using the network interface, when a first user is accessing via a first browser a third party website operated a first entity different than the entity operating the communication system; detect, via data received from a second user device using the network interface, when a second user is accessing via a second browser the third party website concurrently with the first user accessing the third party website; transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device; transmit data to the second user device configured to cause, at least in part, an interface to be displayed on the second user device indicating that the first user is currently accessing the third party website and enabling the second user to initiate a transmission of a text, image, and/or video communication to the first user device; at least partly in response to the first user activating the first communication control, cause, at least in part, a communication channel to be established between the first user device and the second user device and enable the first user and the second user to communicate using the communication channel established between the first user device and the second user device; detect, via data received from a third user device using the network interface, when a third user is accessing via a third browser a second website operated a second entity different than the entity operating the communication system and different than the first entity; detect, via data received from a fourth user device using the network interface, when a fourth user is accessing via a fourth browser the second website concurrently with the third user accessing the second website; transmit data to the third user device configured to cause, at least in part, an interface to be displayed on the third user device indicating that the fourth user is currently accessing the second website and enabling the third user to initiate, via a third communication control, a transmission of a text, image, and/or video communication to the fourth user device; transmit data to the fourth user device configured to cause, at least in part, an interface to be displayed on the fourth user device indicating that the third user is currently accessing the second website and enabling the fourth user to initiate a transmission of a text, image, and/or video communication to the third user device; and at least partly in response to the third user activating the third communication control, cause, at least in part, a communication channel to be established between the third user device and the fourth user device and enable the third user and the fourth user to communicate using the communication channel established between the third user device and the fourth user device.

An aspect of the present disclosure relates to a computerized method, the method comprising: detecting at a computer system, via data received from a first user device over a network, when a first user is accessing via a first browser a third party website operated a first entity different than the entity operating the computer system; detecting using the computer system, via data received from a second user device over the network, when a second user is accessing via a second browser the third party website concurrently with the first user accessing the third party website; transmitting data using the computer system to the first user device configured to cause, at least in part, an interface to be displayed on the first user device indicating that the second user is currently accessing the third party website and enabling the first user to initiate, via a first communication control, a transmission of a text, image, and/or video communication to the second user device; transmitting data using the computer system to the second user device configured to cause, at least in part, an interface to be displayed on the second user device indicating that the first user is currently accessing the third party website and enabling the second user to initiate a transmission of a text, image, and/or video communication to the first user device; and at least partly in response to the first user activating the first communication control, enabling the first user and the second user to electronically communicate over the network.

An aspect of the present disclosure relates to a non-transitory computer readable memory having program instructions stored thereon that when executed by a computer system device cause the computer system to performing operations comprising: detect, via data received from a first user device, when a first user is accessing, via a first browser, a third party website; detect, via data received from a second user device, when a second user is accessing via a second browser the third party website concurrently with the first user accessing the third party website; transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device; transmit data to the second user device configured to cause, at least in part, an interface to be displayed on the second user device indicating that the first user is currently accessing the third party website and enabling the second user to initiate a transmission of a text, image, and/or video communication to the first user device; and at least partly in response to the first user activating the first communication control, enable the first user and the second user to electronically communicate.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIGS. 5A-12E illustrate additional example user interfaces.

DETAILED DESCRIPTION

Figure 1A:
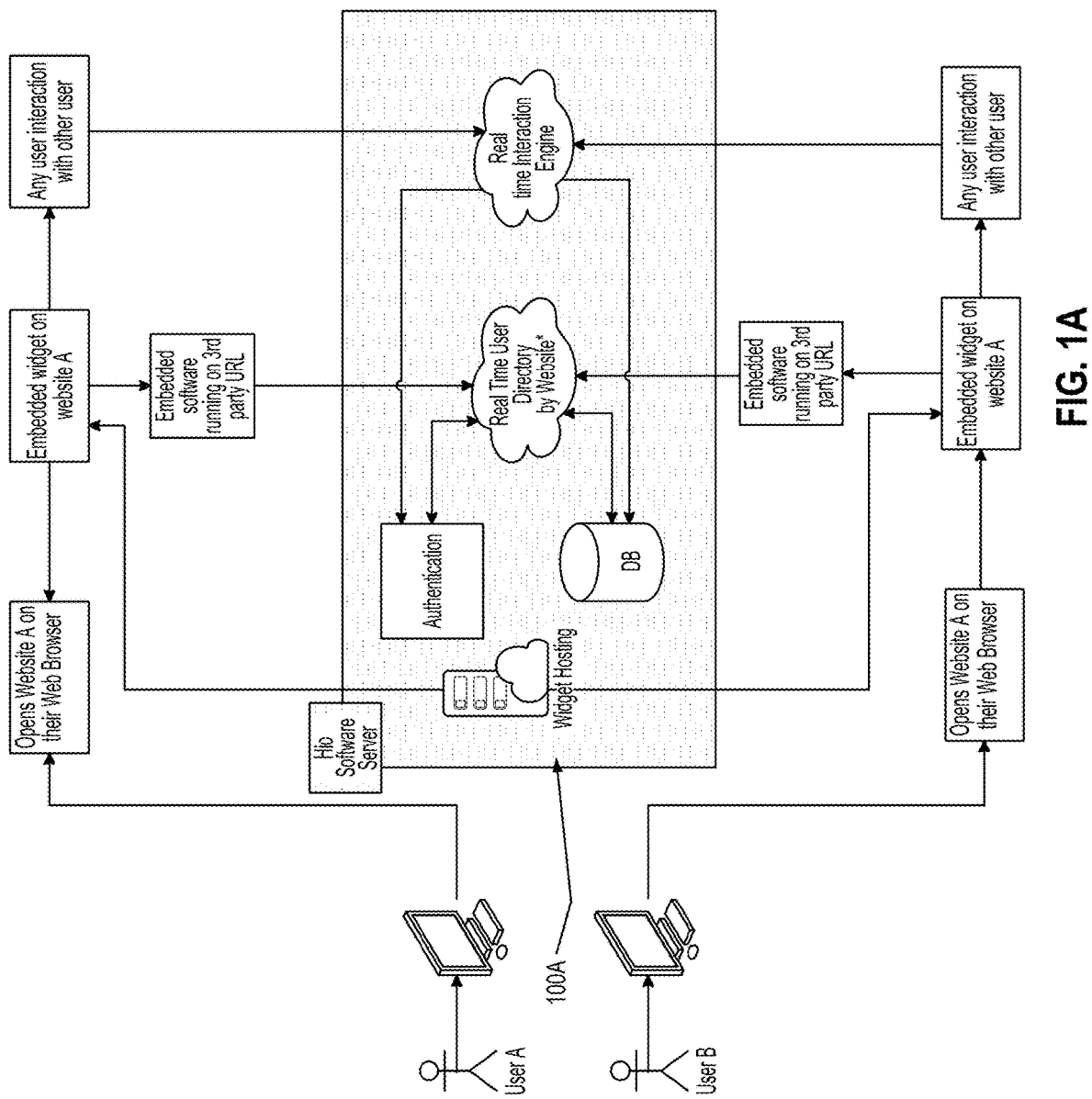
FIG. 1A illustrates an example architecture.

An aspect of the present disclosure relates to systems and processes configured to identify when two or more users are accessing the same or similar network resources. By way of non-limiting example, the network resource may be a static or dynamic online document, such as a webpage, or webpages associated with the same second level domain of a website (although the webpages may be at different subdirectories or different sub domains). The identification that two or more users are accessing the same or similar network resources may be performed by a remote and/or different system (which may be at times referred to herein as a multimedia communication system) than the web server hosting the website being accessed by the users. The multimedia communication system may be operated by a different entity than the entity that operates the website.

The multimedia communication system may instantiate an application, such as a widget application, on a network resource.

Upon detecting that two or more users are concurrently accessing the same network resource (e.g., a website or a specific webpage on a website), the multimedia communication system may cause the widget on a given user device to display to the given user identifiers associated with the other users. The given user may access profile information associated with the other users, may direct message with the other users, may interact with other users view threaded conversations, and perform other functions described herein. As will be described, although a widget application may be used to provide certain functionality, other techniques may be used, such as a browser extension or direct integration into a website.

Optionally, upon detecting that two or more users are accessing the same network resource (using respective user devices, such as a desktop computer, laptop computer, smart phone, networked television, networked game console, networked wearable device, and/or the like), the multimedia communication system may transmit a communication to the users (e.g., via the widget application instantiated on respective user devices) requesting permission to inform the other users accessing the network resource of the concurrent access and requesting permission of a given user to enable communications with other users concurrently accessing the network resource. Optionally, a given user may prospectively grant permission to notify selected users or all users (e.g., during an account creation process or via a terms of use interface, which may include a corresponding opt-in interface) when they are concurrently accessing a network resource with the given user of such concurrent access and may grant permission to enable communications with the given user.

Where the multimedia communication system enables a given user to selectively specify which other users are to be informed that the given user is concurrently accessing a network resource (as opposed to all users), the system optionally may enable the given user to upload identification, contact and/or other data of other users for which such permissions are being granted. The uploaded data may include a unique identifier generated by or on behalf of the multimedia communication system, where the multimedia communication system may transmit respective unique identifiers to the corresponding users. The users may in turn share their unique identifier with other users, who may utilize received unique permissions to grant the foregoing permissions.

Optionally, a given user may grant such permissions to other users that the given user is connected to (e.g., friends with, linked to, etc.) on or more specified social media or content sharing websites. For example, a given user may grant the multimedia communication system access to the given user's connections on one or more platforms, and the multimedia communication system may access and utilize such connections in determining who may be informed that the given user is concurrently accessing a network resource.

Optionally, when a user accesses a network resource, the user may be prompted to grant the foregoing permissions with respect to any other users concurrently accessing the network resource.

Once permission has been granted (where permission may be affirmatively granted as discussed above or granted by simply accessing the network resource or the communication services), the multimedia communication system may enable corresponding users concurrently accessing a network resource to communicate via one or more communication channels using interfaces provided via a widget application. Such communication channels may include video, audio, text, and/or screen sharing. For example, users may be enabled by the multimedia communication system to initiate and conduct video chat conferences with multiple selected other users, where an audio/video feed (e.g., of the user's voice and face) from a microphone and camera of a user device (e.g., a front facing phone, laptop, tablet, or desktop computer) may be streamed to devices of other users for video and/audio playback. In addition or instead, users may be enabled to communicate via text and/or graphics (e.g., emojis) and/or just with voice. Further, users may be enabled to share content (e.g., documents, such as text documents, video content, audio content, still images, links, etc.) with each other.

Optionally, each user concurrently accessing a common network resource is provided (e.g., via the widget application) identity information for the other users (where the identity information may include a corresponding user name, alias, photograph, avatar, email address, phone number, device name, and/or the like). Such identification information may be transmitted to the user devices and presented in a list (e.g., using a widget interface).

Optionally, a user can be prompted to view content or to register to enable use communication widget features based on one or more criteria. The prompt may be triggered based on user characteristics and/or user navigation behavior.

Examples of navigation triggers may be detecting the a user has been on a certain webpage for at least a threshold period of time (e.g., 3 seconds, 5 seconds, 10 seconds, 30 seconds, or other threshold period of time), that the user has scrolled at least to a first position in the webpage, that the user is exiting the webpage or website, that the user has clicked on (or otherwise selected) a content item on the webpage, a previous site or webpage visited by the user, and/or the like.

Example user characteristics may include whether the user is a registered user of the website operator or is not a registered user of the website operator. Further example user characteristics may include the user's physical location. By way of example, the user's location which may be determined: using a geolocation application programming interface (API) where the user is prompted to provide the user's location; the user's Internet Protocol (IP) address; by detecting the user's time zone using a JavaScript Intl API; and/or otherwise. Other user characteristics may include determined demographic data (e.g., age, income, education) and interests.

By way of illustration, in response to a detected trigger, a pop-up or other notification may be presented, indicating that a person (e.g., a celebrity, an actor, an athlete) that is determined to be of possible or likely interest to the user (which interest may be determined based on the user's characteristics) will be conducting a text, audio, or audio/video online chat with users of the communication widget of the website at a specified time (e.g., in the next 5 minutes). The notification may include a countdown timer which counts down to the chat event. The chat event may be accessible via the communication widget for the website. Optionally, the user may be prompted to or required to become a registered user in order to access and participate in the chat.

Other examples of content that may be provided include pre-recorded or live one-way text, audio, and/or audio video content.

The detection of a user's access of a website may be performed using access detection and communication code (e.g., JavaScript) embedded in a website's webpage. For example, optionally the same operational access detection and communication code may be embedded in different webpages of different websites operated by different, unrelated entities (although the code may be modified for each website to include a unique identifier associated with the website) and may optionally provide a functionally common interface with respect to the different websites (although each website may optionally have its own branding and may disable or enable certain functions).

Optionally, in addition or instead, a browser extension may be added to a user's browser (e.g., by the user accessing and installing the extension from a browser extension library or otherwise) that detects when a user is accessing a given website or webpage and that enables user communication over one or more channels and other functionality described herein. Optionally in addition or instead, a dedicated application (which may be referred to as an app) may be downloaded (e.g., from an app store) to a user device that detects when a user is accessing a given website or webpage and that enables user communication over one or more channels and other functionality described herein. Optionally, the functionality may be integrated into a given website.

Advantageously, to further enhance security, optionally the third party website may be inhibited from accessing authentication data associated with the multimedia communication system, and the multimedia communication system may be inhibited from accessing the authentication data associated with third party website.

In order to further enhance and promote communication among users concurrently accessing a network resource, such as a website, user profile information may be shared. Optionally, a user profile may be generated which may include user identification data (e.g., first name, last name; first name and just first letter of last name; an alias; an avatar or photograph, etc.), a user's mobile/cell phone number, user biographical information (e.g., career data, educational institutions attended, etc.), background data, location, demographic data (e.g., gender, age, income, level of education, marital status, number of children, etc.), user preferences and interests (e.g., hobbies, preferred types of literature, preferred clothing brands, preferred clothing styles, preferred movies, preferred sports, preferred sports teams, etc.), links (e.g., URLs) to one or more social networks presences/pages of the given user, and/or other data (e.g., which may be used to authenticate a user, to identify a user to other users, to determine a user's interests, and/or for other purposes). The user may specify which user profile data may be shared with other users as a public profile.

When a given user accessing a network resource is detected, some or all of the given user's data may be presented to other users concurrently accessing the network resource (e.g., all users, those permitted by the given user to access the given user's data, those that have opted in to receive such data, etc.). For example, initially, an identifier of the given user (e.g., first name and first letter of last name, alias, etc.) may be displayed on respective devices of other users. A user viewing such identifier may indicate that additional information is desired (e.g., by pointing at the identifier, such as my touching the identifier if the identifier is displayed via a user device touch display, or by hovering over or clicking the identifier using a cursor being navigated using a mouse, trackpad, stylus, or other pointing device). For example, such additional information may include biographical data, background data, location data, interest data, and/or the like. The additional information may include some or all of the profile data in the public profile defined by the given user. Optionally a user may request that the given user permit access to specified other data of the given user (e.g., location information or when the given user intends to access a given network resource), which the given user may grant or deny.

Optionally, rather than storing user profile information and the like, a user may provide the multimedia communication system with a link to such information accessible on a third party site (e.g., a publically accessible social media page of the user). The multimedia communication system may then share the link with other users concurrently accessing a network resource, via which such other users may access and view the user profile information.

Optionally, a user or system generated password is not used to authenticate a user (e.g., when accessing the given user' account, creating or editing the given user's profile, etc.). Instead, the given user's mobile phone number may be used to authenticate the given user.

Optionally, when users concurrently accessing a network resource want to share content, rather than passing actual content (e.g., documents) to each other, users can share a link to such content (e.g., where such content is hosted on a cloud system or elsewhere).

Thus, security may be enhanced by optionally avoiding the storage of very sensitive user information (such as user or system generated passwords) on the multimedia communication system. Further, rather than storing user documents and/or user profile information, the multimedia communication system may transmit links to such user documents and user profile information stored on third party systems (e.g., social networking systems, cloud-based document sharing systems, etc.), thereby further enhancing security. Thus, even if a hacker gained improper access to the multimedia communication system, the hacker would not find user or system generated passwords, documents, and/or user profile information stored on the multimedia communication system.

As will be described, the multimedia communication system may enable users to establish preferred network connections with selected other users, where non-public data may be shared amongst preferred network connections. Further, as will be described, threaded communication channels may be established for different subjects that enable users to post messages and access such posted messages.

Certain aspects will now be discussed with reference to the figures.

FIG. 1A illustrates an example architecture. A multimedia communication server system 100A may include a widget hosting service that hosts the widget code discussed elsewhere herein that provides services and user interfaces described herein. When a user accesses a third party website webpage (associated with a corresponding URL) via a client on a user device, the user may be authenticated and the corresponding widget may be embedded on the accessed third party webpage to provide the user interfaces and functionality described herein. The embedded widget may also communicate with embedded software running on the third party URL. A real time third party user directory may identify users that are concurrently accessing the website and/or the specific webpage. Such a user directory may be used to indicate to a given user other users that are concurrently accessing the website and/or the specific webpage, and may identify which of such other users are "connected" to the given user. The real time directory may access data discussed herein from a database and/or may store data in the database.

A real time interaction engine may detect users' interactions with the widget and widget user interfaces (such as those described herein), and take appropriate action, such as the actions described herein. For example, the real time interaction engine may detect and act on requests by one user to be connected to another user, may communicate direct messages from one user to another user, may post a user's message to a thread specified by the user, may access and provide archived messages in response to a user request, may access and provide user profile information is response to the given user pointing at a corresponding user profile, and/or the like. The real time interaction engine may access data discussed herein from a database and/or may store data in the database.

The multimedia communication server system 100A may be implemented as a cloud-based system and the processes described herein may be performed in whole or in part by a secure hosted computing environment that includes a collection of physical computing resources that may be remotely accessible and may be rapidly provisioned as needed (sometimes referred to as a "cloud" computing environment). The multimedia communication system 100A may include additional or fewer components than illustrated in FIG. 1A. The database may optionally be hosted in a data store, such as a hosted storage environment that includes a collection of physical data storage devices that may be remotely accessible and may be rapidly provisioned as needed (sometimes referred to as "cloud" storage).

The multimedia communication server system 100A may communicate over a network with one or more user devices and third party websites. The network may include any wired network, wireless network, or combination thereof. For example, the network may be a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. The network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. The communication channels may be securely encrypted using private and public keys and/or other encryption techniques.

Although the embodiment illustrated in FIG. 1A utilizes a widget in providing user interfaces and certain services to a user, optionally in addition or instead, a browser extension may be added to a user's browser that detects when a user is accessing a given website or webpage and that enables communications between users, that enables posting to and access of subject threads, that provides profile information, and/or that performs other functions described herein. Optionally in addition or instead, a dedicated application may be downloaded (e.g., from an app store) to and installed on a user device that detects when a user is accessing a given website or webpage and that enables communications between users, that enables posting to and access of subject threads, that provides profile information, and/or that performs other functions described herein. Optionally, the functionality may be integrated into a given website.

Figure 1B:
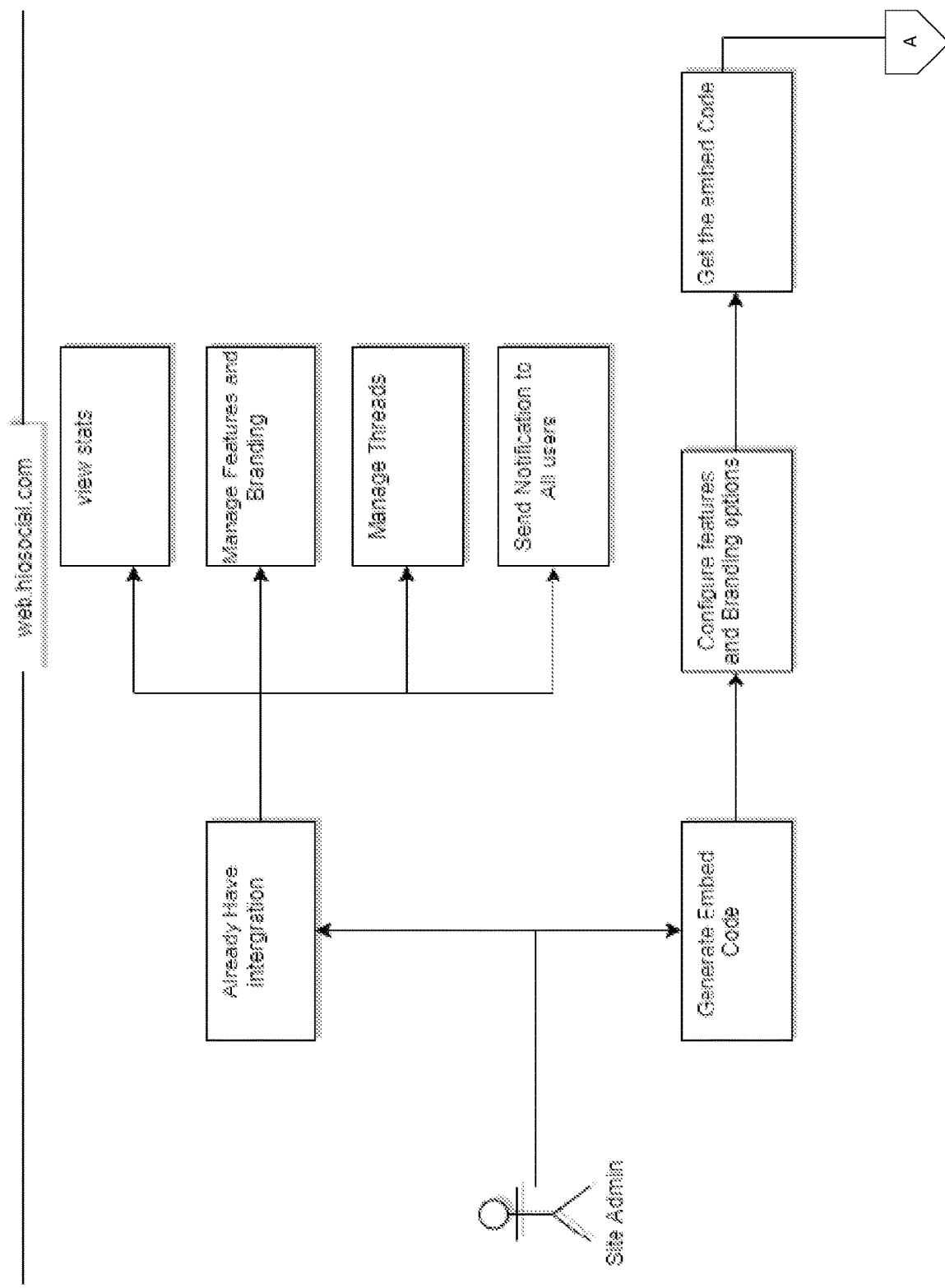
FIGS. 1B-1C illustrate an example process flow.
Figure 1C:
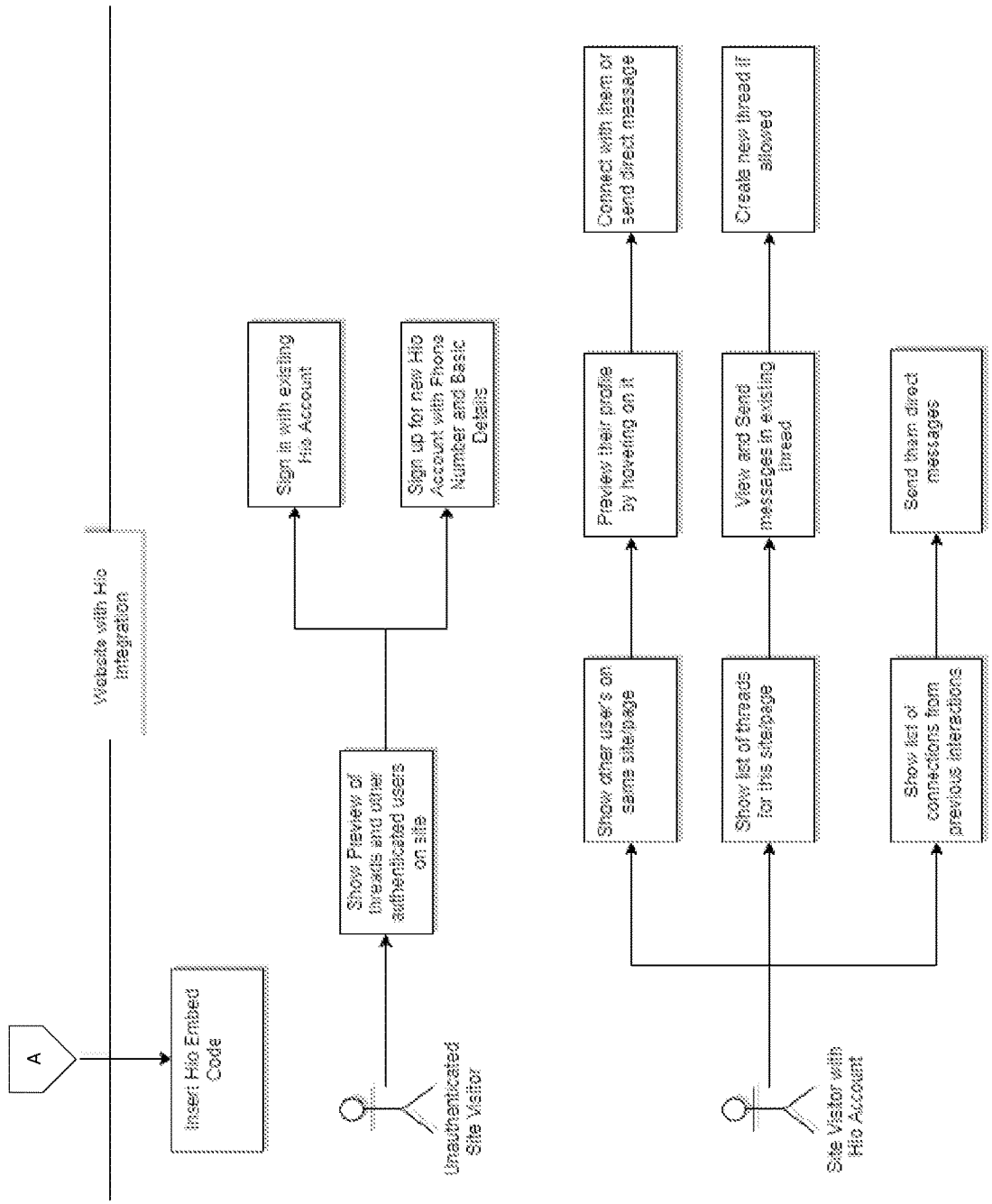

FIGS. 1B-1C illustrate an example process flow. An authorized user of the multimedia communication system (e.g., an administrator) may determine for a given third party site whether the site is already integrated with functionality described herein. If not, then communication code may be generated to be embedded in the site's website (e.g., in the HTML code of one or more web pages) to enable functionality described herein. The code may be used to access widget code configured with one or more feature options.

For example, an operator of a website may enable or disable the making of user connections, enable or disable one or more (e.g., all) chat channels (e.g., video chat, text chat, etc.), enable or disable the provision of subject threads, define and name subject threads, post updates and offers (e.g., operational features, coupons, discounts, etc.), and/or the like.

As discussed elsewhere herein, the multimedia communication may optionally generate and provide code (which may be as little as one line of code) to be included on webpages of a given website. The code may include a unique identifier associated with the website. When an authenticated user accesses the website via a user device, the code may be used to initiate a message from the user device to the multimedia communication system, the message including the unique website identifier. A larger code set (e.g., widget application code) may be accessed which may be configured in accordance with the feature options and branding website. The code set may then be downloaded to the user device and the interfaces and branding will be accordingly configured a user device and may be presented via a widget application. Optionally, different websites may use the same or essentially the same corresponding widget code set, with each configured to operate and provide widget interfaces in accordance with their corresponding feature option configuration. Thus, different websites operated by different entities may utilize at least a subset of functionally the same user interfaces provided via the multimedia communication system, but each may have their own branding to make the user interfaces appear even better integrated with the website.

If the third party website is integrated with functionality described herein (e.g., already has the communication code embedded), the administrator may view various statistics for any actions performed using the functionality provided and tracked via the multimedia communication system.

For example the statics may relate to overall aggregate statistics or statistics for a specific period of time (e.g., a specific start/stop date and/or time) for visiting users that have been authenticated by or have accounts with the multimedia communication system, such as: how many visiting users are accessing the website concurrently or overall, the amount of time a given visiting user was accessing the website for a given browsing session, the average amount of time visiting users were accessing the website for a given browsing session, the number and type (e.g., video messages, text messages, direct messages, public/group messages, etc.) of messages transmitted between users concurrently accessing the website, the average length of video call chats, common profile characteristics of users having similar communication patterns, peak visit times, peak communication/messaging times, how many connection requests were transmitted, how many connection requests were accepted, demographic information for visiting users, and/or other such information.

In addition, the administrator may manage which features are to be activated or deactivated for the website, and branding for the user interfaces for the website, as similarly discussed elsewhere herein. For example, user interfaces may be provided that enables a user to quickly and accurately specify which features discussed herein are activated or deactivated. Further, user interfaces may be provided that enables a user to configure the operations of features. By way of illustration, the user may specify the website URL, branding, HTML/hex color codes for a primary color and/or colors, what type of user networking is enabled, whether there is to be a single or multiple forum threads, and/or other functions and features. The system may then automatically generate code enabling/disabling and configuring the features and appearance accordingly. The generated code may then be embedded on the website/webpage and provide and execute the features accordingly via a customized widget. The disclosed technology may advantageously reduce the amount of computer process, memory, and network resources that would otherwise be necessary if each website operator had to develop their own widget.

Visiting users accessing the third party website may be unauthenticated (e.g., do not have an account with the multimedia communication system or are not identified as having an account) or may be authenticated (e.g., logged into their account or otherwise identified). If a visiting user is not authenticated, the visiting user may sign into their existing account, if they have one, or may sign up for a new account. For example, in creating their account, the user may be prompted to provide their phone number, and a code may then be transmitted to the phone number. The user may be prompted to enter the code, and if the user enters the code, the user is authenticated and the account may be created.

The user may also be prompted to provide certain information for their profile, which may then be stored in the user's account. For example, a user may provide information, such as hobbies, preferred types of literature, preferred clothing brands, preferred clothing styles, preferred movies, preferred sports, preferred sports teams, preferred websites, preferred shopping destination, links (e.g., URLs) to one or more social networks presences/pages of the user, other profile data described herein, and/or other data.

If the visiting user has an account with the multimedia communication system, the user may cause a preview of communication threads on one or more subjects to be presented and may identify other users concurrently visiting the site (e.g., causing their names and/or other identifiers to be displayed). In response to the user pointing at a given user identifier (such as my touching the identifier if the identifier is displayed via a user device touch display, or by hovering over or clicking the identifier using a cursor being navigated using a mouse, trackpad, stylus, or other pointing device), profile data for the given user may be presented. Optionally, the profile data may be limited to profile data that the given user has agreed to share with other users (e.g., a public profile for non-connected users and a private profile for connected users). A messaging interface may be provided that enables the user to communicate with the given user via a direct message using a selected communication channel (e.g., text, video, audio).

In addition or instead, the user may connect with the given user. For example, a user may send another user (who may be referred to as the recipient) that is concurrently accessing a website a connection request. By way of illustration, the user may be presented in a list of users concurrently accessing the website, and the user may select the recipient from the list, and activate a connection request control. The multimedia communication may receive the selection and connection request control activation, and may transmit the connection request to the recipient.

The recipient may elect to accept or deny the connection request. If the recipient accepts the connection request, profile information designated by the requesting users as shareable with connections (where such profile information is not to be shared with non-connections and which may be referred to as non-public data or a private profile, which may include location information, phone number, email address, social media links, demographic information, and/or other information) may then be shared with the recipient that accepted the connection request. If the recipient refuses the connection request, then the recipient will not be provided with access to such private profile of the requester.

For example, a given user may point at an identifier of another user that is a connection, in one of the user interfaces described herein, and some or all of the foregoing non-public profile information of the connection may be presented. In addition, a user may specify that certain content (e.g., documents, videos, audio recordings, photographs, content links, etc.) may be shared with connections, but not with non-connections.

Optionally, the acceptance of a connection is one-way, in that if the request is accepted, the requester's private profile may be shared with the recipient, but the recipient's private profile is not shared with the requester. Thus, in order for the requester to have access the recipient's private profile, the recipient may be required to affirmatively grant such access. For example, the recipient may send a reply connection request to the original requester, and if the original requester accepts the reply connection request, then the recipient's private profile may be shared with the original requester. Optionally instead, if a recipient accepts the connection, then the recipient's private profile is automatically shared or shareable with the requester.

In addition, a user interface may be displayed to the visiting user that lists communication subject threads for the current webpage and/or website. The visiting user can select a subject communication thread, and messages in the thread may be accessed from memory and displayed on the user device. In addition, the visiting user may post a message within the thread. Optionally, the visiting user may create and name a new thread if such creation privilege has been granted to the given user (or to users in general).

A user interface may be displayed to the visiting user that lists user connections created from previous interactions and that enables the visiting user to transmit direct communications to such connections.

The example user interfaces described herein may be generated displayed via code (e.g., widget application code) received from the multimedia communication system, via a browser extension, via a dedicated downloaded application installed on the user device, or via services integrated in a website, as described elsewhere herein.

Figure 2A:
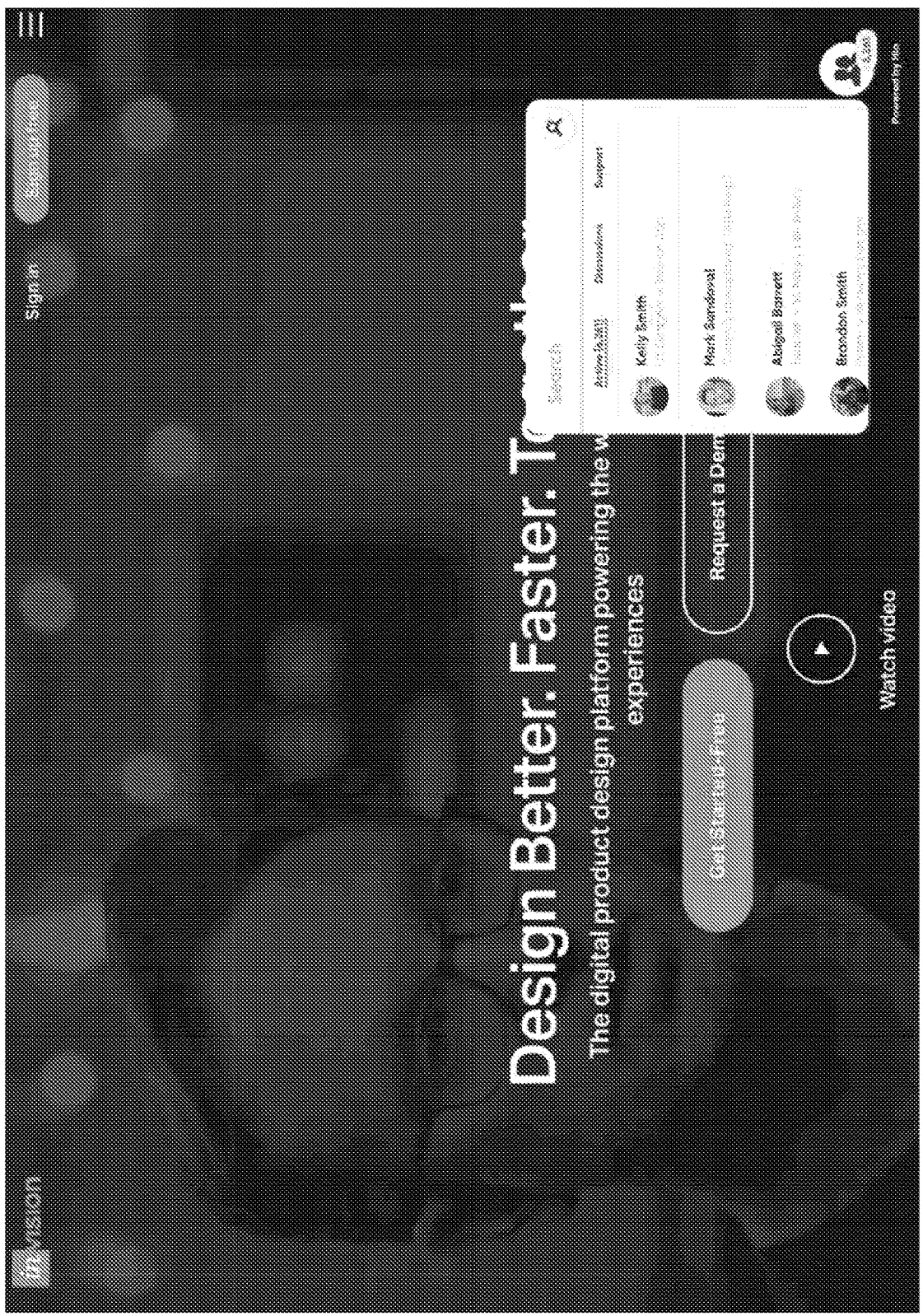
FIGS. 2A-3P illustrate example user interfaces.

FIG. 2A illustrates an example user interface with links to active participants (optionally listing the number of active participants and/or discussions, discussions, and support). Active participants may be those who have interacted with the website and/or the multimedia communication system via the website within a threshold period of time (e.g., the last 15 seconds, 30 second, or other threshold period of time). This technique avoids identifying users that have terminated their session or been disconnected in the participant list, and so the users still on the website can avoid attempting to interact with such inactive users.

Figure 2B:
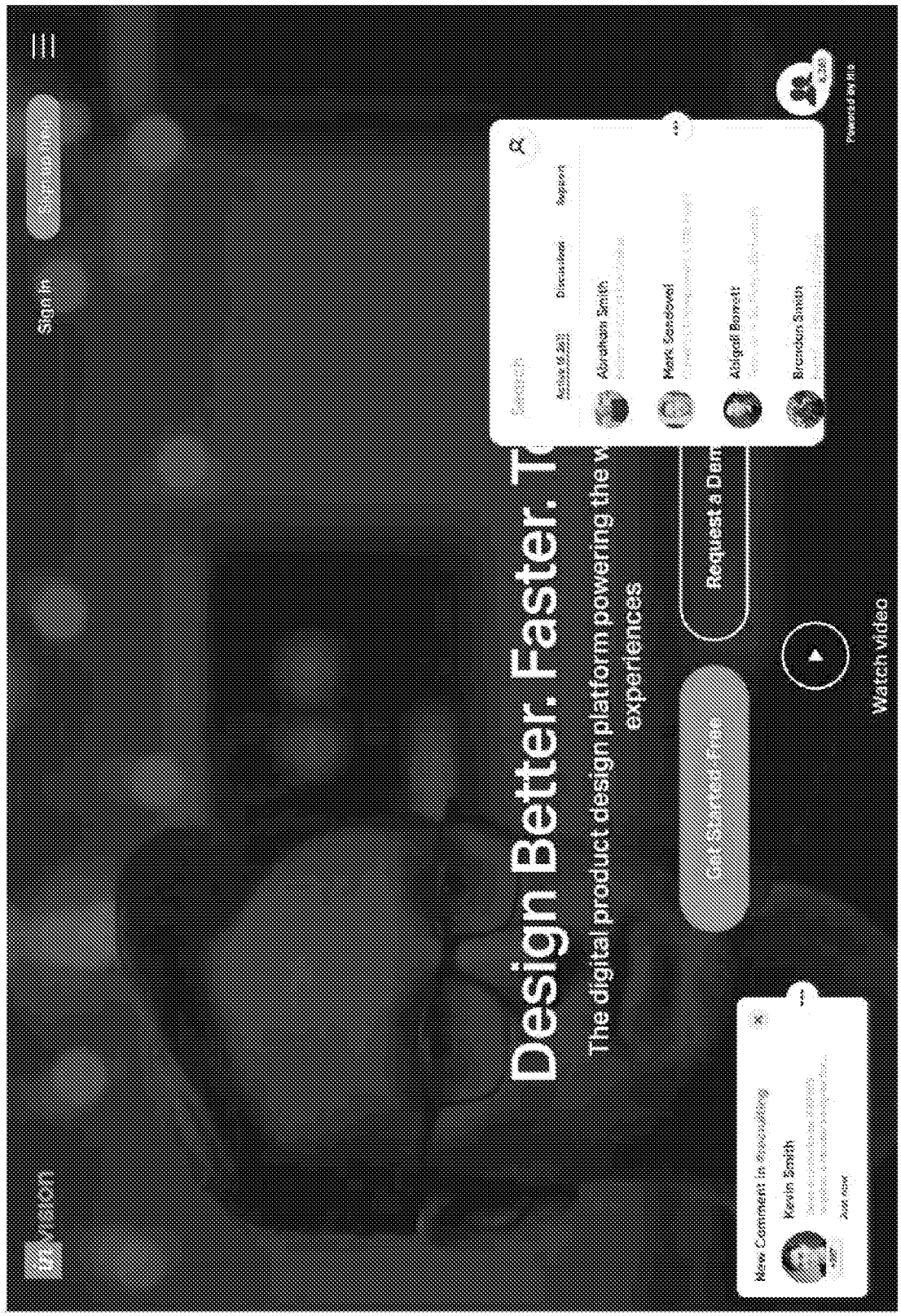
Figure 2C:
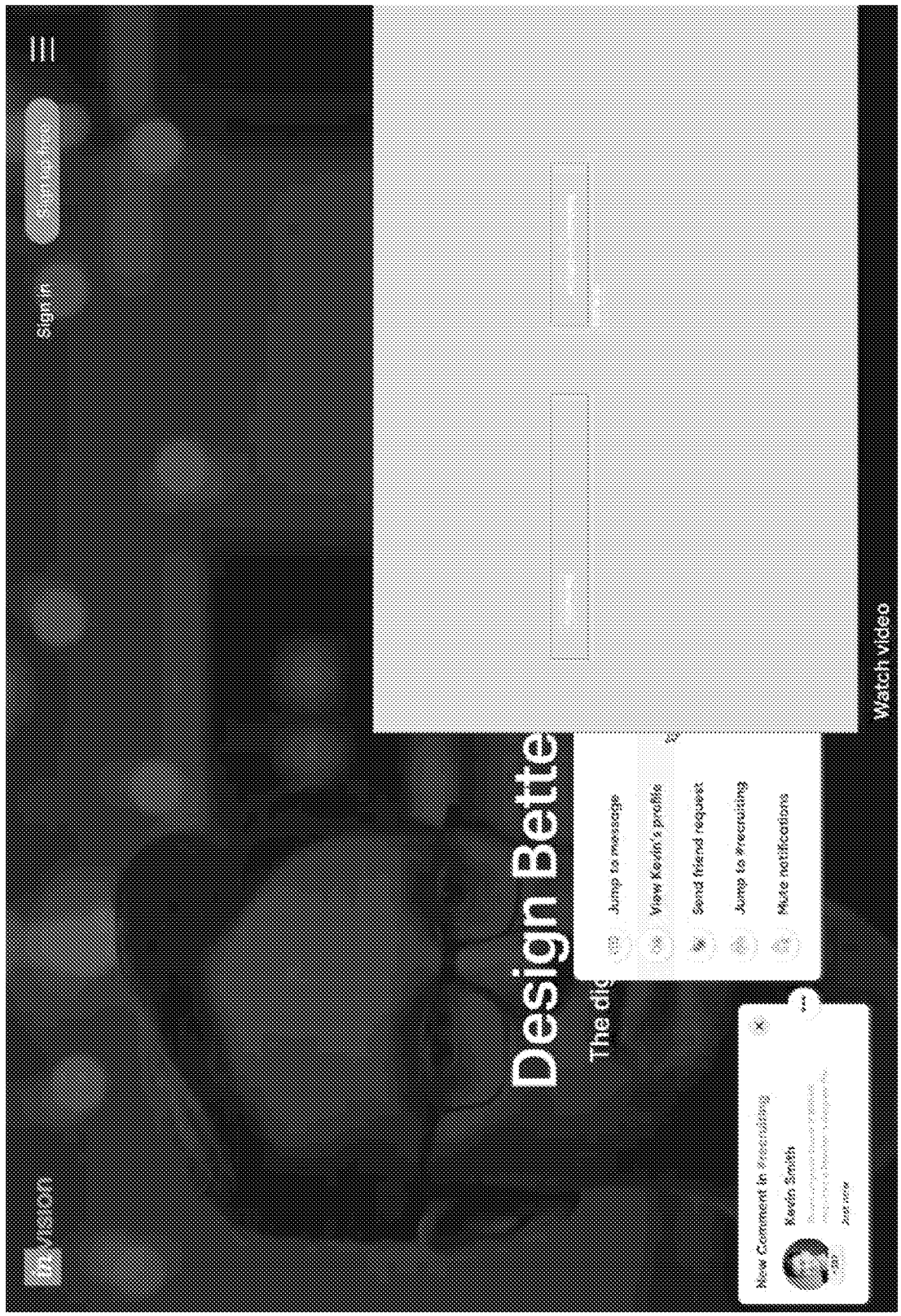
Figure 2D:
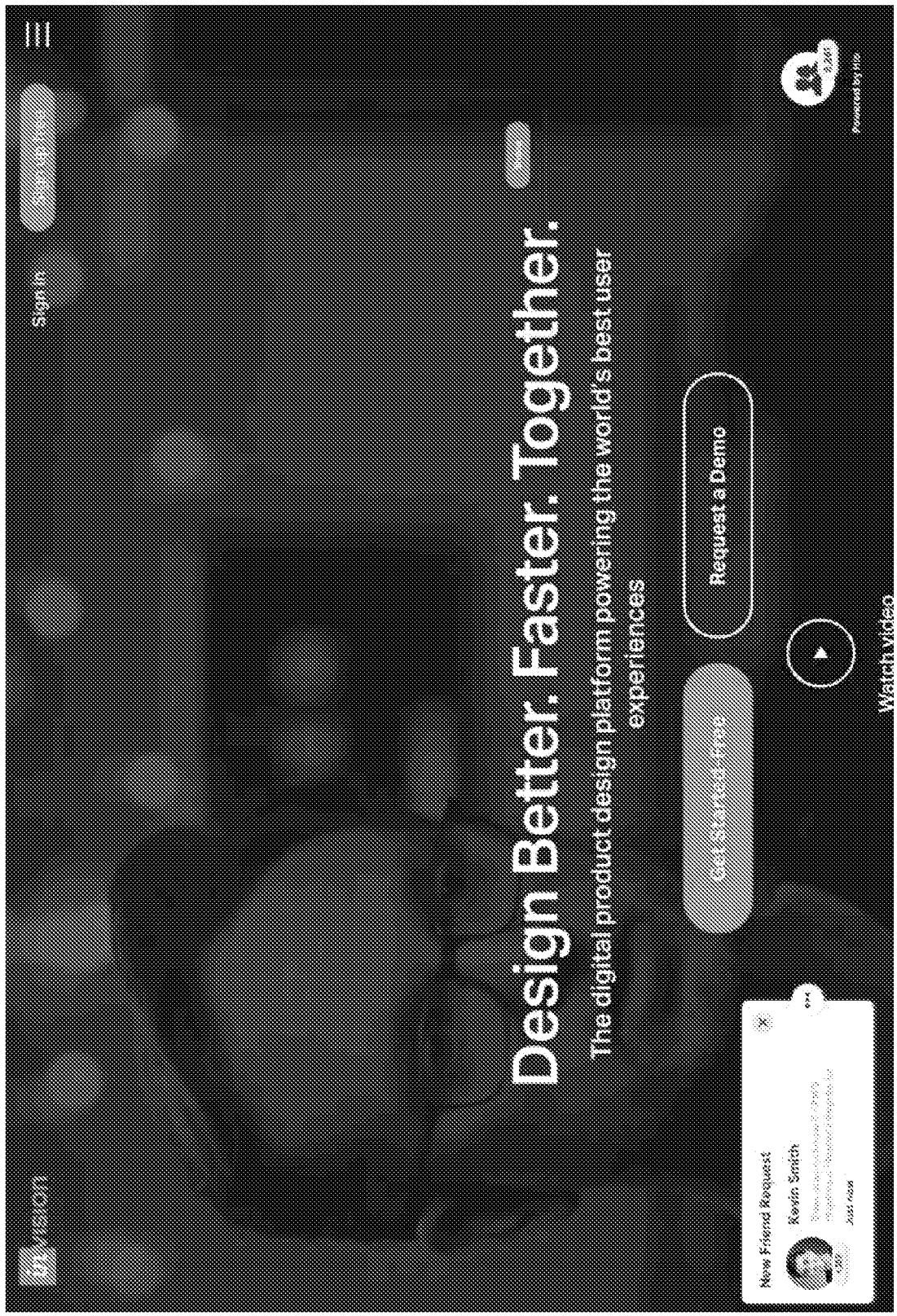
Figure 2E:
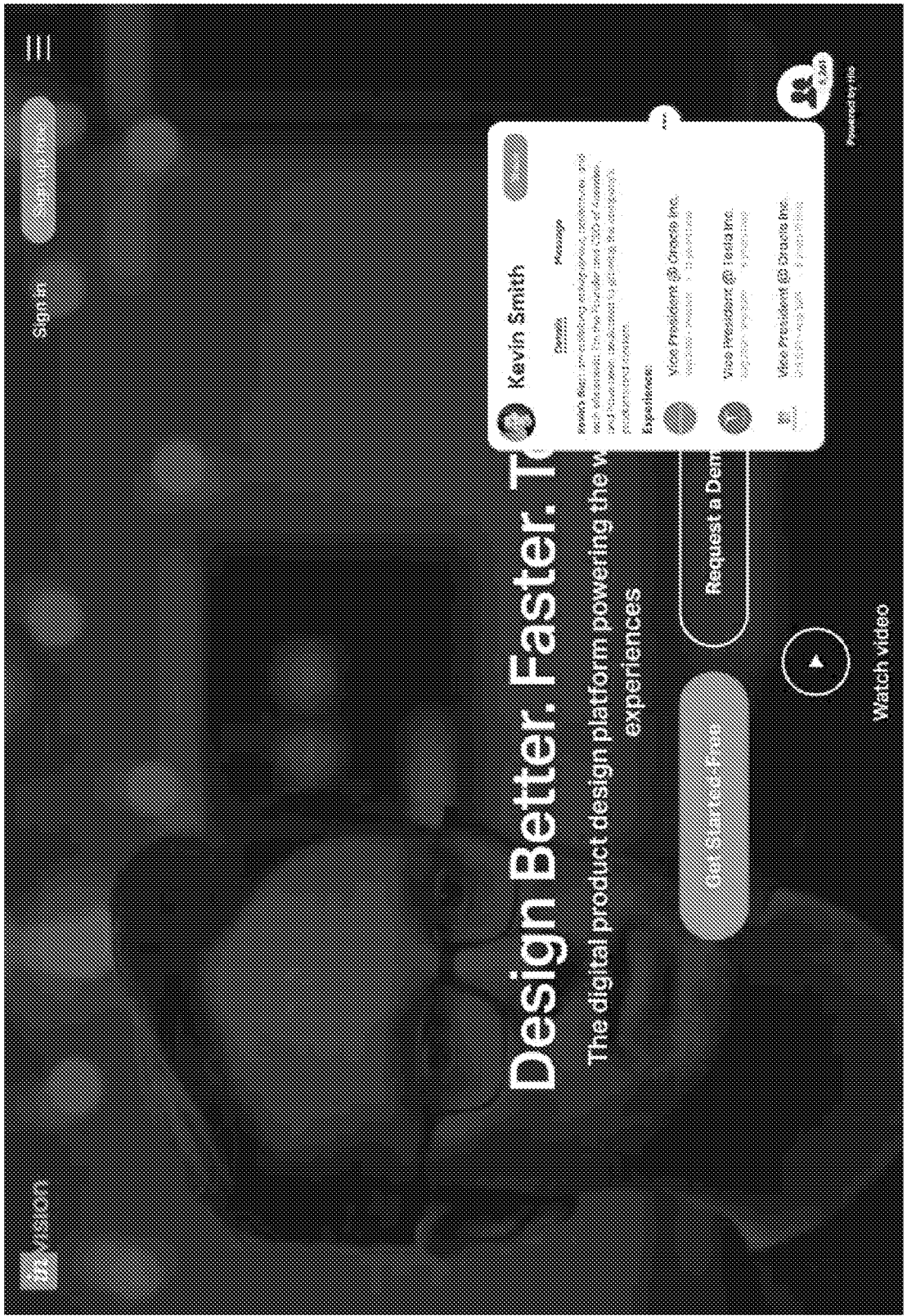

In the illustrated example, active participants are listed. FIG. 2B illustrates the user interface of FIG. 2A, with a popup of a recent posting in a given subject thread channel (e.g., recruiting). FIG. 2C illustrates the user interface of FIG. 2B, with a popup of an action controls for responding to the recent posting in the given subject thread channel. For example, the action controls may include a "jump to message" control, a view selected user's profile control, a send friend (also referred to as a connection) request control, a jump to a specified thread (e.g., #clubs) control, and a mute notifications control. FIG. 2D illustrates a new friend request pop-up notification, including an image of the user making the request, the name of the user making the request, a job title, and a company name. The user can click on a link in the request, and additional information about the requester may be presented, as illustrated in FIG. 2E.

Certain additional example user interfaces will now be discussed. While the example user interfaces may illustrate or refer to text communications (e.g., text messages), the user interfaces may be similarly adapted to video and voice-only communications. The user interfaces may be presented overlaying or adjacent to a network resource (e.g., a webpage) being accessed by a user device.

Figure 3A:
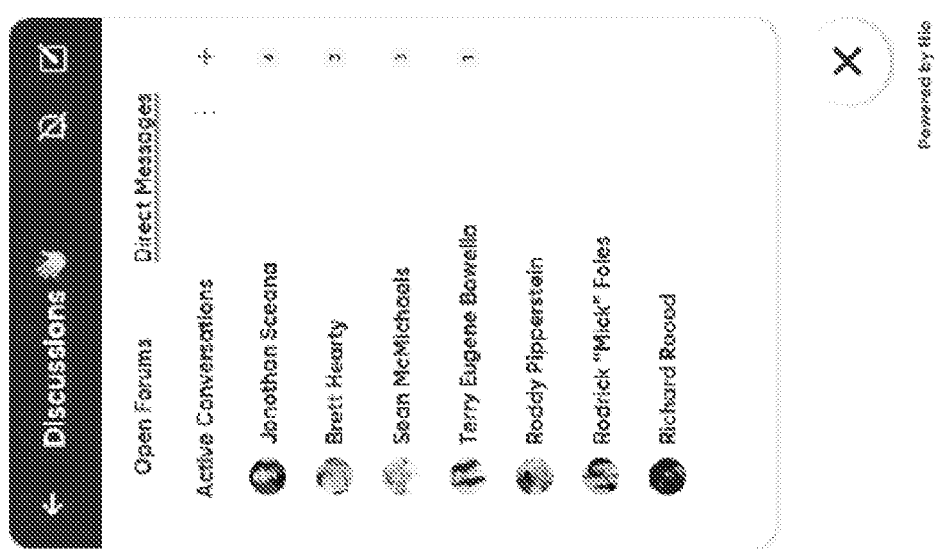

Referring now to FIG. 3A, an example one-to-one direct message chat interface is illustrated, where the multimedia communication system causes a list of those users that are engaged in active conversations to be displayed on a device of a given user accessing a network resource (e.g., users that have communicated with the given user during the current session of accessing a network resource and/or that have communicated with the given user within a threshold period of time). The list may optionally include an image (e.g., a photograph or graphic avatar) of each user and a text identifier (e.g., first and last name, first name and first initial of last name, an alias, etc.). The given user can select another user from the list (e.g., by clicking on the user entry in the list) and transmit a direct communication to the selected user, which other users are inhibited from viewing.

Figure 3B:
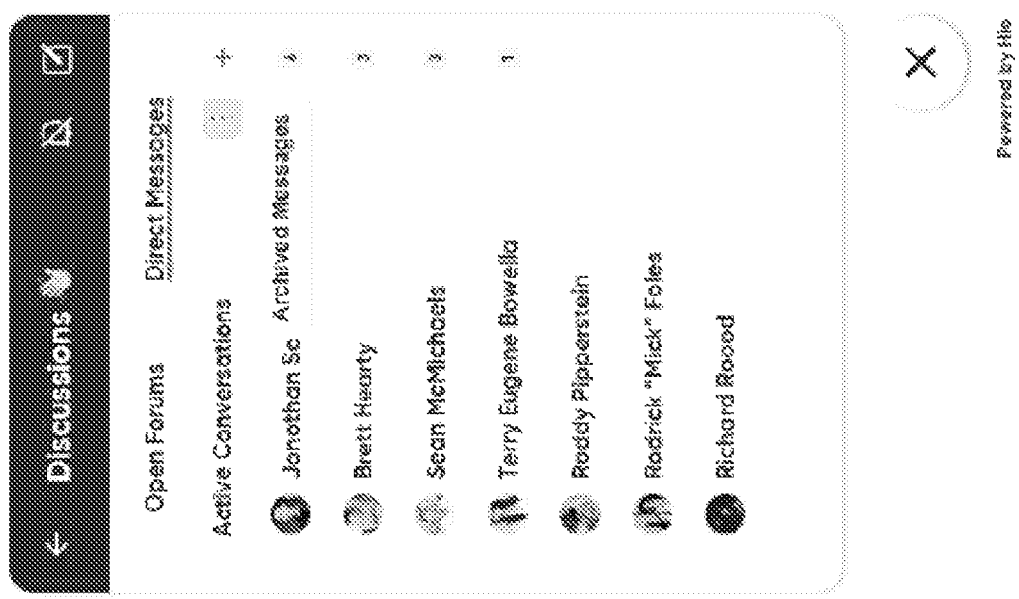

In addition, if the given user points at a user entry in the active conversations list (e.g., or hovering over the user entry in the list using a cursor being navigated using a mouse, trackpad, stylus, or other pointing device), a control, such as an archived messages control, may be presented as illustrated in FIG. 3B. In response to the given user selecting the archived messages control associated with the listed user, archived messages from prior conversations between the listed user and the given user may be accessed from system memory and transmitted to the given user's device for display, as illustrated in FIG. 3D. A field may be provided via which the given user can enter and transmit a new message to the listed user.

Figure 3C:
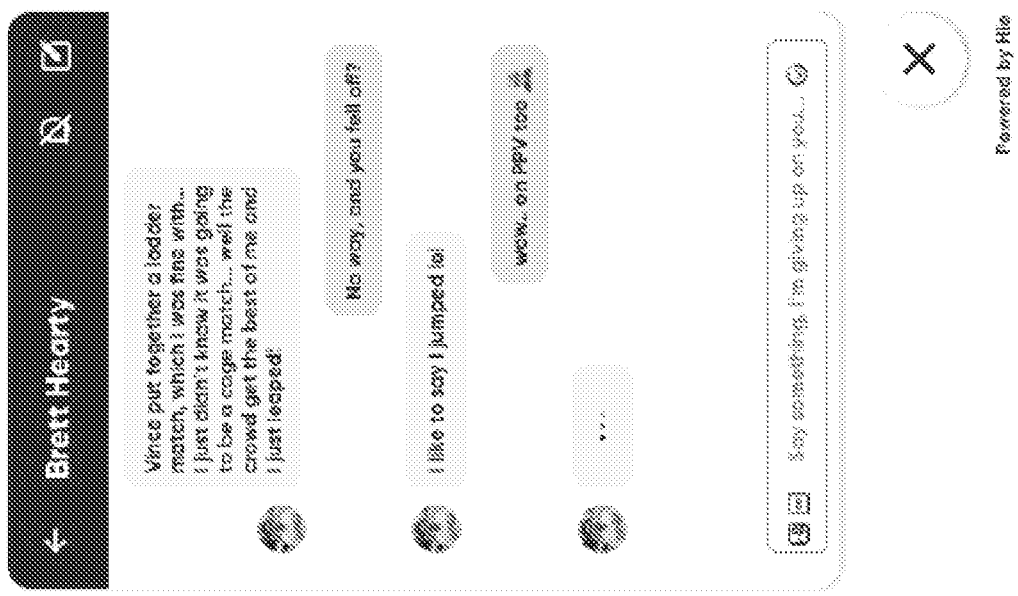
Figure 3D:
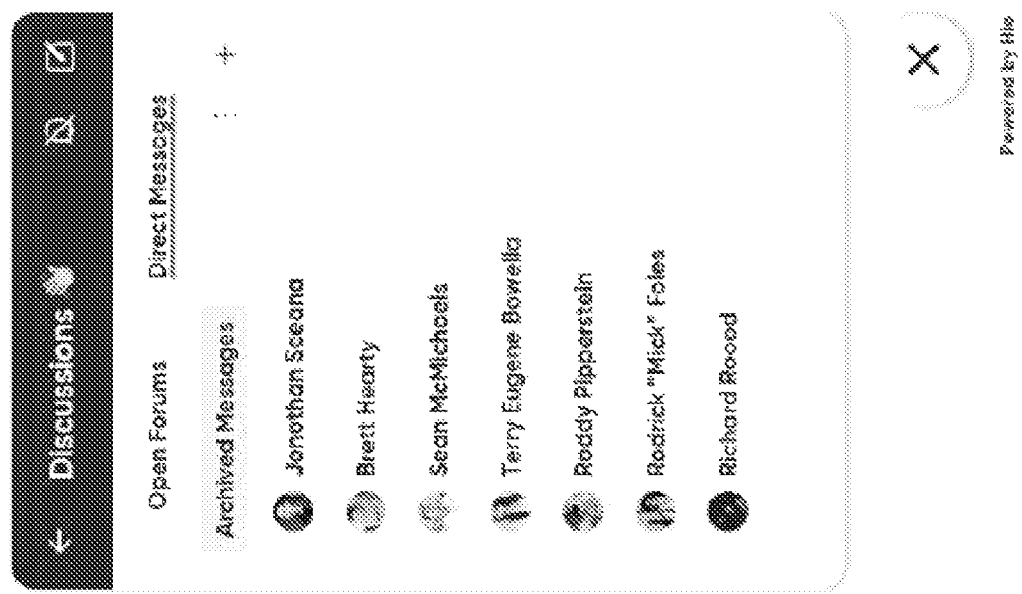

FIG. 3C illustrates a detailed chat conversation user interface depicting a chat conducted by the given user with a user selected from the conversation list. The detailed chat conversation user interface may include the name of the selected user at the top of the detailed chat conversation user interface, and an image associated with the selected user presented in association with messages composed by the selected user (where the message text may be displayed in a message frame, such as a bubble). Different colors or shadings may be used to distinguish the selected user's messages from the given user's messages. A field may be provided via which the given user can enter and transmit a new message to the selected user.

Figure 3E:
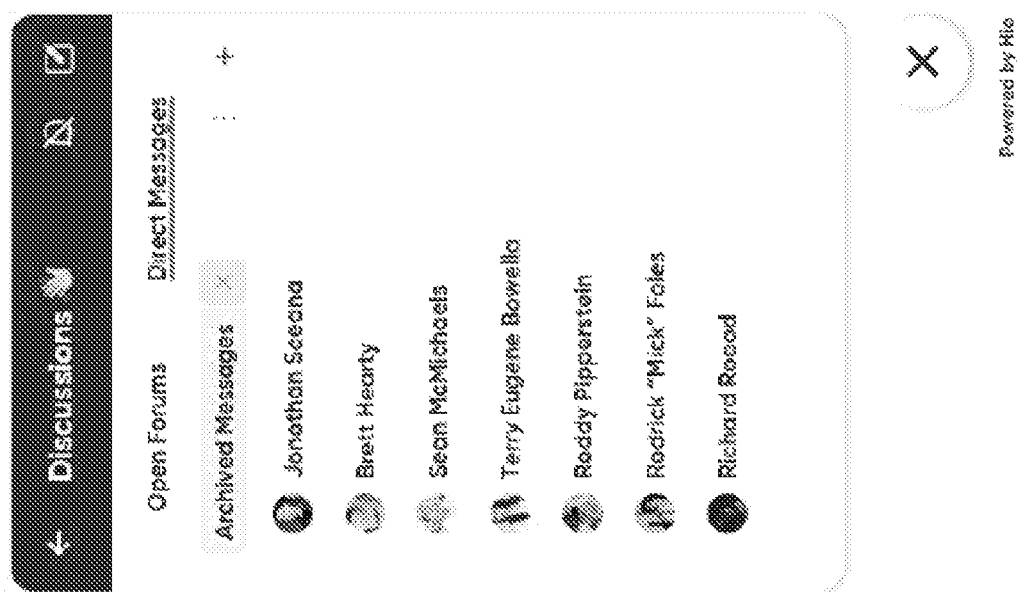

Referring to FIG. 3E, a list of users that have archived conversations with the given user may be displayed. Optionally the given user may select a listed user and delete archived conversation messages associated with the listed user or may delete of the user's archived messages.

Figure 3F:

Referring to FIG. 3F, an example recent network connections user interface is illustrated. As illustrated, there are user-selectable links to a "here now" user interface and a "connections" user interface, which will be discussed elsewhere herein. The illustrated interface lists other users with whom the given user has recently made a connection. An image associated with a corresponding user, a text identifier (e.g., first and last name, first name and first initial of last name, an alias, etc.), and profile information (e.g., place of employment, job title, school currently attending, preferred pronouns, and/or other information) may be displayed. In addition, an action user interface including controls may be provided via which the user may initiate a corresponding action. For example, the action controls may include a "jump to message" control, a view selected user's profile control, a send friend request control, a jump to subject thread (e.g., #clubs) control, and a mute notifications control. The "here now" and "connections" interfaces present similar data regarding listed users and provide similar action controls.

Figure 3G:
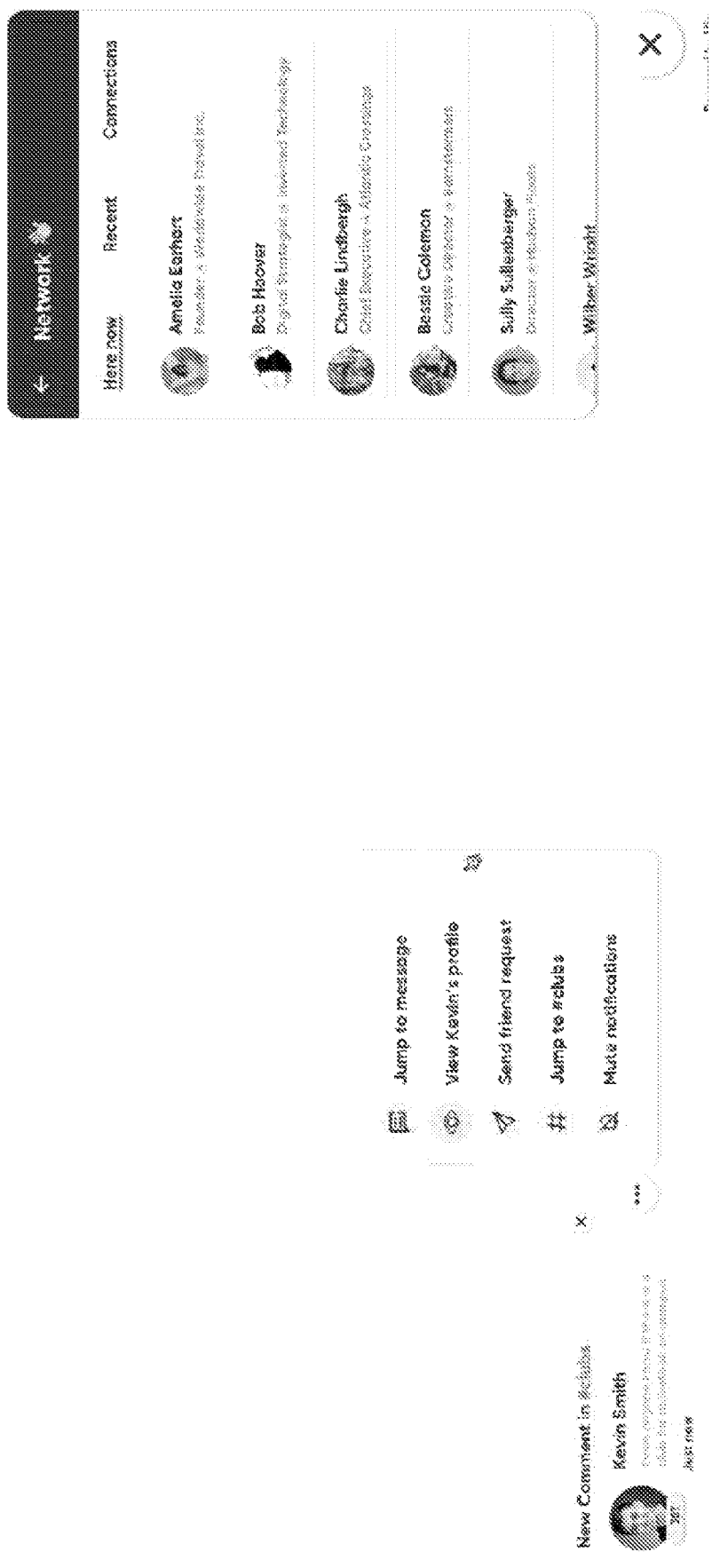

Referring to FIG. 3G, an example "here now" user interface is illustrated. The user interface may be accessed via the "here now" control/link discussed above. The interface lists users that are currently concurrently accessing the same network resource as the given user (active users). In addition, a pop up may display new comments posted by another user that the given user is networked with and/or for subject threads the given user has subscribed to.

Figure 3H:

Referring to FIG. 3H, an example "connections" user interface is illustrated. The user interface may be accessed via the "connections" control/link. In addition, a pop up may display new comments posted by another user that the given user is networked with and/or for subject threads of which the given user has subscribed to.

Optionally, a user may subscribe to a subject thread via a subscribe control. The user may optionally specify whether the user is to be notified by the multimedia communication system of all new postings to the subject thread while the user is visiting the network resource/website, all new postings to the subject thread made by connections (and not non-connections), or is not to be provided with any posting notifications. Such notifications may then be provided by the system, and the user may access and view the postings corresponding to the notifications. Optionally, a subject thread may be configured so that the administrator needs to approve a subscription request, and if such approval is not provided the user may be selectively inhibited from accessing the thread or may be allowed to access the thread but may be prohibited from posting to the thread.

Figure 3I:
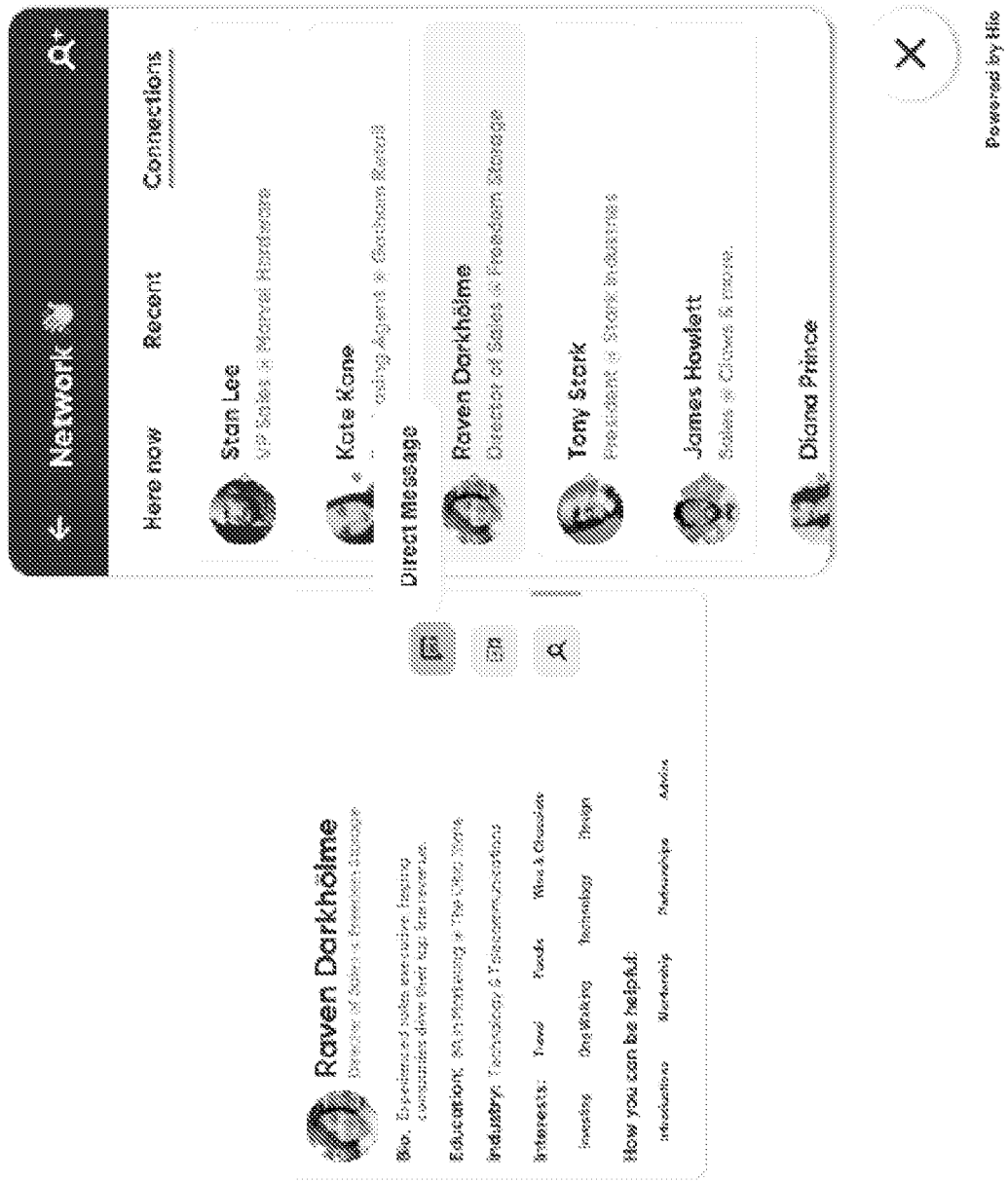
Figure 3J:
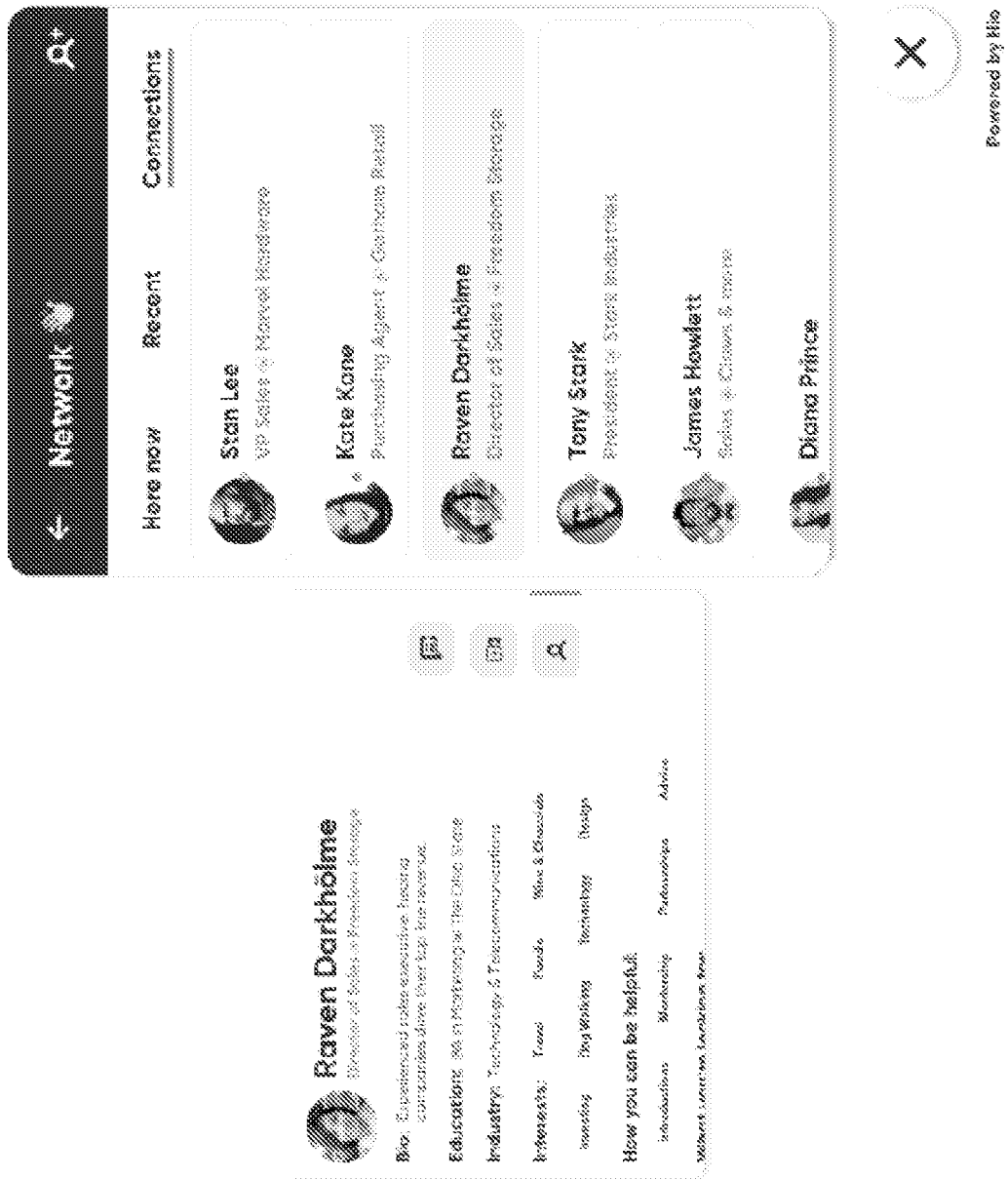

Referring to FIGS. 3I and 3J, an example "connections" user interface is illustrated, wherein in response to the given user selecting a user entry by pointing at a user entry in the connections list (e.g., or hovering over the user entry in the list using a cursor being navigated using a mouse, trackpad, stylus, or other pointing device), additional profile/content information may be presented (which may include private profile information not accessible by non-connections). For example, some or all of the following information may optionally be presented: name, image, place of employment, bio, education, interests (e.g., food, travel, wine, chocolate, sports, music, clothing, investing, design, pets, technology, cars, art, etc.), how the selected user can help others (e.g., provide business introductions, provide mentorship, provide advice, partnership, etc.), and/or other information. The given user, in viewing such context information may decide whether or not to enter into a communication with the selected user. Controls (e.g., a text chat control, a video chat control (which includes an audio channel), an audio chat control, etc.) may be provided via which the given user can initiate a conversation (e.g., via direct messaging) with the selected user via a desired communication channel. Optionally, the user may establish a communication session with multiple selected users (e.g., to establish a video conference).

Figure 3K:
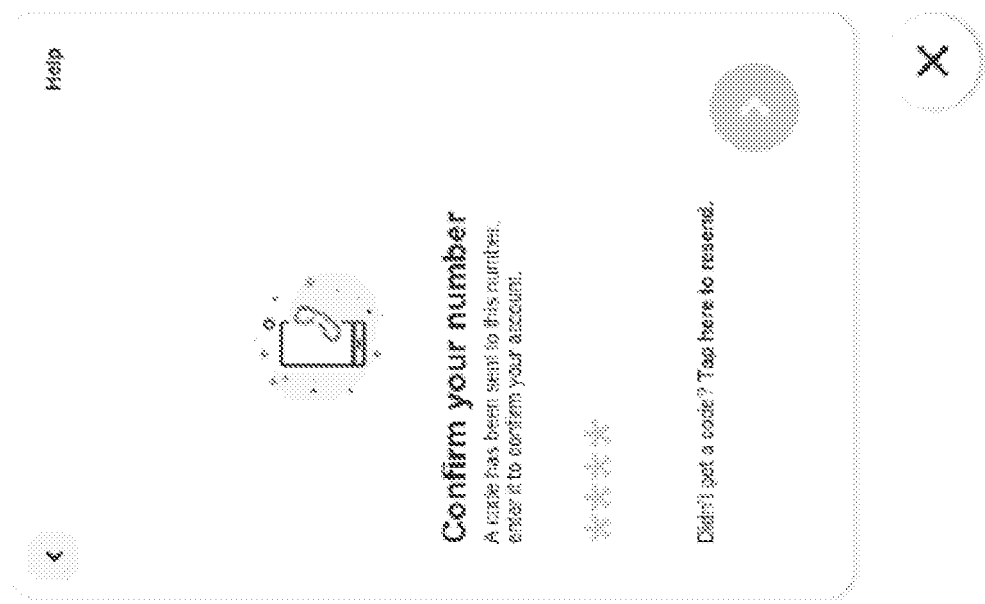
Figure 3L:

Referring to FIG. 3K, an example account confirmation user interface is illustrated. As discussed elsewhere herein, rather than using a password for authentication, a user may provide the user's phone number (via a user phone number field in a corresponding registration user interface) when creating or accessing an account. As depicted in FIG. 3K, a code may be transmitted as a text message to the phone number. The user then needs to enter the code via the user interface illustrated in FIG. 3K (as depicted in FIG. 3L) to confirm that the phone number actually belongs to the user. If user enters the correct code, the user may be authenticated and the account may be created (or the user may be logged in to the user's existing account). Otherwise, the account may not be created or the user may be denied access to an existing account associated with the phone number.

Figure 3M:
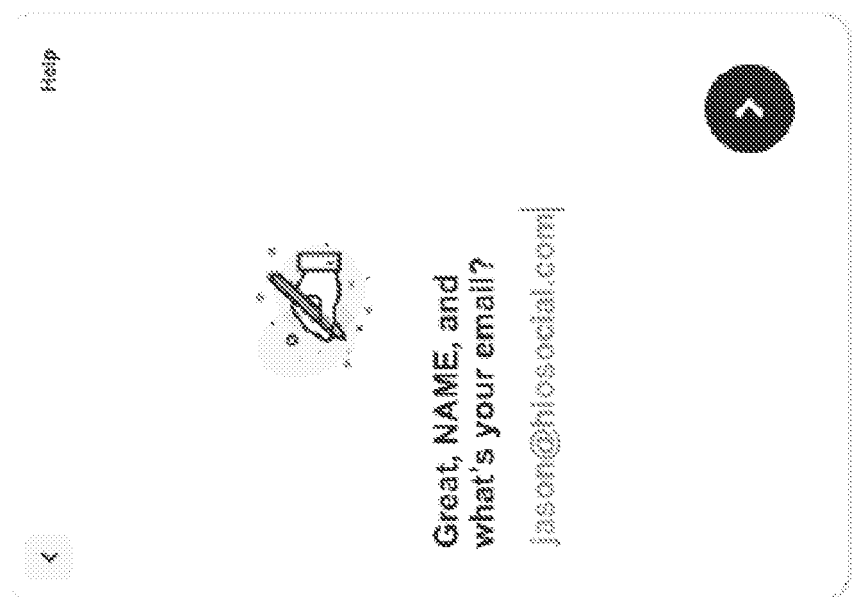

Once the user is authenticated, the user interface illustrated in FIG. 3M may be presented. The user interface may request additional information from the user, such as name and email address and provide fields for receiving such additional information (e.g., to establish an account record and user profile).

Figure 3N:
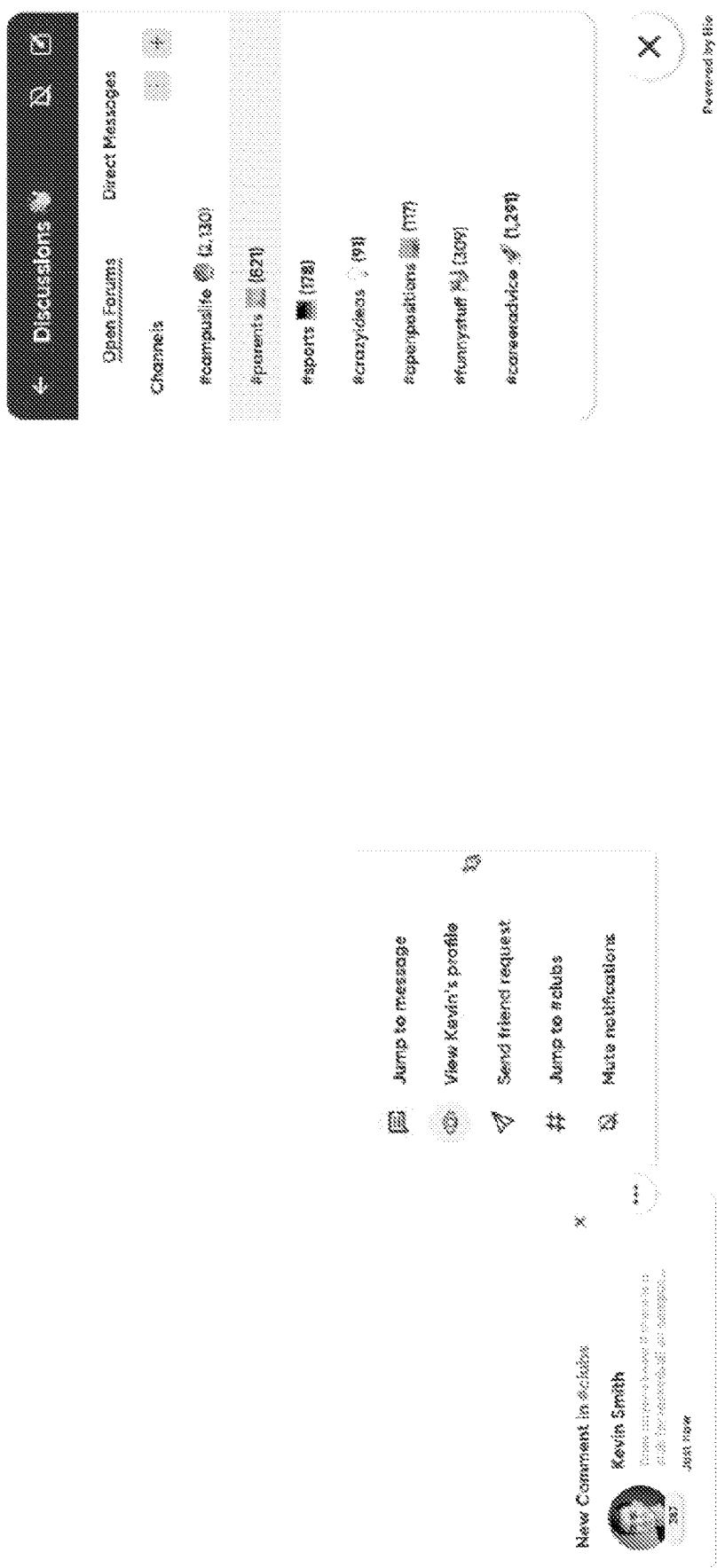

Referring to FIG. 3N, an example discussions user interface is illustrated. Available subject thread channels may be listed (where a given channel is directed to a corresponding subject, such as campus life, parents, sports, open positions, funny stuff, career advice, clothing advice, travel, pets, technology, etc.), including the number of participants and/or the number of postings (e.g., text, image, and/or video postings).

In response to the user pointing at or selecting a channel thread, the user interface illustrated in FIG. 3O may be presented, and corresponding recent posts (e.g., posts posted during the current browsing session, posts that the user has not yet viewed, posts posted within a threshold period of time, etc.) in the channel are displayed (e.g., in association with the number of reactions (e.g., likes, emoji postings, etc.), the number of replies, and/or other information). A field may be provided via which the user may enter and submit a post, which may be transmitted to the multimedia communication system and posted to the channel thread. As similarly discussed elsewhere herein, the action controls may be provided that include a "jump to message" control, a view selected user's profile control, a send friend (also referred to as a connection) request control, a jump to a specified thread (e.g., #clubs) control, and a mute notifications control.

Figure 3P:

FIG. 3P illustrates a user interface listing open forum discussion threads (sometimes referred to as channels) and the number of posts for a given forum. The user may select, access, and view posts for a given open forum, and may enter and submit a post, which may be transmitted to the multimedia communication system and posted to the open forum thread.

In addition, the multimedia communication system may enable users to schedule a group visit to a website, where each user may view the same content (e.g., webpage) at the same time. Optionally, a member of the group or a website administrator may be designated as a group leader. The group leader may navigate to different content (e.g., webpages) on the website and the other group members may be presented with the same content via their respective browsers. Optionally, the group may be broken up into subgroups, where a group leader assigns members of the group to different subgroups or where a given group member can elect to join a subgroup. Optionally, different subgroups may be assigned or may elect their own subgroup leader. The different subgroups may separately navigate the website, so that different subgroups may be accessing different website webpages. Optionally, a user interface may be provided via the system (e.g., via the widget) to members of one group or subgroup showing what content (e.g., what website webpage) one or more other groups or subgroups are accessing. Optionally, the members of the group or subgroup may navigate to the content being accessed by one of the other group or subgroups. Optionally, the system provides a user interface showing an individual user, a subgroup, or a group showing what content (e.g., what website and/or webpage) one or more other groups or subgroups are accessing.

FIGS. 4A-4E6 illustrates various aspects of systems, applications, and processes. Referring to FIG. 4A, a functionality map is provided for certain services provided to users (e.g., via user interfaces presented via a widget, browser extension, or otherwise). The user network/connection function may provide: a "here now" user interface that provides a list of currently active, online users accessing a network resource (e.g., a website); a list of users that recently (e.g., within a threshold period of time, such as 12 hours, 24 hours, etc.) accessed the network resource but are not currently accessing the network resource; and/or a list of other users that the user has already established a connection with.

The user chat/discussion function may provide: a user interface listing channels (e.g., subject threads) which may be established and/or managed by an administrator associated with the network resource (where the number of posts or comments may be displayed in association with a given channel); and a direct message user interface which may list a compilation of some or all of the direct messages sent or received by the user via the system (where the direct messaging rules may be specific to a given website).

The tables function (which may also be referred to as a subgroup function, where multiple users may conduct a live chat session, such as a video chat session, and where the number of table participants may be limited to a specific maximum number) may provide: a list of currently available "tables" of a certain number of users (e.g., where a table may have 2, 4, 6, 8, or other number of users greater than 1) that the user may join (e.g., for a video, audio-only, and/or text chat session); and an upcoming tables user interface listing when the tables are scheduled for, and indication as to whether the table chat session will be moderated by a host, whether the tables have a specified discussion topic, etc.

The groups function provides a user interface that may enable users to co-browse a website (such functionality may be provided via the tables, direct messaging, and/or channels/threads functionality). The announcements function provides a user interface that enables the operator of the network resource (e.g., a website) to post information on news, releases, updates, sales, coupons, and/or the like for users to access and view. The FAQs and tutorial function may provide a user interface enabling a user to access and video answers to frequently asked user questions and to tutorials on the use of functionality described herein.

Figure 4B:
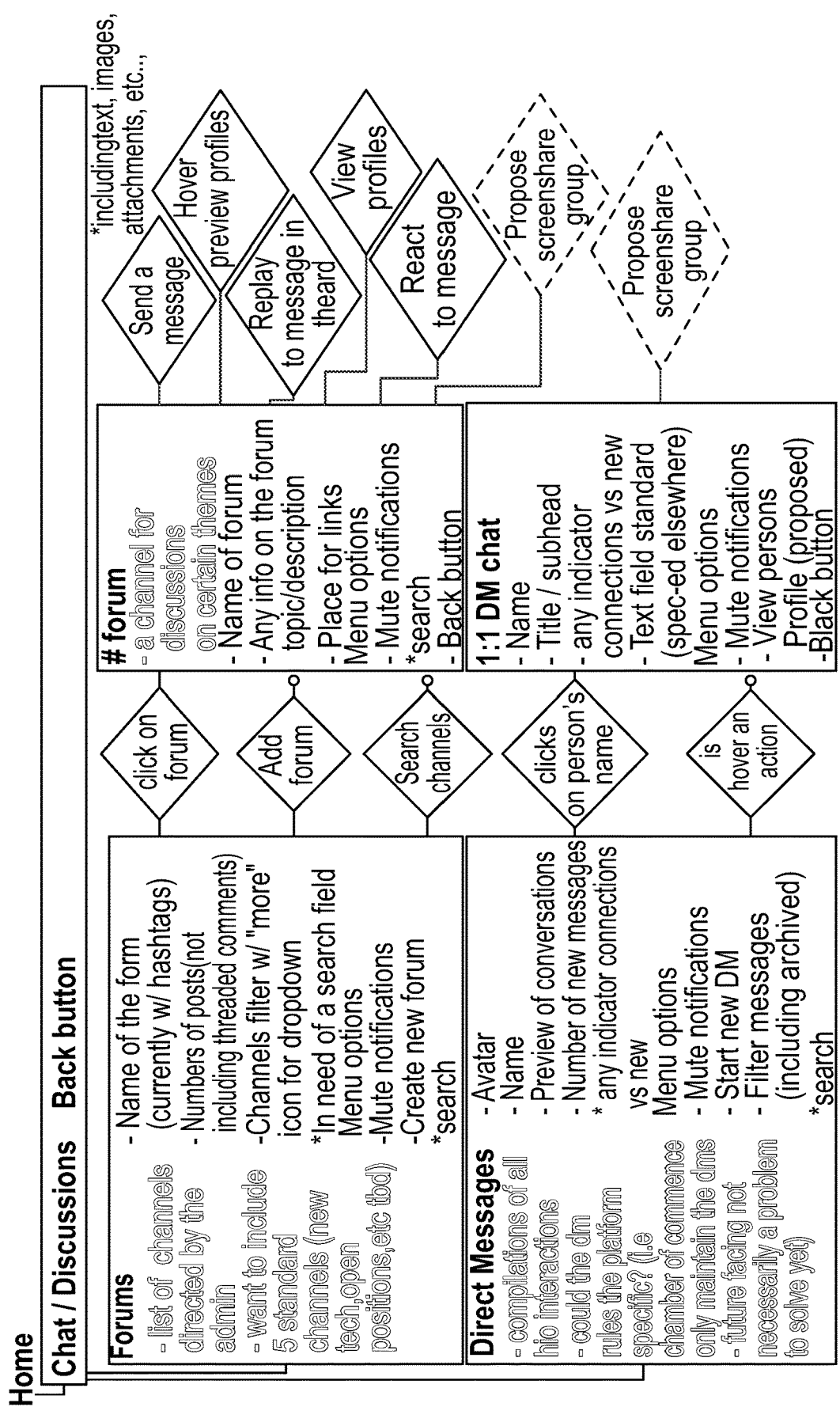
FIGS. 4A-4E6 illustrates various aspects of systems, applications, and processes.
Figure 4C:
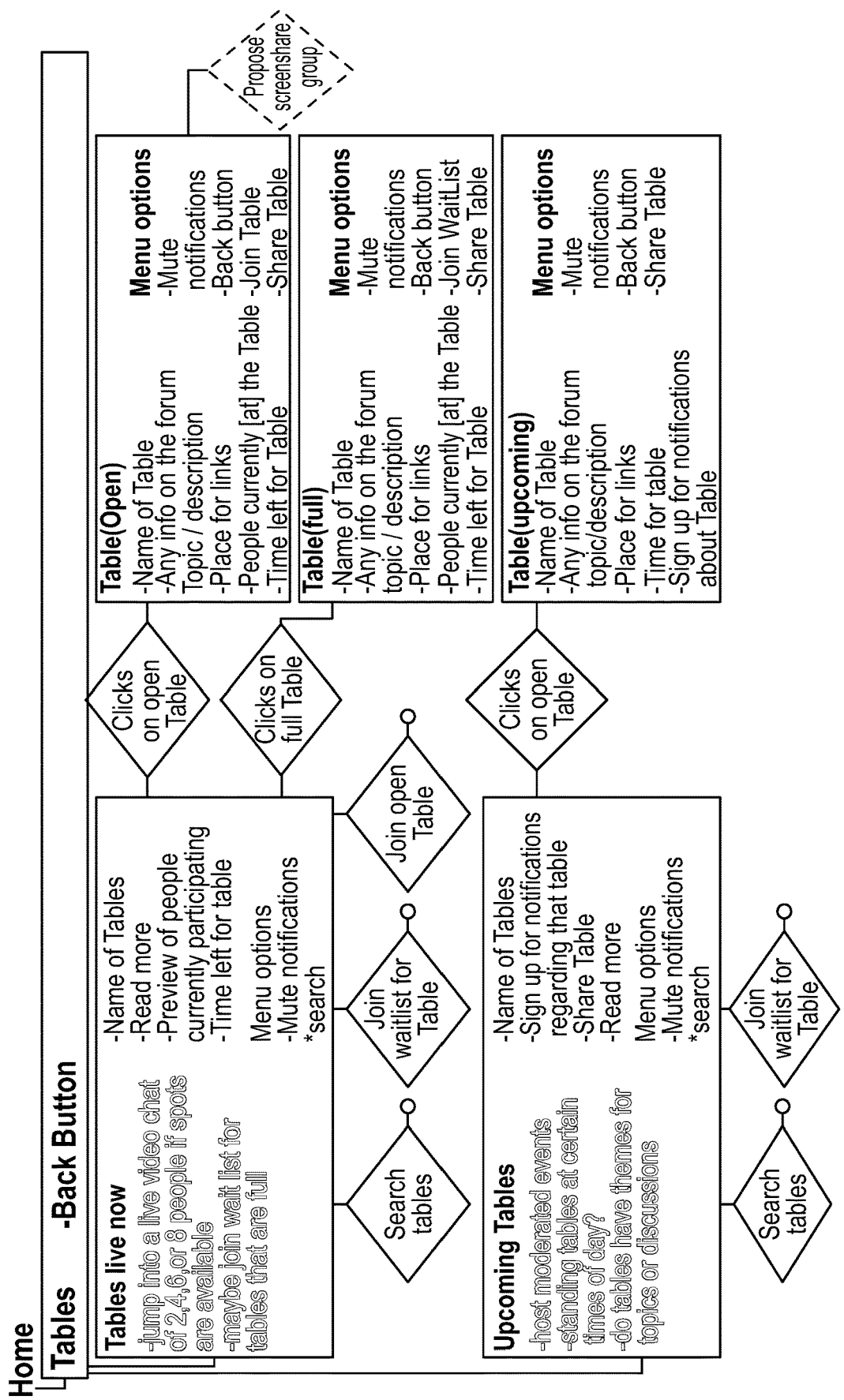
Figure 4D:
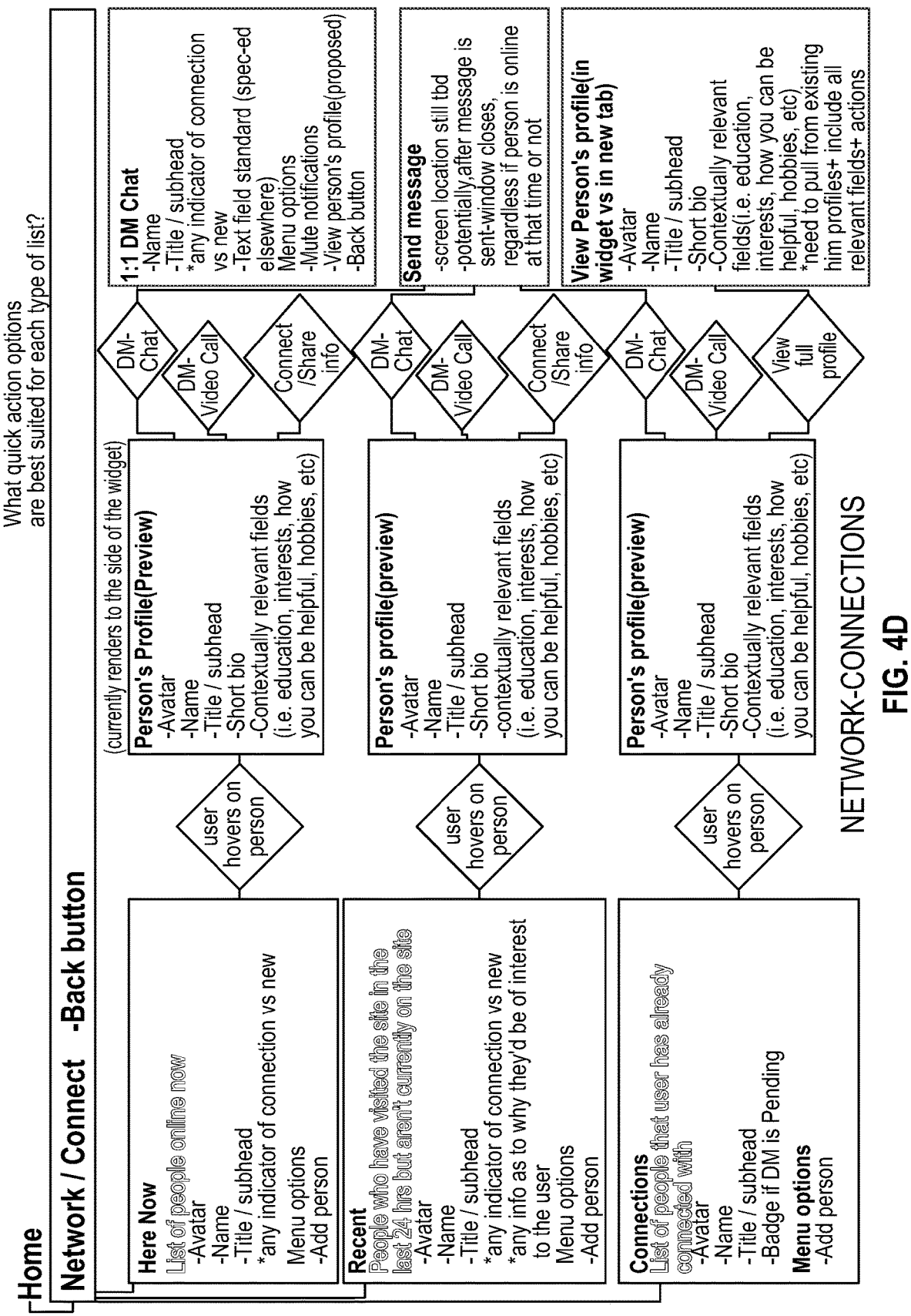

FIG. 4B illustrates the chat/discussion functionality in greater detail. FIG. 4C illustrates the tables functionality in greater detail. FIG. 4D illustrates the networking/connections functionality in greater detail. FIGS. 4E1-4E6 illustrate example widget user interface flows.

Additional user interfaces presented on a user device will now be described. Certain data in the user interfaces may be populated in real time by the multimedia communication server system and user inputs may be communicated from the user device to the multimedia communication server system which may store and process the user inputs.

Figure 5A:

FIG. 5A illustrates an example user interface providing a reminder to a user regarding an online event that the user has signed up for. The user interface may be populated with the number of days until the event (which may be populated using a remote or local electronic calendar) and the name of the online event.

A network module of the user interface enables the user to access a network user interface that enables the user to connect with other event attendees. The network module displays the number of event attendees currently online and available to network with. Such networking may include connecting with one or more of the online fellow online event attendees, communicating with one or more of the online fellow online event attendees (e.g., via text, video/audio, or audio only chat), and/or the sharing of social profiles from one or more social networking sites. A view all control, when activated, enables the user to access the network user interface and view which attendees are online.

A connections module of the user interface enables the user to access a connection user interface that enables the user to connect with the user's connections. The connections module display the number of connections that are currently online. A view all control, when activated, enables the user to access the connections user interface and view which connections are online.

Figure 5B:
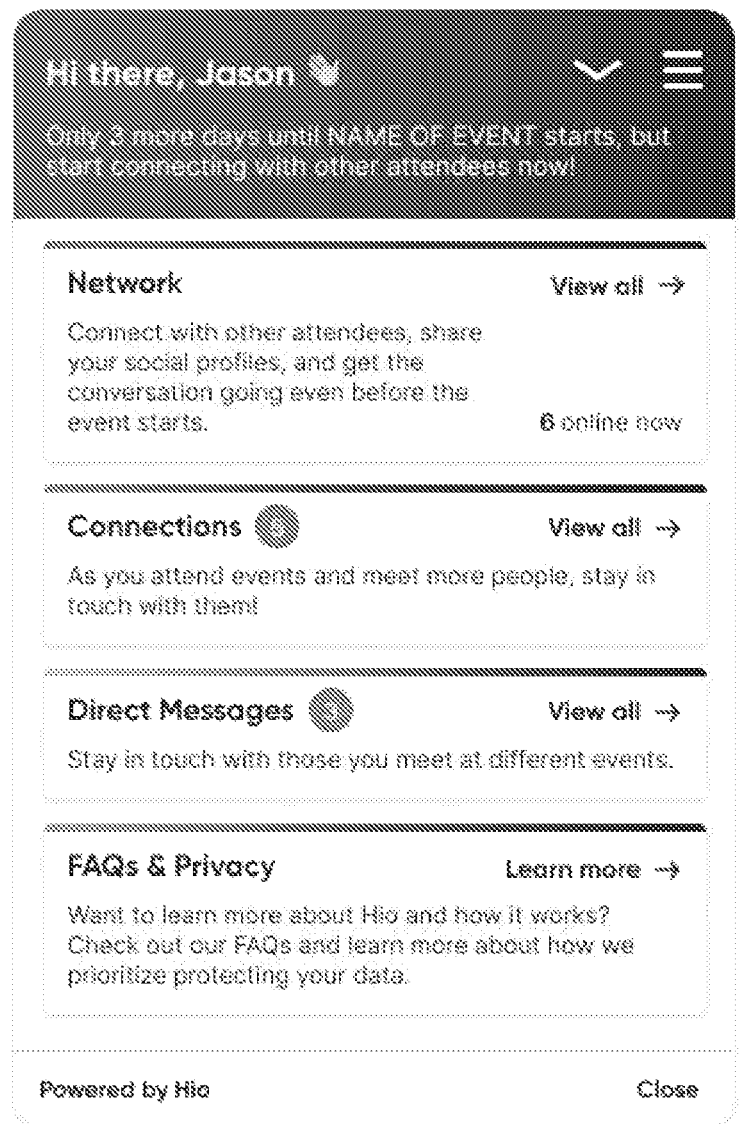

A speakers module lists one or more speakers for the online event, and provides a brief biography or curriculum vitae of one or more speakers and optionally includes a photograph or avatar of a given speaker. A view all control, when activated, enables the user to access a list and brief biography or curriculum vitae of all the scheduled event speakers. If there are no speakers at the event, the speaker module may be excluded, as illustrated in FIG. 5B.

A direct messages module provides access to a direct messaging user interface that enables the user to direct message other users, in a one-to-one fashion, that the user met at prior online events. The direct messages module displays the number of unread directed messages to the user. A view all control, when activated, enables the user to access direct messaging user interface and view the users that the user has attended events with.

A FAQs & privacy module provides access to frequently asked questions (FAQS) and answers thereto, and a privacy policy of the website operator.

Figure 5C:
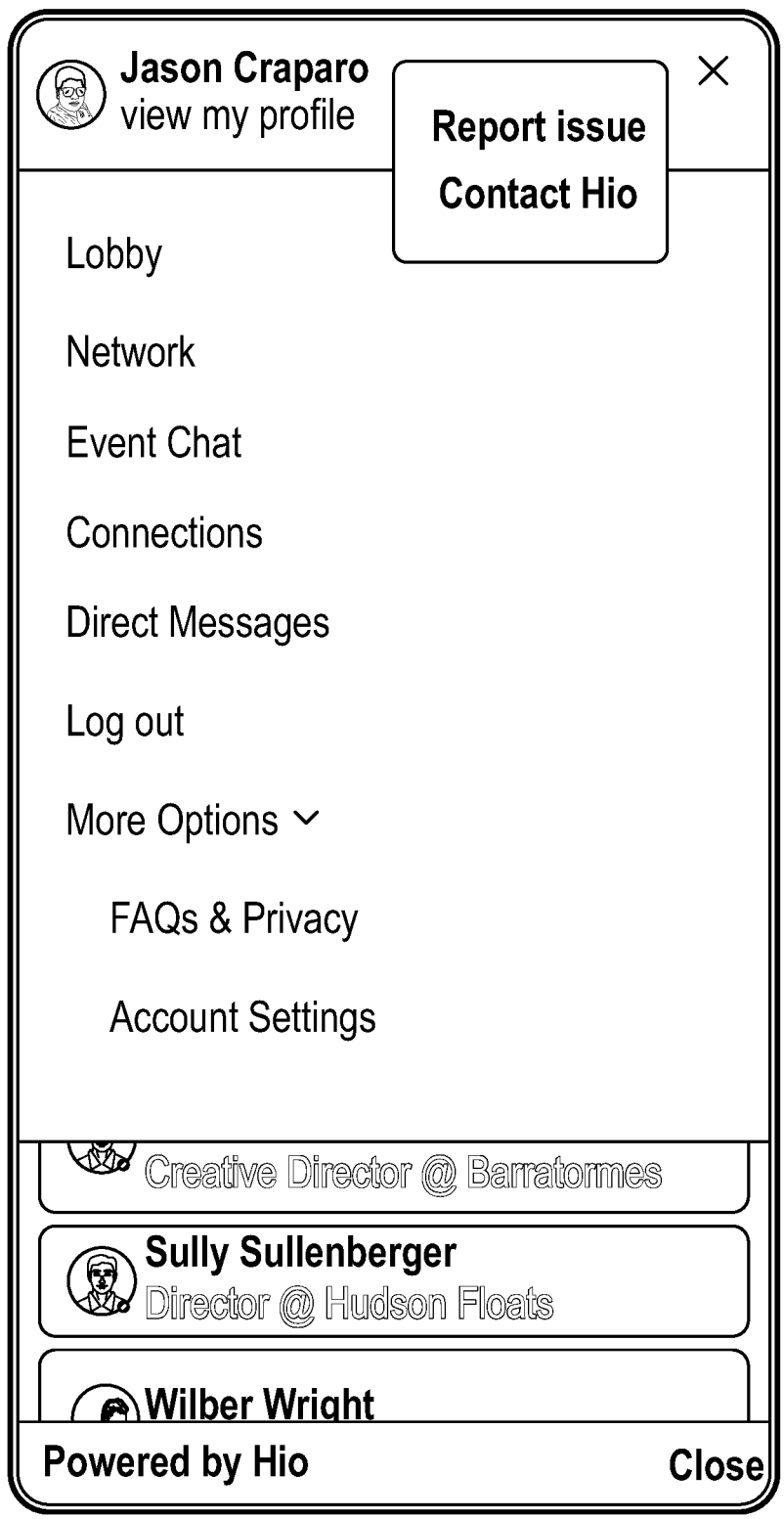

FIG. 5C illustrates an example network user interface that lists the event attendees currently online and available to network with (e.g., including name, job title, company at which the attendee is employed, and/or a photograph or avatar). A dropdown menu is provided via which the user can navigate to other user interfaces, such as those discussed herein.

A user interface may be provided enabling the user to access user interfaces corresponding to a virtual event virtual lobby, the network user interface, an event chat user interface, the connections user interface, the direct messages user interface, a log out user interface, the FAQs & privacy user interface, and the accounts setting user interface.

An interface may be provided that enables the user to report an issue or contact the operator.

Figure 5D:

FIG. 5D illustrates an example profile user interface including name, job title, company name, social media link(s), phone number, biography, industry-field, and interests.

Figure 5E:
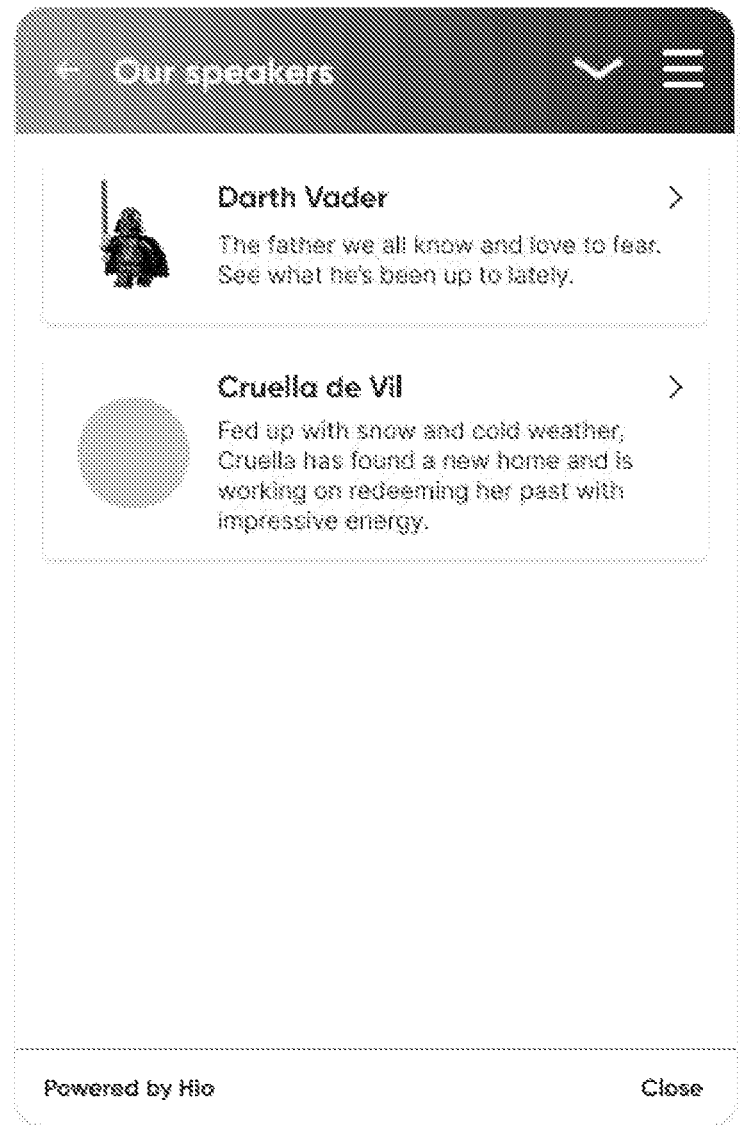

FIG. 5E illustrates an example speakers user interface, listing the names, images, and brief biography of the online event speakers. Controls may be provided in association with respective speaker entries, which when activated, navigates that the user to a user interface that provides additional speaker information (e.g., a more extensive biography, contact information, and/or other data).

Figure 6A:
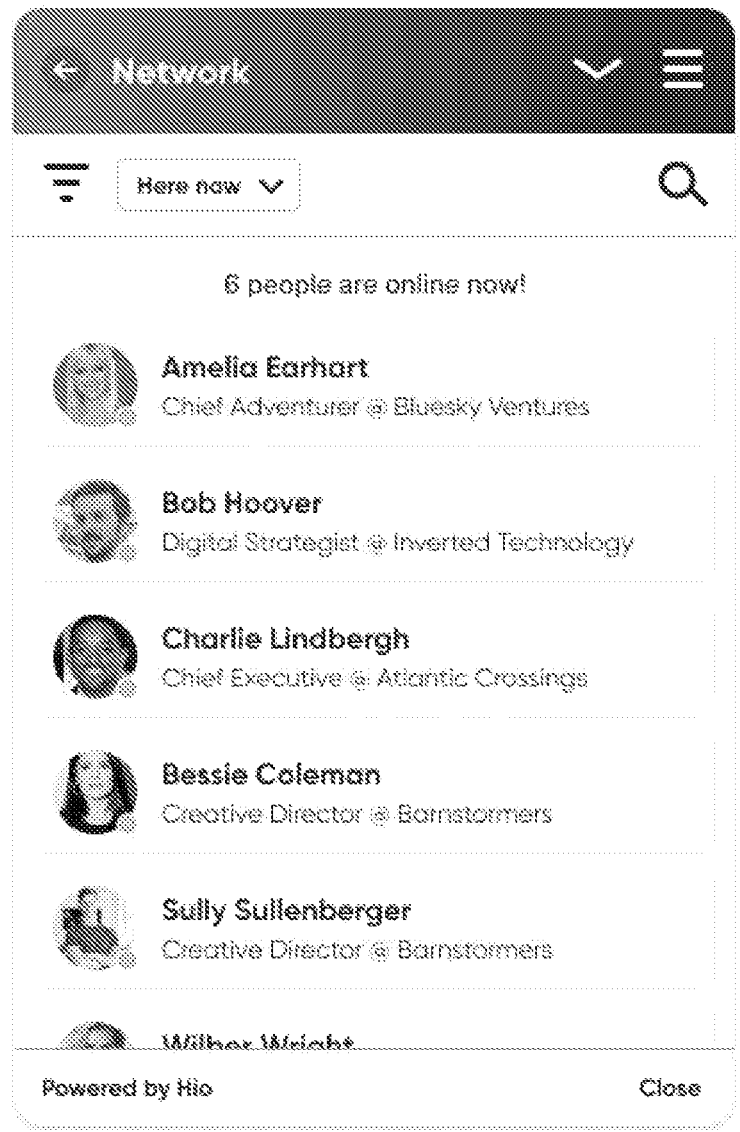

Referring to FIG. 6A, an example network user interface is illustrated. The network user interface is in a "here now" mode (where the mode may be selected via a mode user interface providing "here now", "recent", and "both" options) listing all event attendees that are currently online (e.g., including name, job title, company at which the attendee is employed, a photograph or avatar). The user may select a listed attendee, and additional attendee data may be presented, and controls may be provided via which the user may connect with and/or direct message the attendee.

Figure 6B:
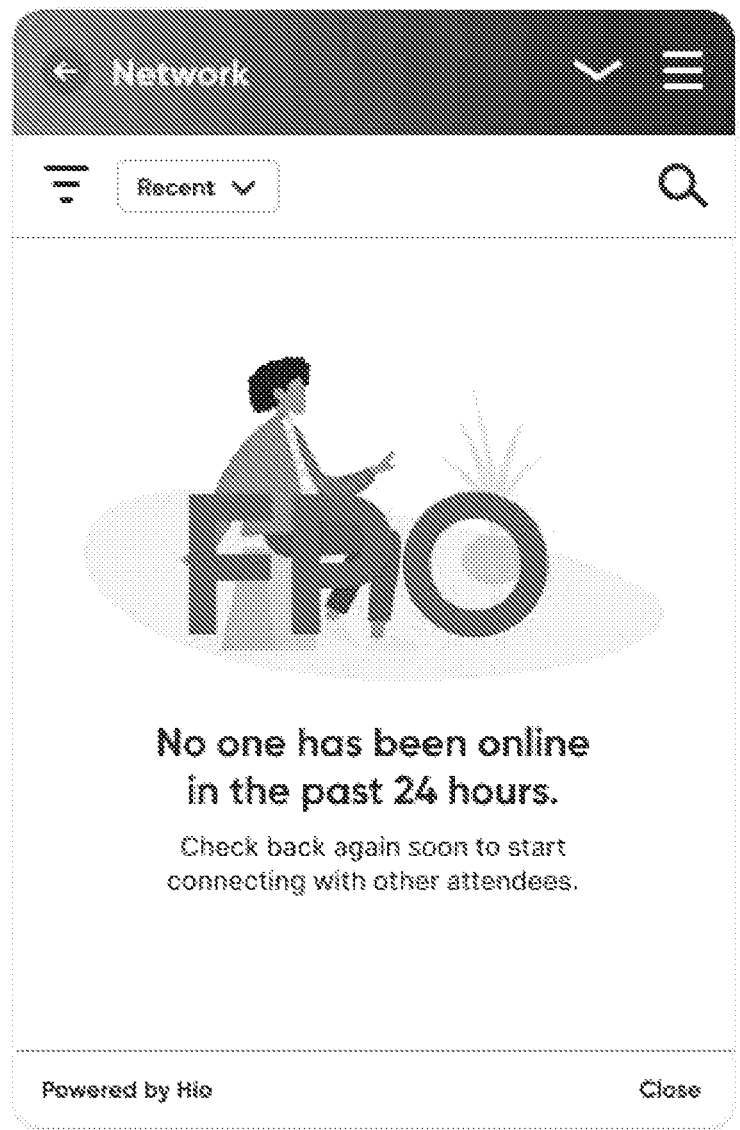

FIG. 6B illustrates the example user interface of 6A, with the mode set to "recent". The recent mode will list those attendees that were recently online (e.g., in the past 24 hours or other time period) but that are not currently online. In this example, the user interface reports that no attendee has been online in the past 24 hours.

Figure 6C:
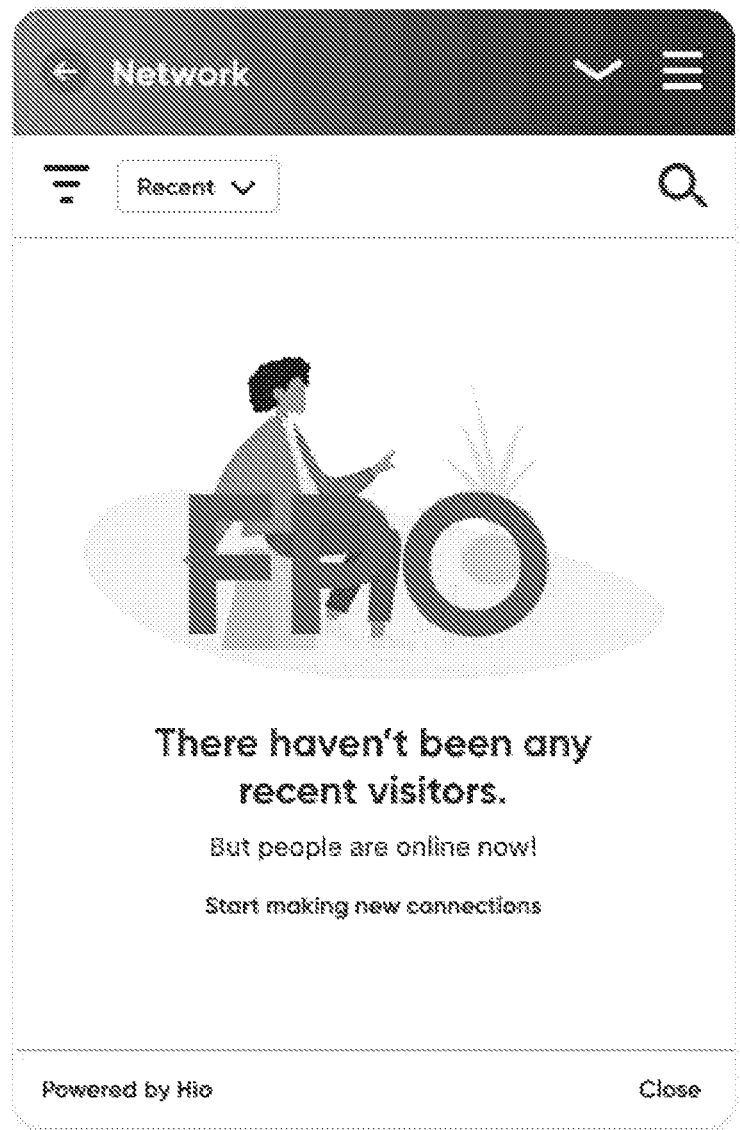

FIG. 6C illustrates the example user interface of 6B, except in this example, although the user interface reports that there have been no recent visitors, it further reports that other users are currently online and available to make connections with.

Figure 6D:
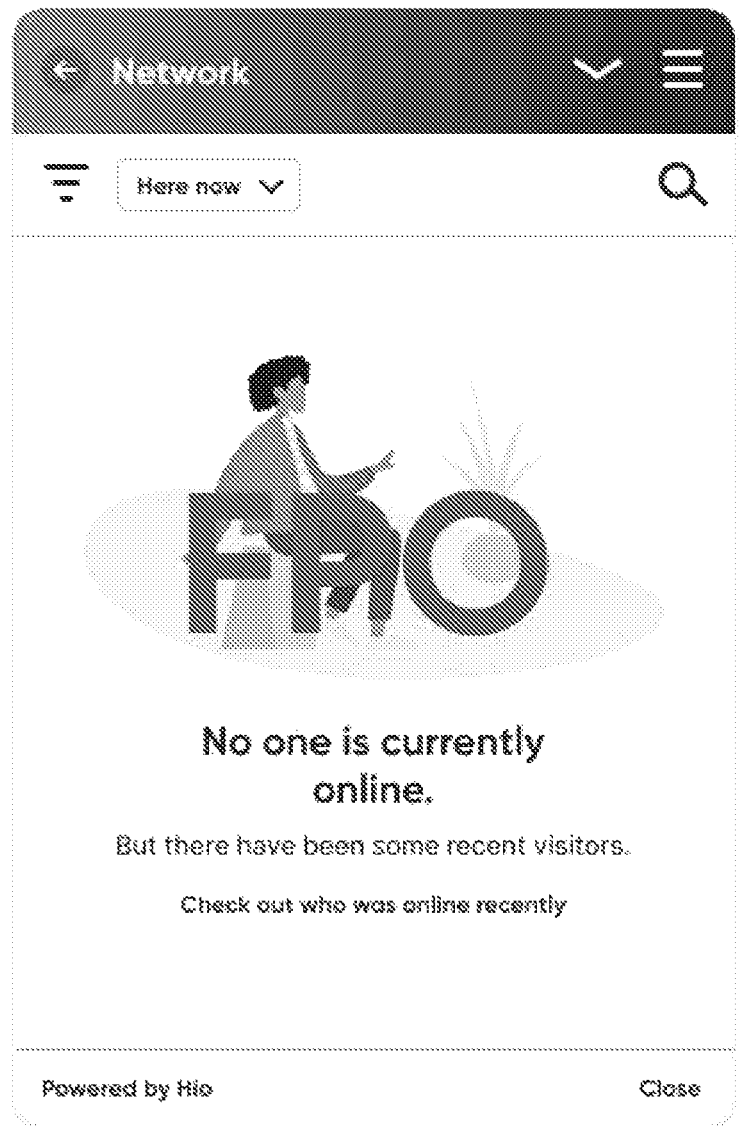

FIG. 6D illustrates the example user interface of 6A, except in this example, although the user interface reports that no one is currently online, it further reports that there have been recent visitors.

Figure 6E:
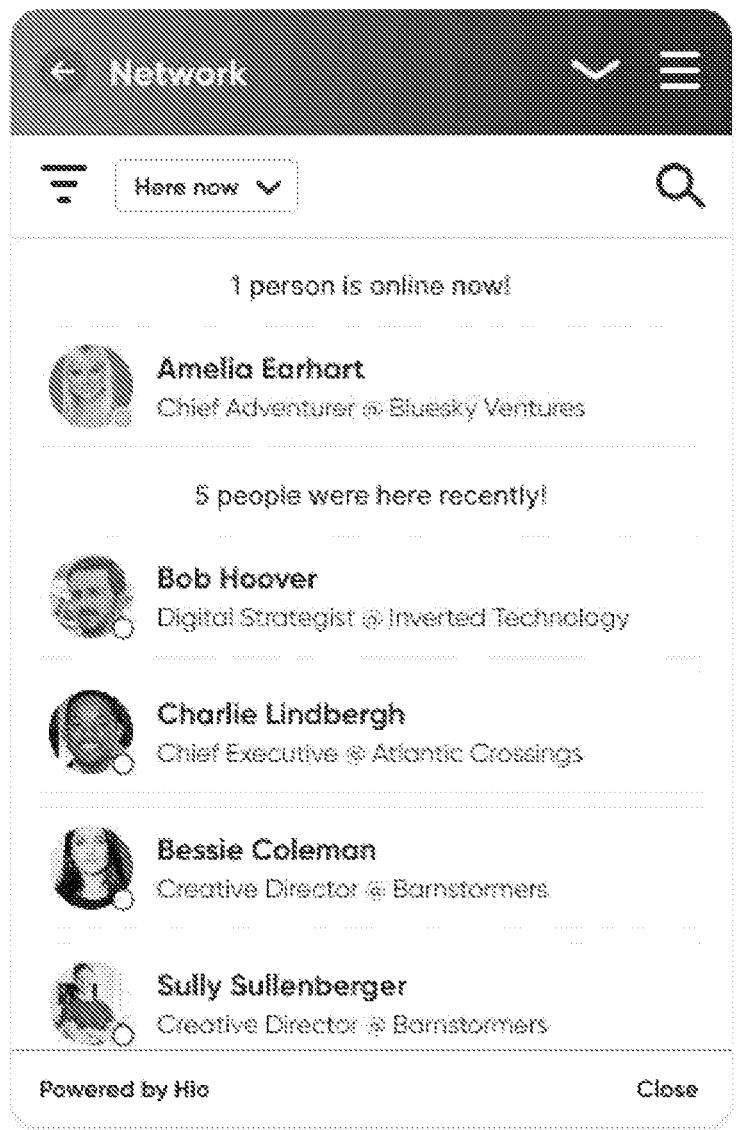

FIG. 6E illustrates the example user interface of 6A, identifying the attendees that are currently online (one person in this example), and further identifies attendees that have recently been online (e.g., including name, job title, company at which the attendee is employed, a photograph or avatar). Thus, the example user interface provides both the users that are "here now" and that were "recent."

Figure 6F:
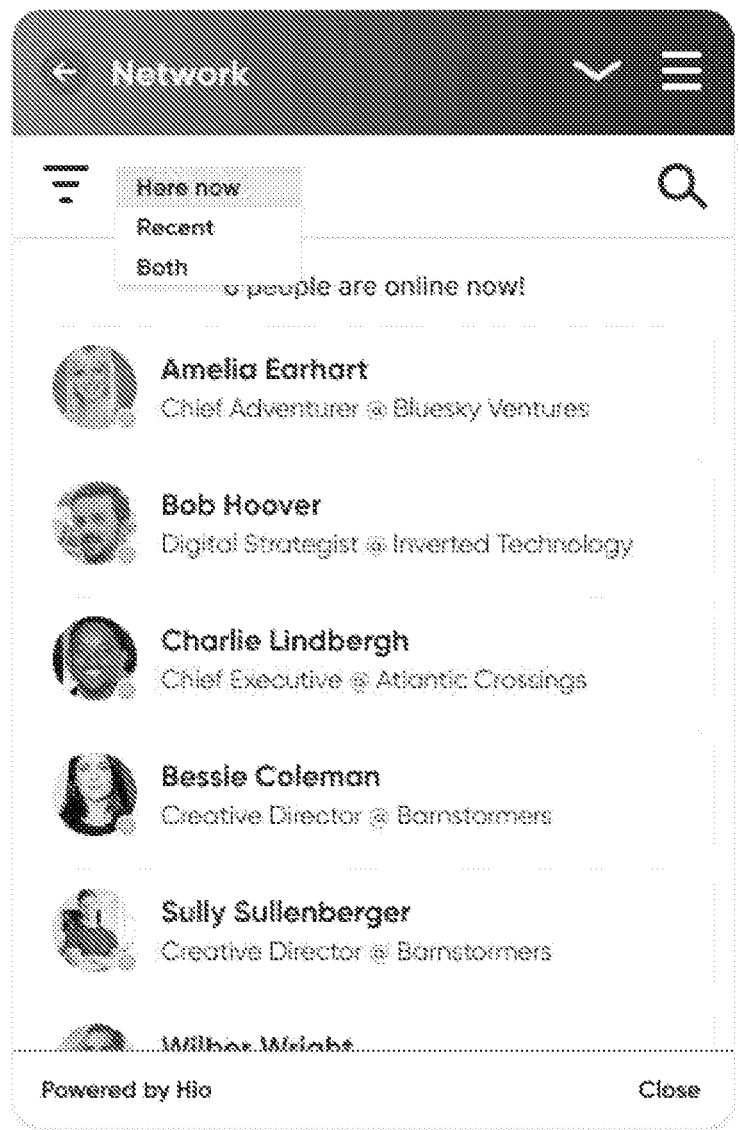

FIG. 6F illustrates a drop down menu enabling a user to select which types of users are to be displayed: those who are currently online at the website ("here now"), those that were recently online at the website but are no longer online at the website ("recent"), or both ("both").

Figure 6G:
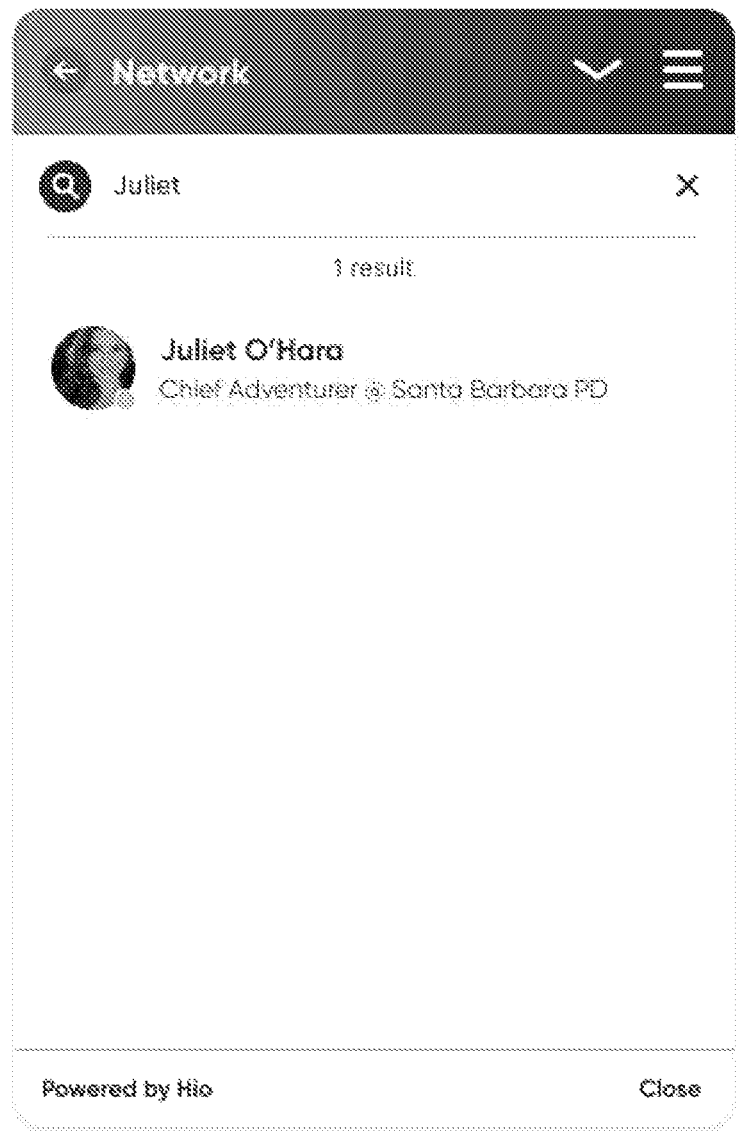

FIG. 6G illustrates an example search network user interface that enables a user to submit a search query term, which is received by a search engine remote from the user device which identifies matching users in the network, and returns search results comprising the matching users, ranked in accordance with the closeness of the match. Optionally, the search engine may perform an incremental search, where, as the user is typing search term characters the search engine identifies matches in real time and present search results, where the search results may be modified with each character entered by the user. In the illustrated example, a single search result is found, and the search result includes the name, job title, company, and a photograph or avatar of the matching user.

Figure 6H:
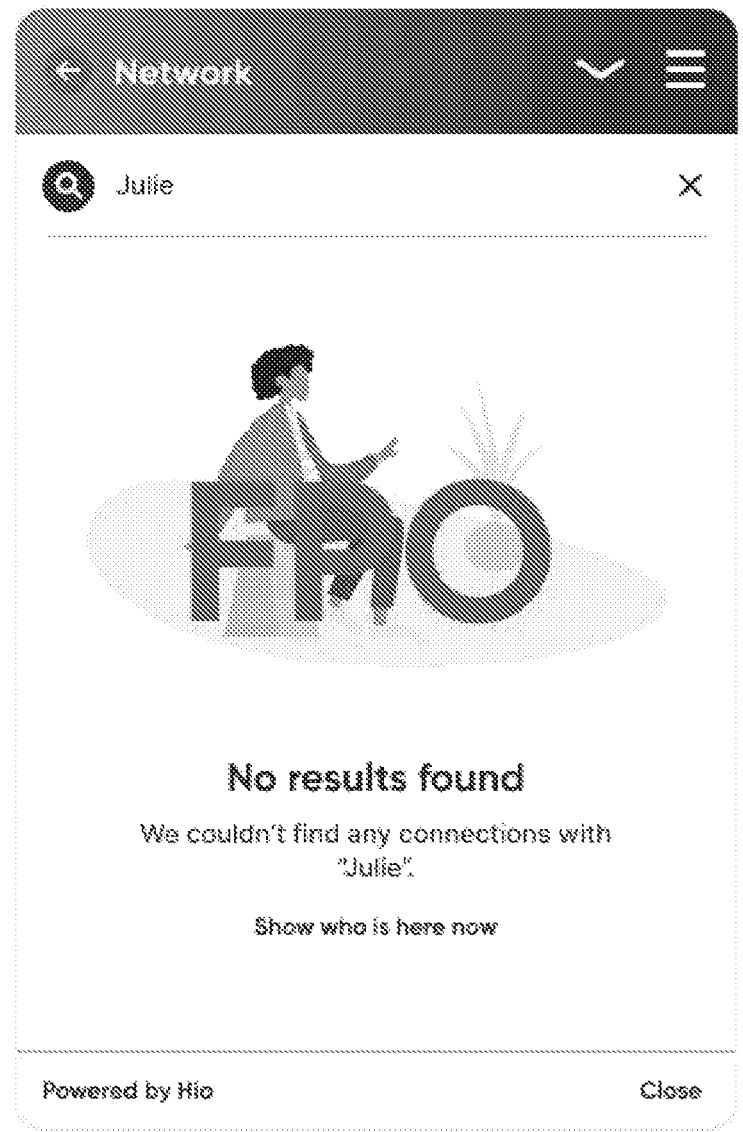

FIG. 6H illustrates the search network user interface of FIG. 6G, except in this example, the user interface reports that no matches have been found, and provides a link which when activated causes a user interface to be displayed listing who is currently on line.

Figure 7A:
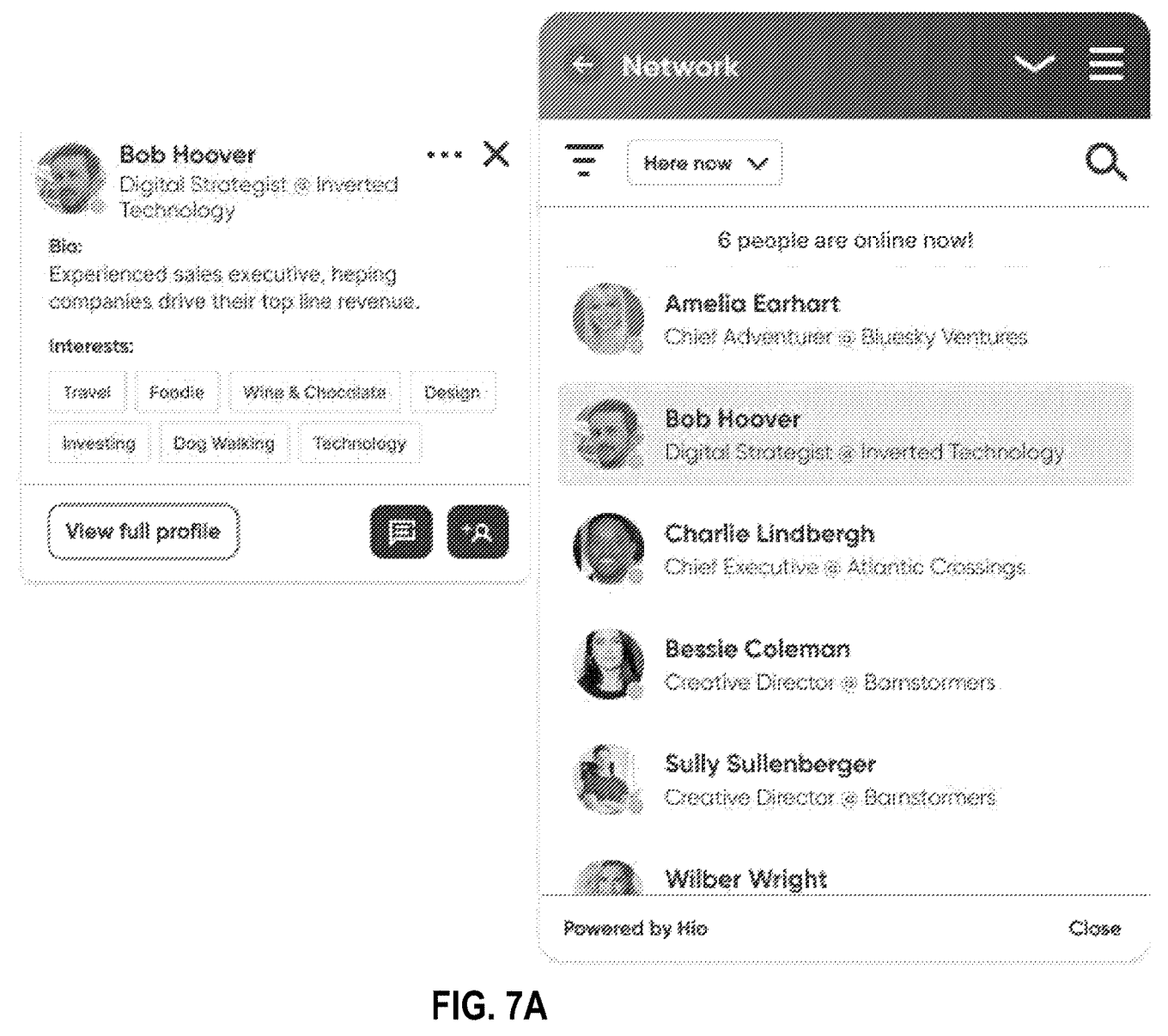

FIG. 7A illustrates an example profile user interface that may be displayed in response to the user hovering a cursor or otherwise pointing at an entry in a listing of user's that are currently online (and may similarly be displayed with responding to other listings of users). The profile may pop-up over or adjacent to the listing and may include an "X" control that when activated by the user will cause the profile to be closed so that it is no longer displayed.

Figure 7B:
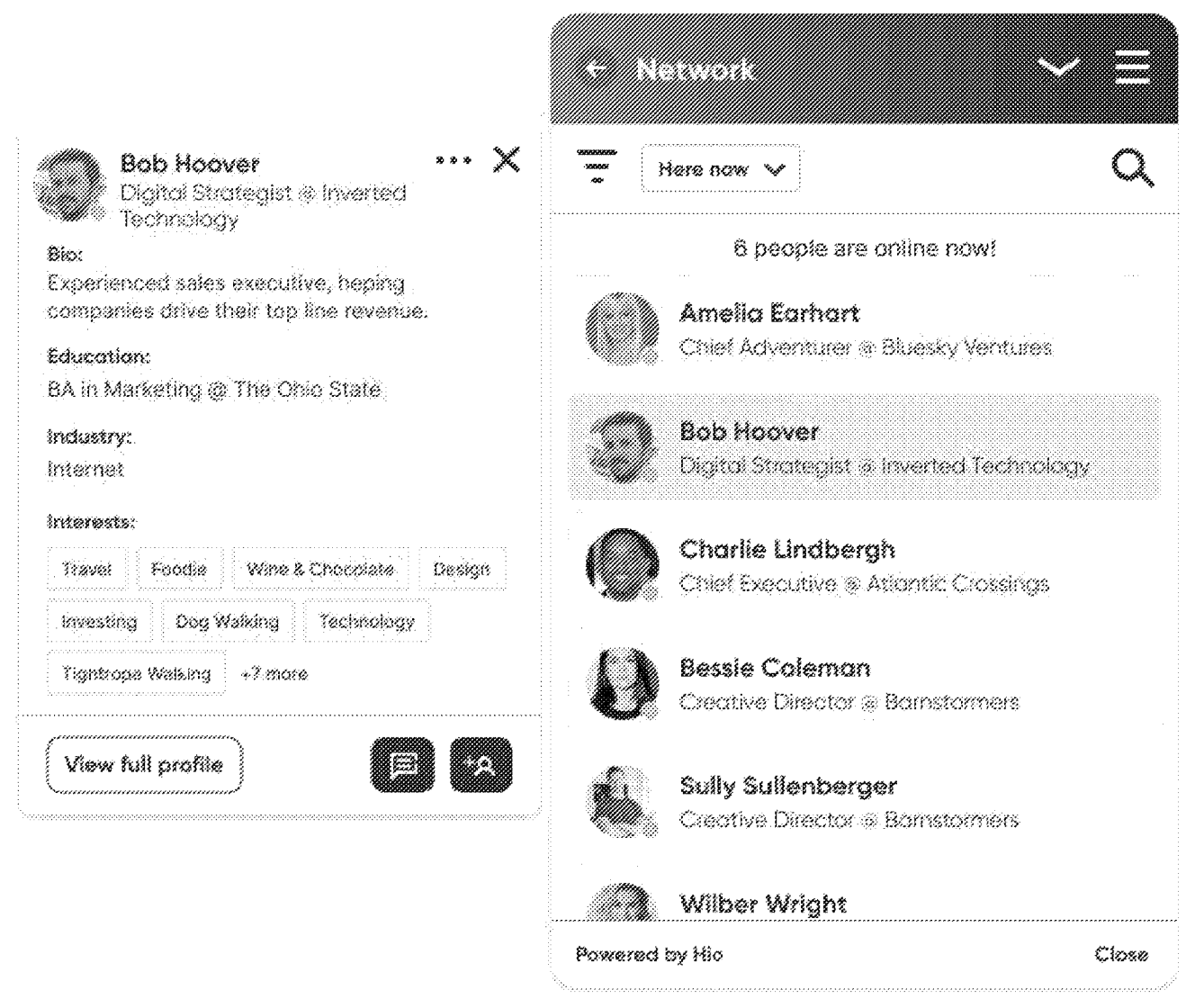

The example profile user interface provides user data including name, job title, company name, social media link, phone number, biography, industry-field, and interests. Controls may be provided via which the user can chat (e.g., video, audio, and/or text chat) with the user whose profile is presented or make a connection with such user. A view full profile control is provided which when activated, causes the full profile, an example of which is illustrated in FIG. 7B to be presented. In this example, in addition to the information provided via the profile in FIG. 7A, the full profile may include educational accomplishments, industry, and additional interests.

Figure 8A:
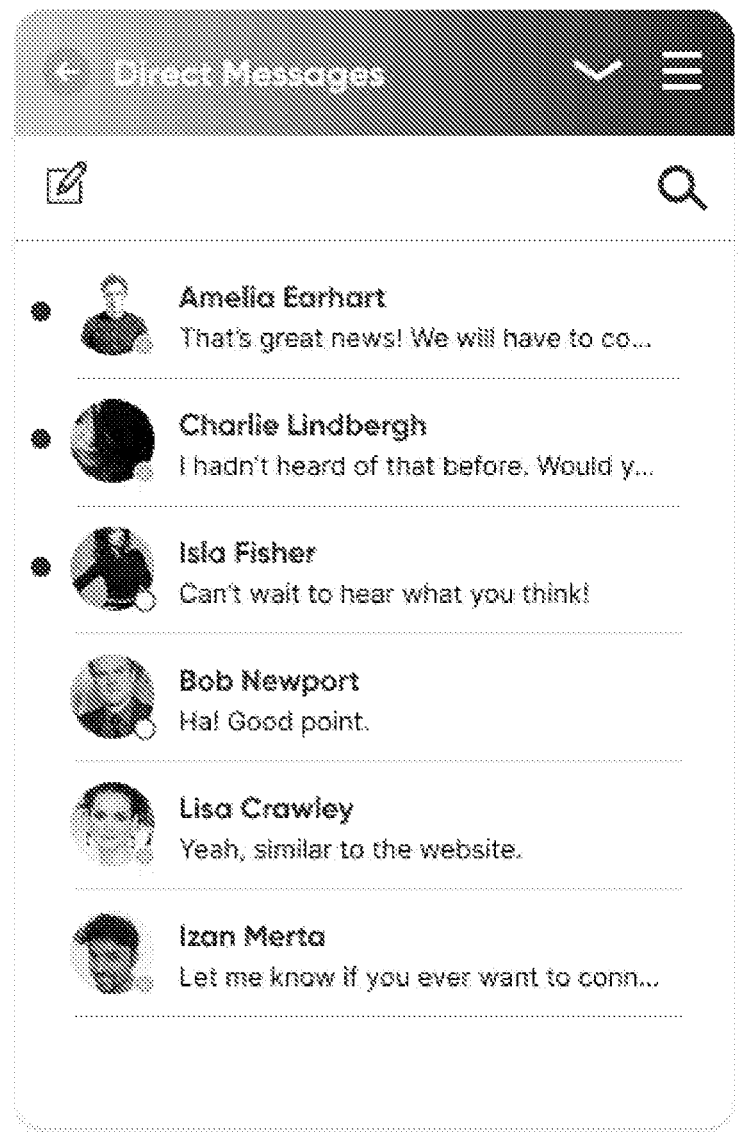

FIG. 8A illustrates an example direct messaging user interface (e.g., which may be accessed via a direct messaging module interface or menu). The direct messaging user interface may list a certain number of the most recent direct messages to the user (using a selected communication channel (e.g., text, video, audio)), optionally via a scrollable user interface via which the user can scroll down (or up) to view additional direct messages. A given direct message entry may include the name and/or image or avatar of the user that transmitted the message, an initial portion or all of the message, and an indication as to whether the message is new (e.g., via a filled in circle or other indicator) or that the user has already viewed the message. A control is provided via which the user can draft and transmit a direct message to another user.

Figure 8B:
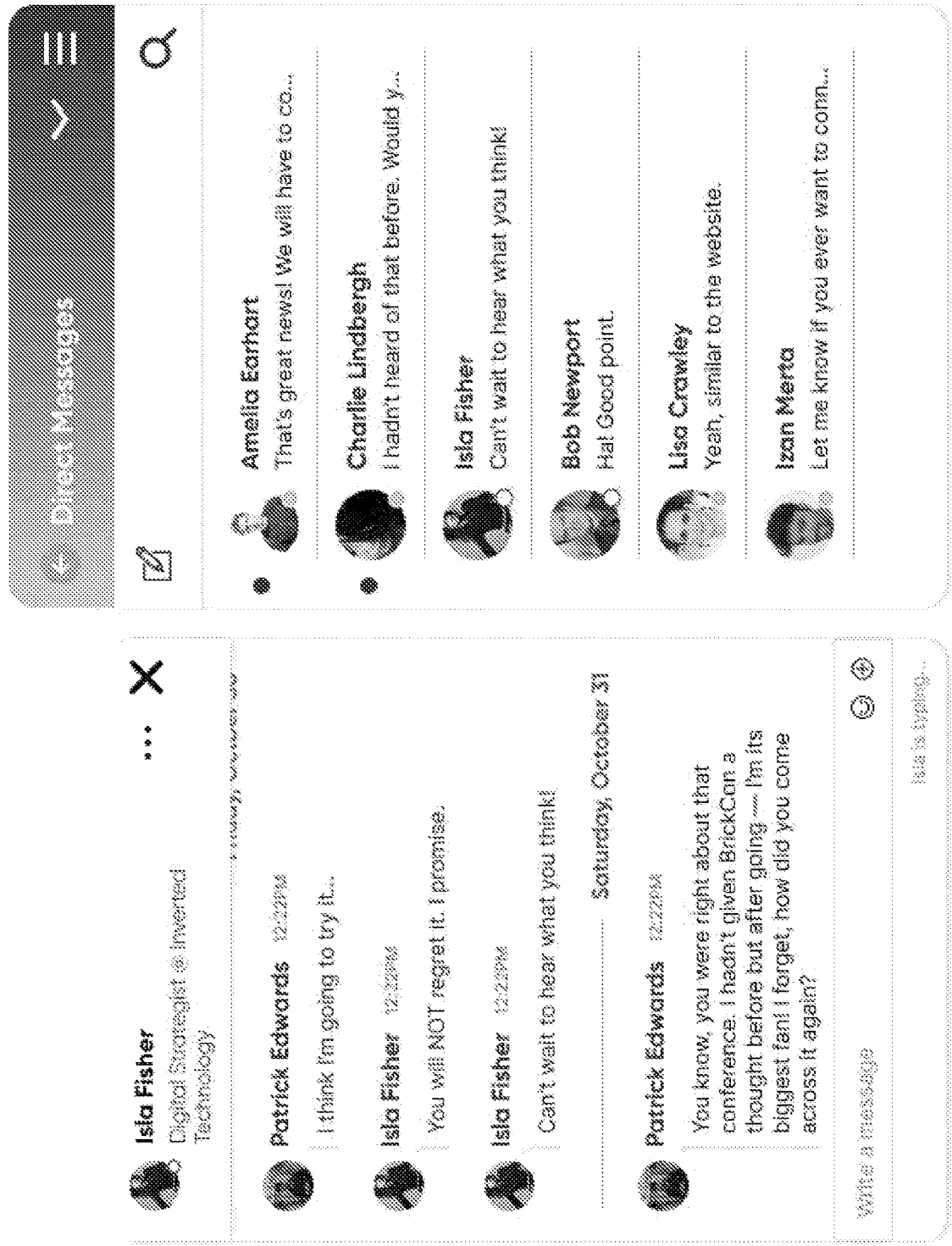

As illustrated in FIG. 8B, in response to a user selecting a user in the direct messaging list of FIG. 8A, a corresponding message thread may be displayed (e.g., as a pop-up overlaying the messaging list in whole or in part, or displayed alongside the message list). A control may be provided (e.g., an "X" control) which when activated causes the thread user interface to close. The thread user interface may display some or all of the messages in the thread, the user name, user image/avatar, a portion or all of the message, and the date and/or time the message was transmitted or received. A field is provided configured to receive a user message which will then be transmitted to others in the thread and which will be included in the thread display.

Figure 8C:
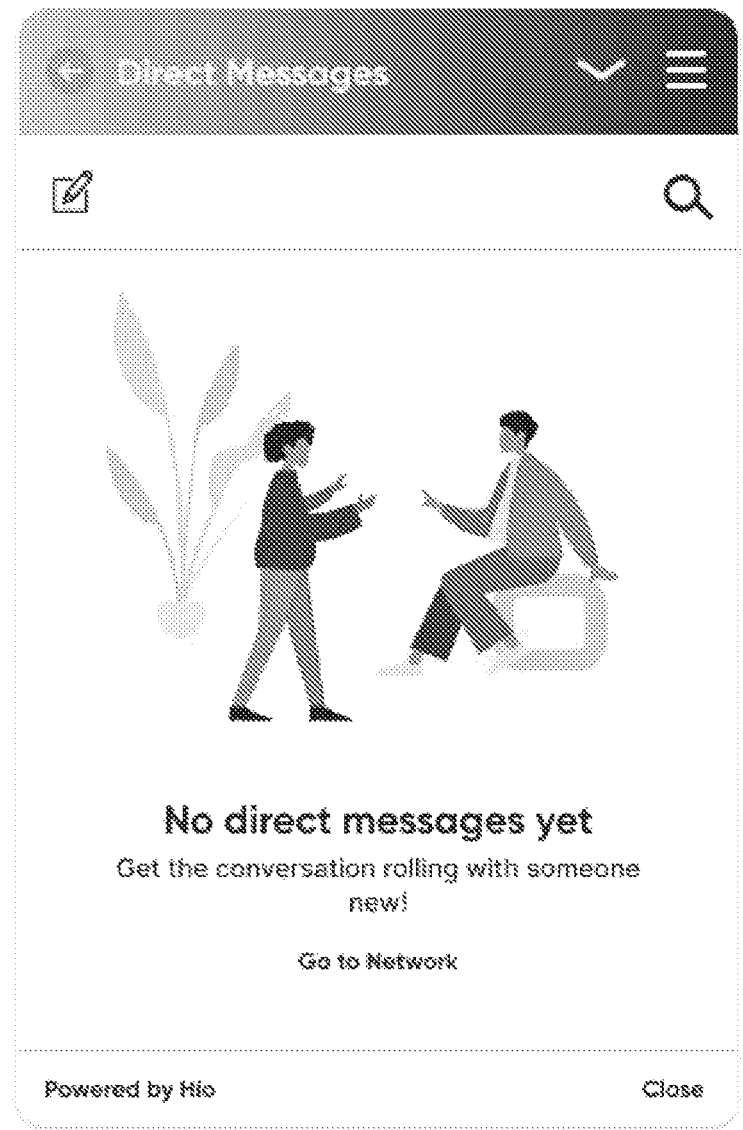

If there are no direct messages yet, the user interface illustrated in FIG. 8C may be displayed. The user interface includes an indication that no direct messages have been received yet, and a link/control is provided via which the user can initiate a direct message conversation with other users in the user's network.

Figure 8D:
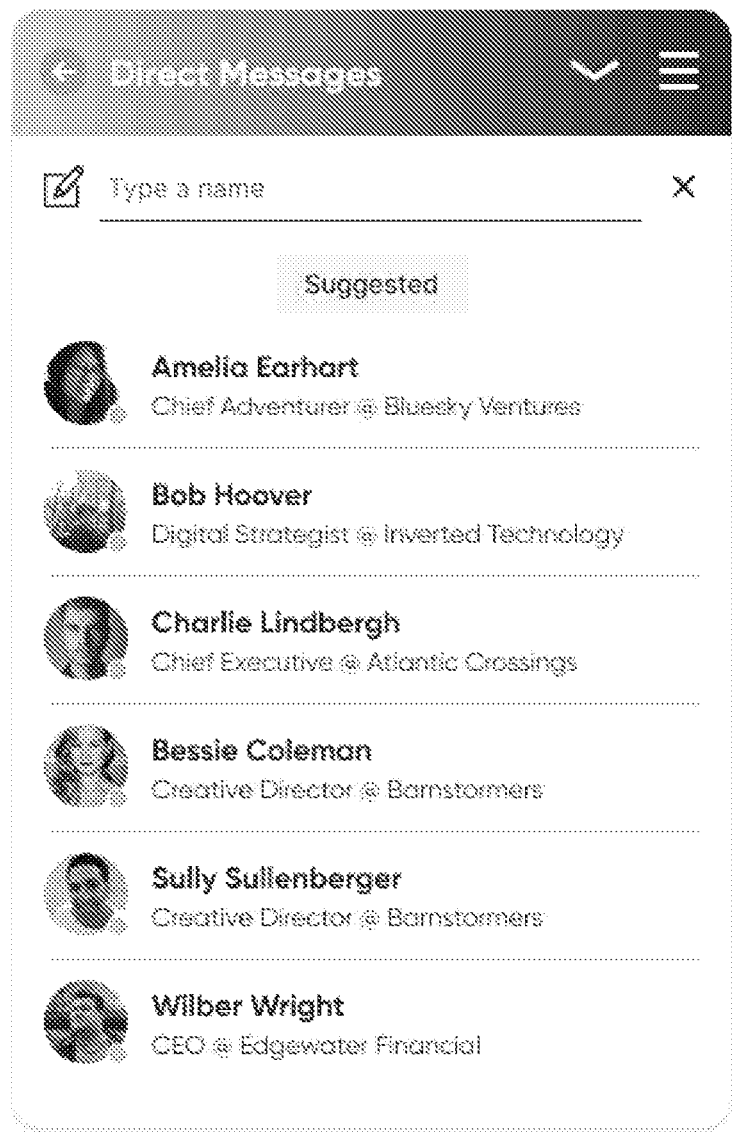

The system may suggest potential targets for direct messages from the user via a suggestions user interface, such as that illustrated in FIG. 8D. The suggested potential targets may be identified based on a commonality of identified interests, common other users with whom the user and the potential target have exchanged direct messages, common other users with whom the user and the potential target are in networks with, and/or using other information discussed herein. A given suggested target user for a direct message may include the name and/or image or avatar of the suggested target user, a job title, and a company name. A field is provided via which the user can enter the name of another user, and the system may utilize a search engine to search for, identify and return matching users.

Figure 8E:
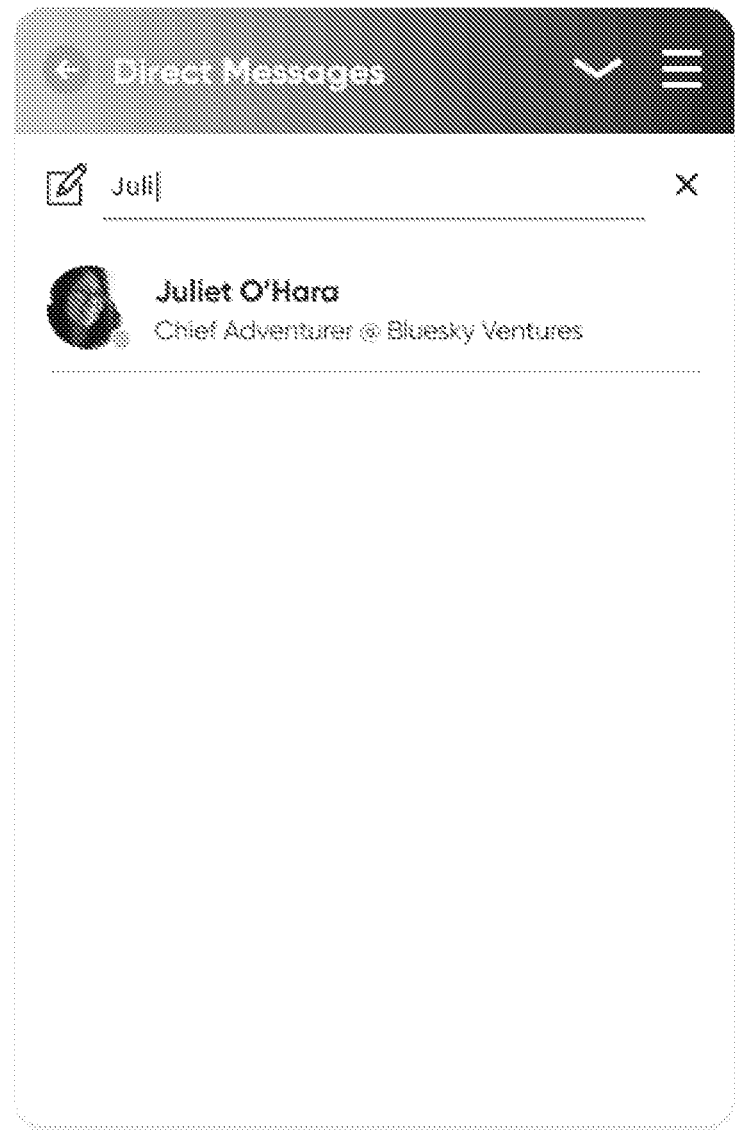

FIG. 8E illustrates a search direct messages user interface that enables a user to submit a search query term, which is received by a search engine which identifies matching users that have sent to and/or received from the user one or more direct messages, and returns search results comprising the matching users, optionally ranked in accordance with the closeness of the match. Optionally, the search engine may perform an incremental search, where, as the user is typing search term characters the search engine identifies matches in real time and presents search results, where the search results may be modified with each character entered by the user. In the illustrated example, a single search result is found, and the search result includes the name, job title, company, and a photograph or avatar of the matching user.

Figure 8F:
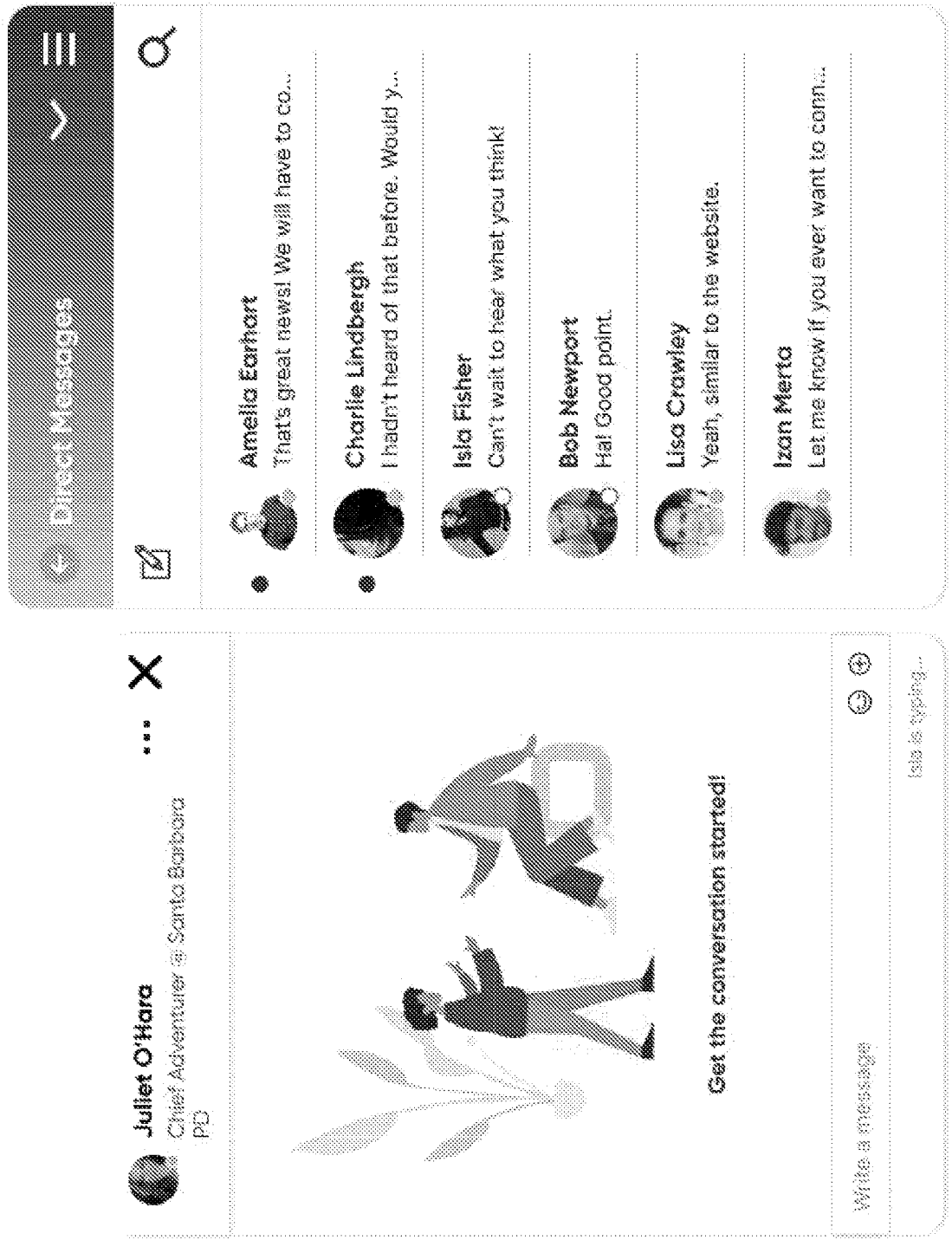

FIG. 8F illustrates an example user interface prompting the user to initiate a conversation (e.g., via text, audio, video) with one or more other users, including the name, job title, company, and a photograph or avatar of the suggested user. A field is provided via which the user can enter a message (e.g., a text message, where a text message may comprises one or more emojis) to the user.

Figure 9A:
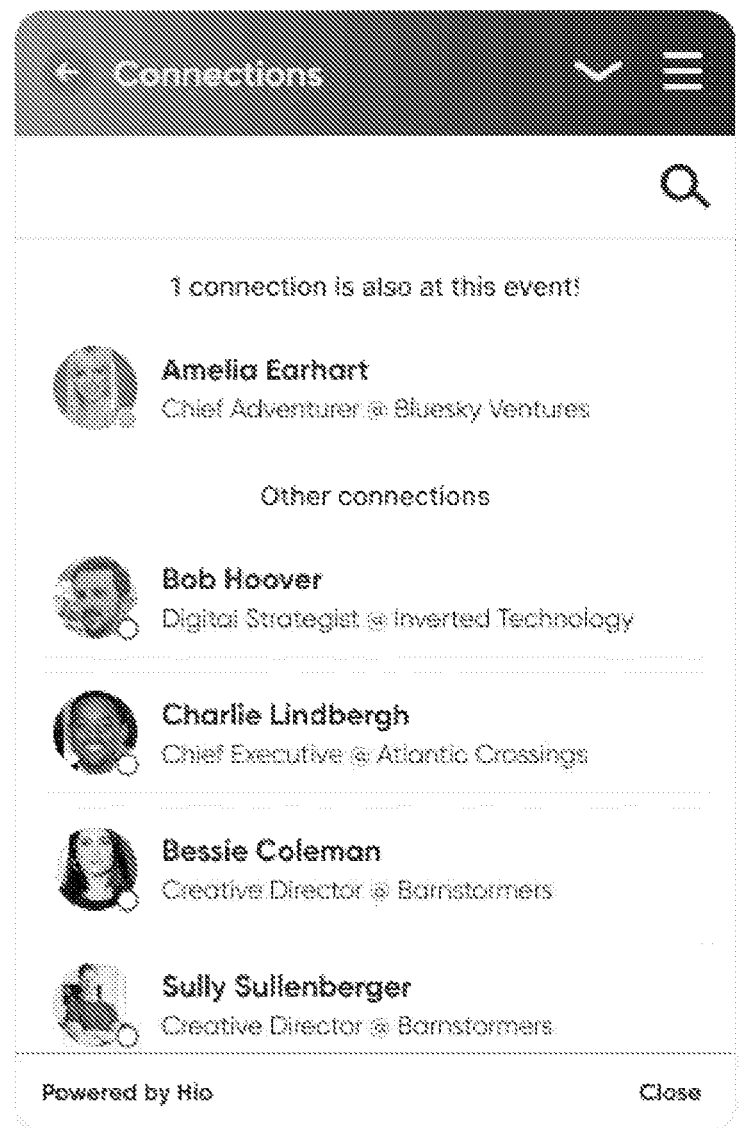

FIG. 9A illustrates an example connections user interface. The system determines which of the user's connections are currently at an online event at which the user is an attendee, identifies the user's connections that are not currently at the online event, and populates the connections user interface accordingly. In the illustrated example, the user interface presents the number of the user's connections that are attending the online event, and provides the name, job title, company, and a photograph or avatar of the attendee. In addition the user interface displays connections of the user that are not attending the online event.

Figure 9B:
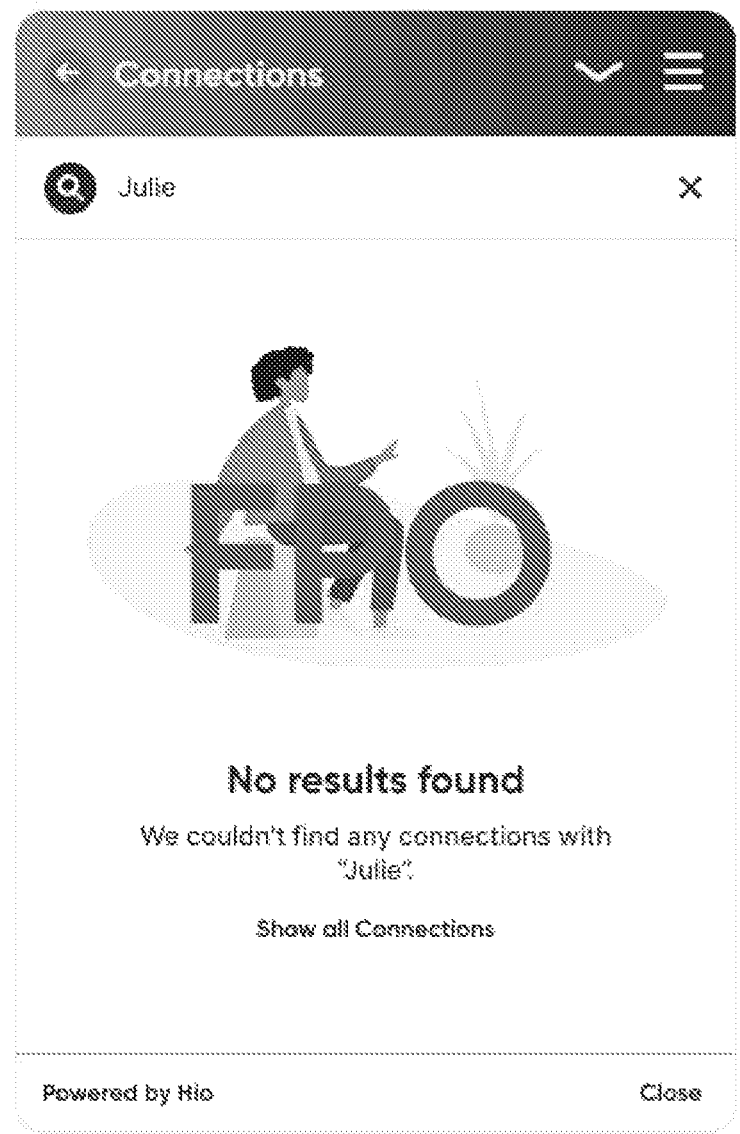

FIG. 9B illustrates a search direct messages user interface that enables a user to submit a search query term, which is received by a search engine which identifies matching users that are connected with the user, and returns search results comprising the matching users, optionally ranked in accordance with the closeness of the match. Optionally, the search engine may perform an incremental search, where, as the user is typing search term characters the search engine identifies matches in real time and present search results, where the search results may be modified with each character entered by the user. In the illustrated example, no matches are found.

Figure 9C:
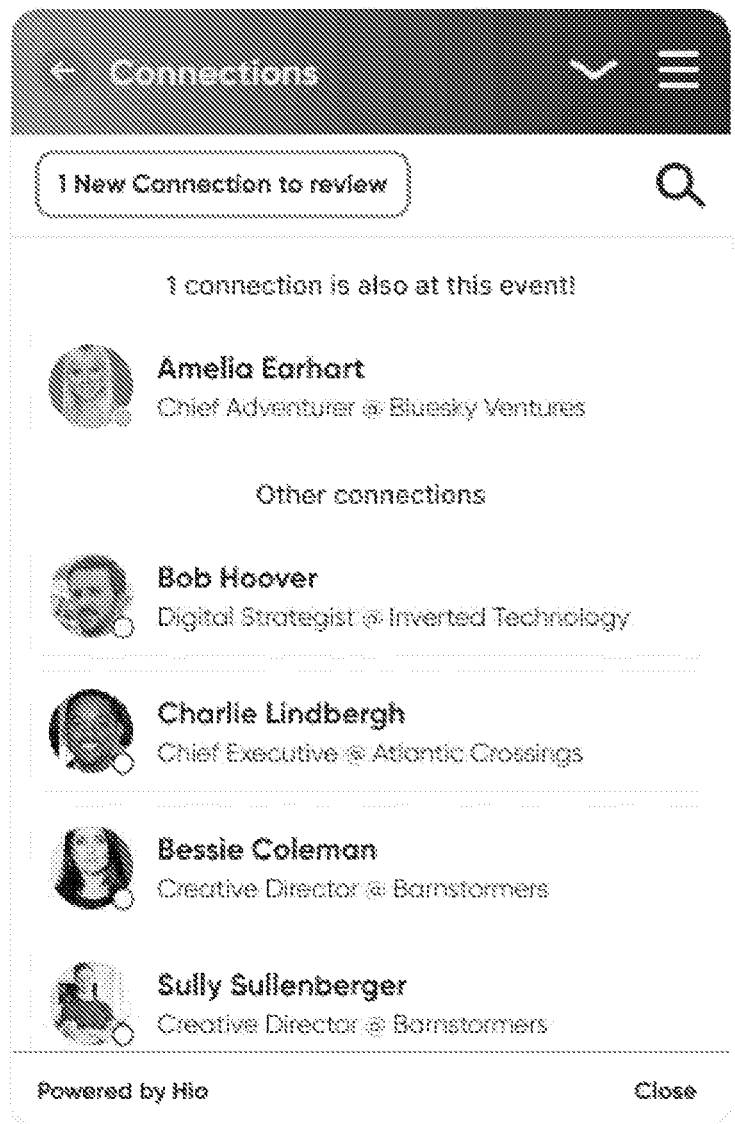
Figure 9D:
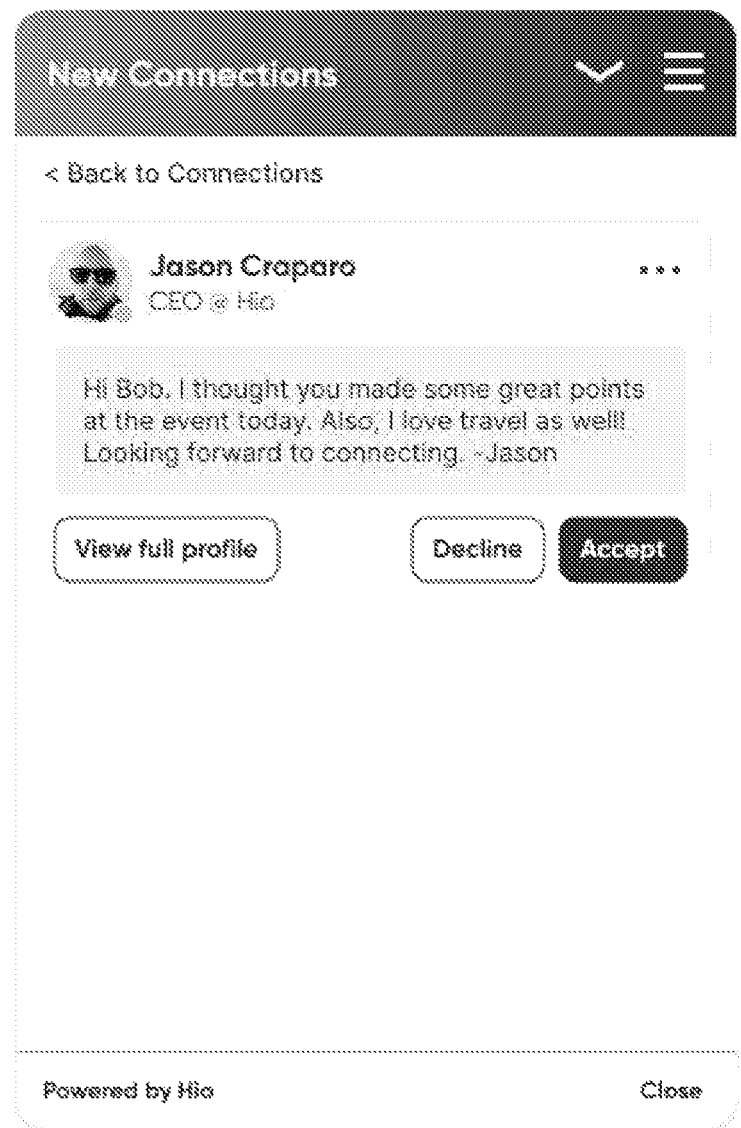
Figure 9E:

FIG. 9C illustrates the connection user interface, but in this example, the user interface is populated by the system to identify the number of connection requests (corresponding to requests by other users to become a connection) for the user to review. In response to the user selecting the new connection entry, a new connections user interface, such as that illustrated in FIG. 9D, may be presented. As illustrated in FIG. 9D, the name, job title, company, and a photograph or avatar of the new connection may be presented, with a message from the new connection to the user. Controls are provided via which the user can accept or decline the connection request, and the acceptance or declining of the request may be stored in memory in association with a user record. A view full profile control is provided, which when activated, causes the full profile of the user to be presented, such as that illustration in FIG. 9E.

Figure 10A:
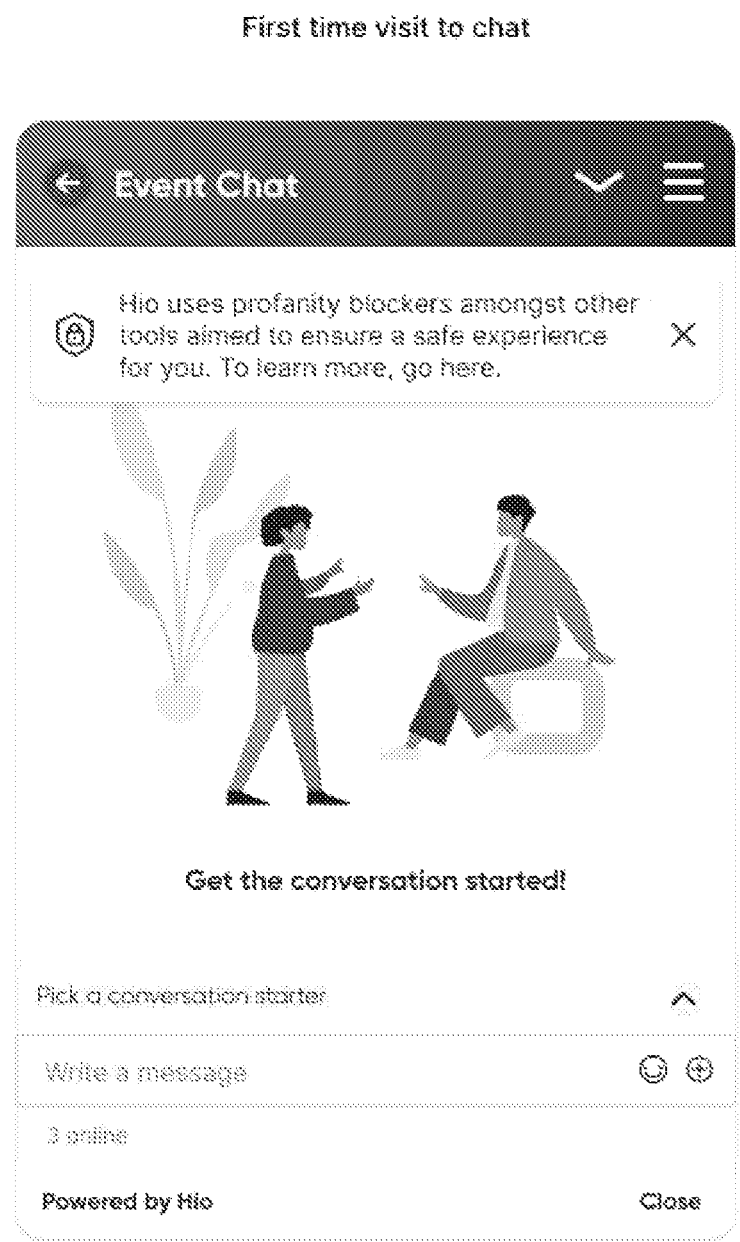

FIG. 10A illustrates an example channels user interface. The user interface may be presented if the system detects that this is the first time the user has visited to chat (e.g., in a particular forum). The disclosed system may include or utilize a profanity blocker that detects profanities and other potential offensive language. For example, the system may use a blacklist of certain words, scan text or other messages for blacklisted words, and if such words are detected, deletes such words from the message (and optionally replaces such words with comparable or other phrases from a list). The user interface illustrated in FIG. 10A includes a notice regarding the use of such profanity blockers, where a control is provided via which the user can close the notice. The user is prompted to start a conversation with other users. A control is provided via which the user can pick a conversation starter from a list of conversation starter messages (where a control is provided via which the user can cause a list of conversation starter messages to be displayed). A field is provided via which the user can enter a custom, user-drafted message. The user interface may be populated by the system with the number of users currently online.

Figure 10B:
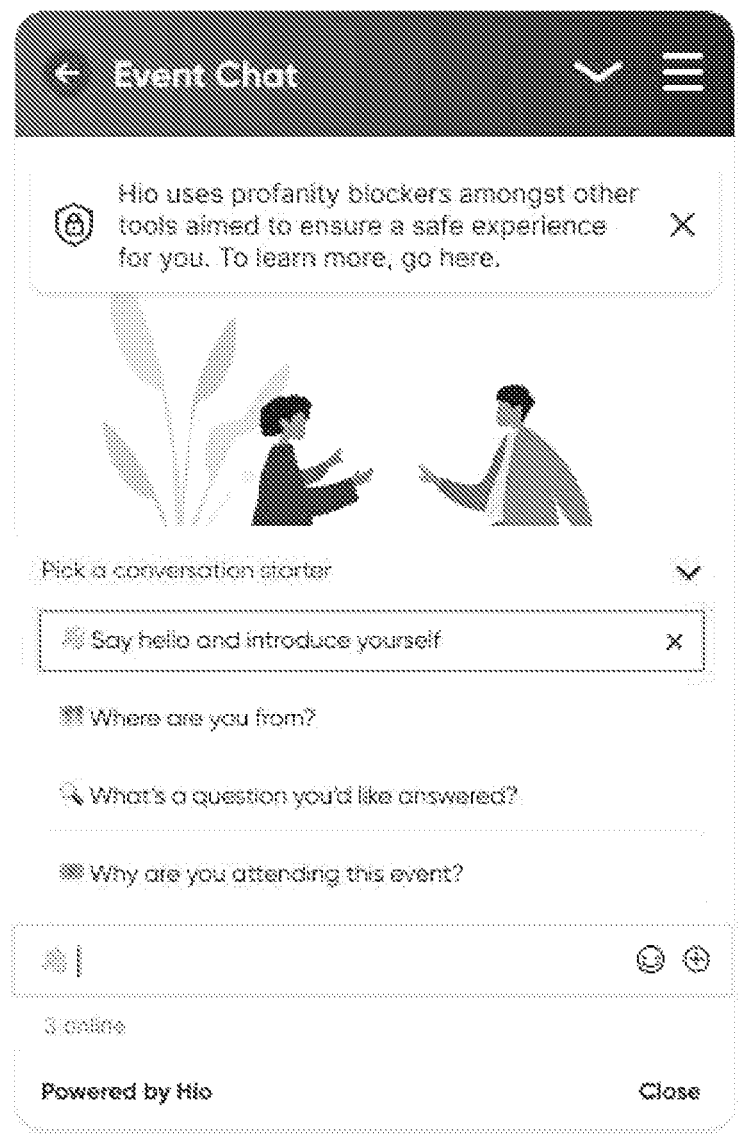

FIG. 10B illustrates the user interface of FIG. 10A where the user has activated the control that causes the list of conversation starter messages. Optionally, if the user selects a conversation starter message, the other prospective conversation starter messages are no longer displayed.

Figure 10C:
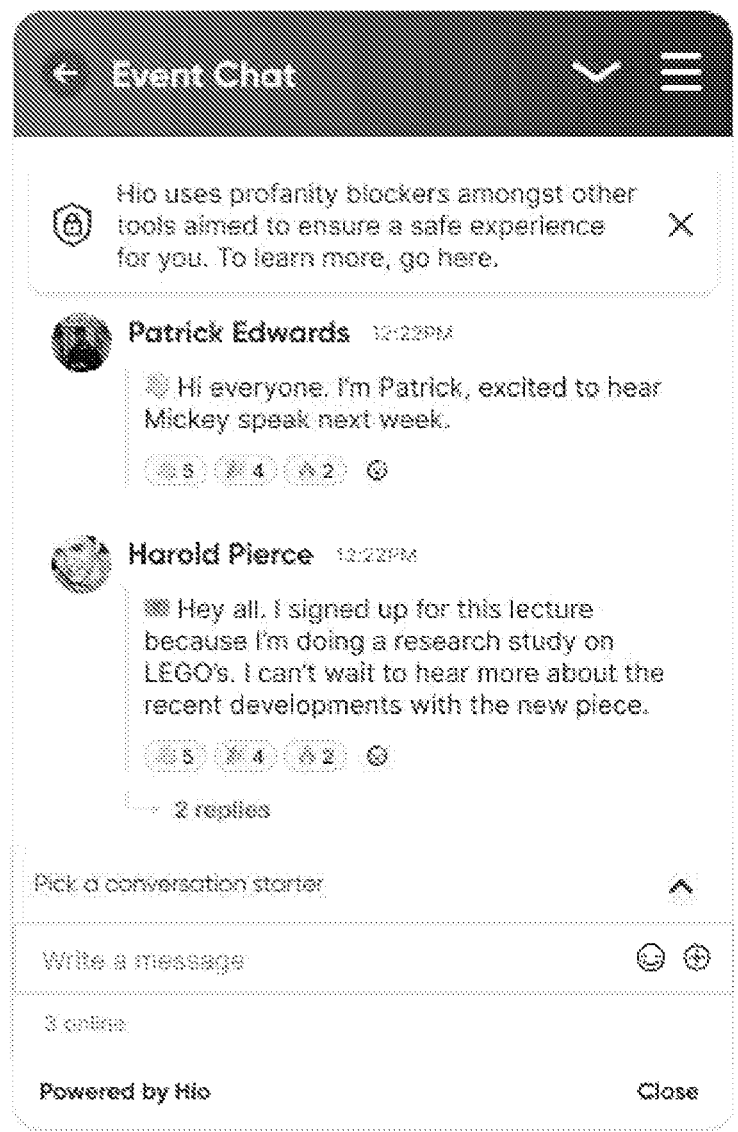

FIG. 10C illustrates a user interface which may be presented after at least one message has been sent. The user interface may present the message in the thread and the message timing. A hand wave icon may be displayed indicating how many other users have transmitted an electronic hand wave indication to the user. The user interface may be populated with the number of replies received to the user's messages.

Figure 10D:
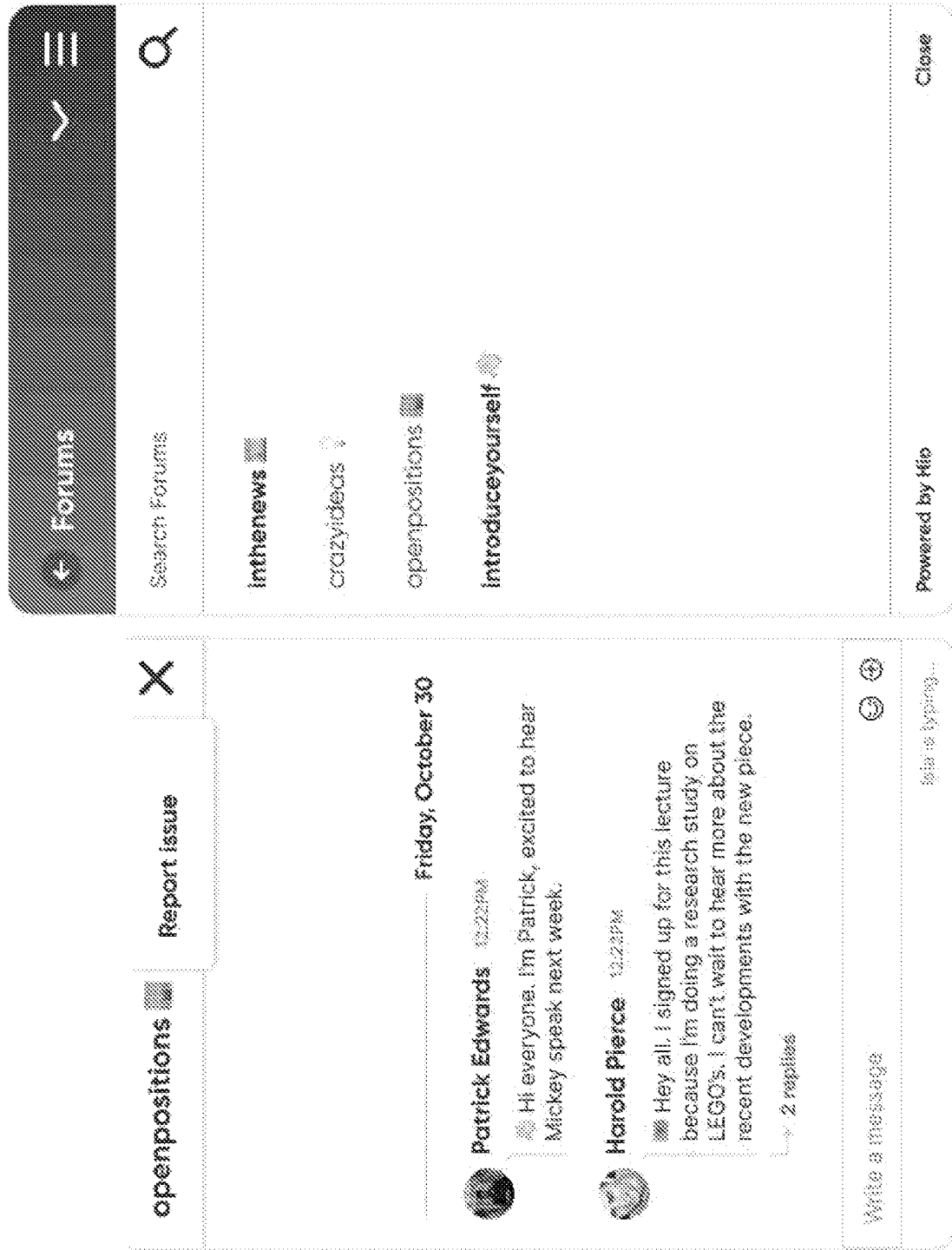

FIG. 10D illustrates a user interface displaying, for a selected subject forum, the chat messages in the forum, including the message dates and times. The available forums may be displayed alongside the forum messages.

Figure 10E:
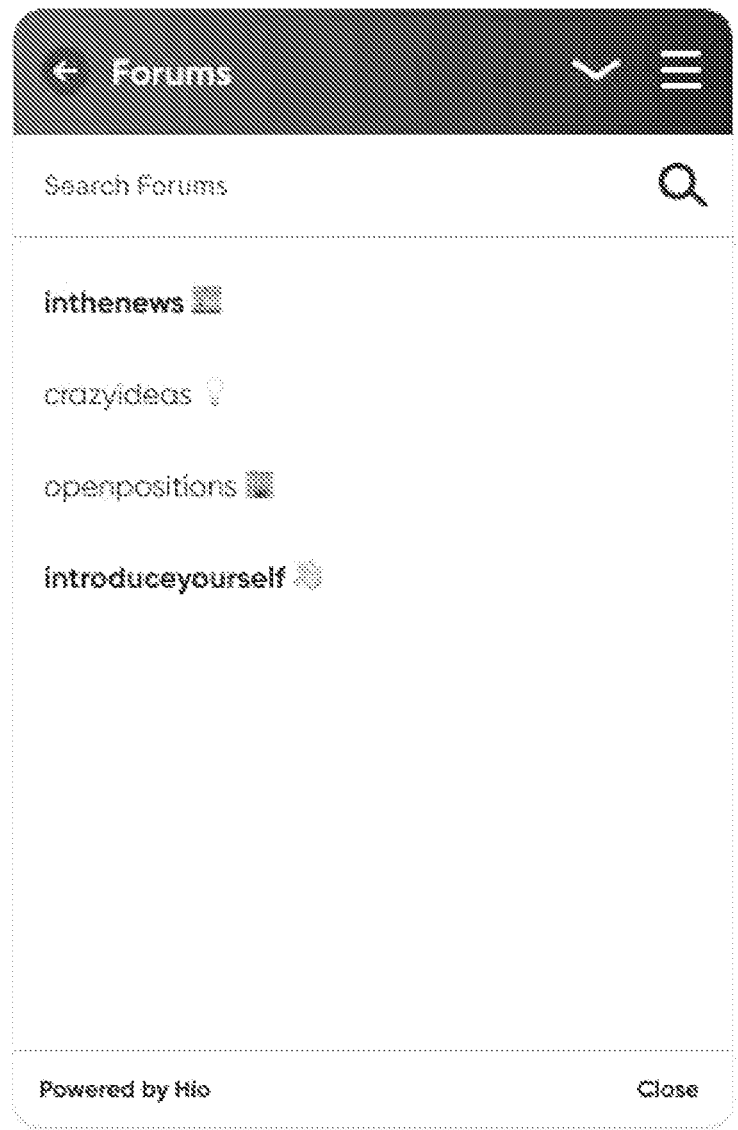

FIG. 10E illustrates an example search forum user interface that enables a user to submit a search query term, which is received by a search engine which identifies matching forums, users, topics, and/or text in the forums, and returns search results comprising the matching users, ranked in accordance with the closeness of the match. Optionally, the search engine may perform an incremental search, where, as the user is typing search term characters the search engine identifies matches in real time and present search results, where the search results may be modified with each character entered by the user. In the illustrated example, a single search result is found, and the search result includes the name, job title, company, and a photograph or avatar of the matching user.

Figure 11A:

Example user interfaces that enable a user to register for an online event will now be described. Referring to FIG. 11A, a notification is presented regarding an upcoming online event. The notification may include the event name, the type of event (e.g., meeting, party, lecture, etc.), the event date, the event time, and the time (e.g., days, hours, and/or minutes) until the event begins (e.g., via a countdown timer that continuously updates with a time decrement, such as every second, minute or hour). \o my schedule" control is provided, which when activated, may add the event to the user's calendar at the corresponding date and time. Once the user registers for the event, the user may be enabled to chat with other users/attendees registered for the event, even before the event takes place. Network, connections, direct messages, and FAQs & privacy modules are provided, which are described elsewhere herein.

Figure 11B:
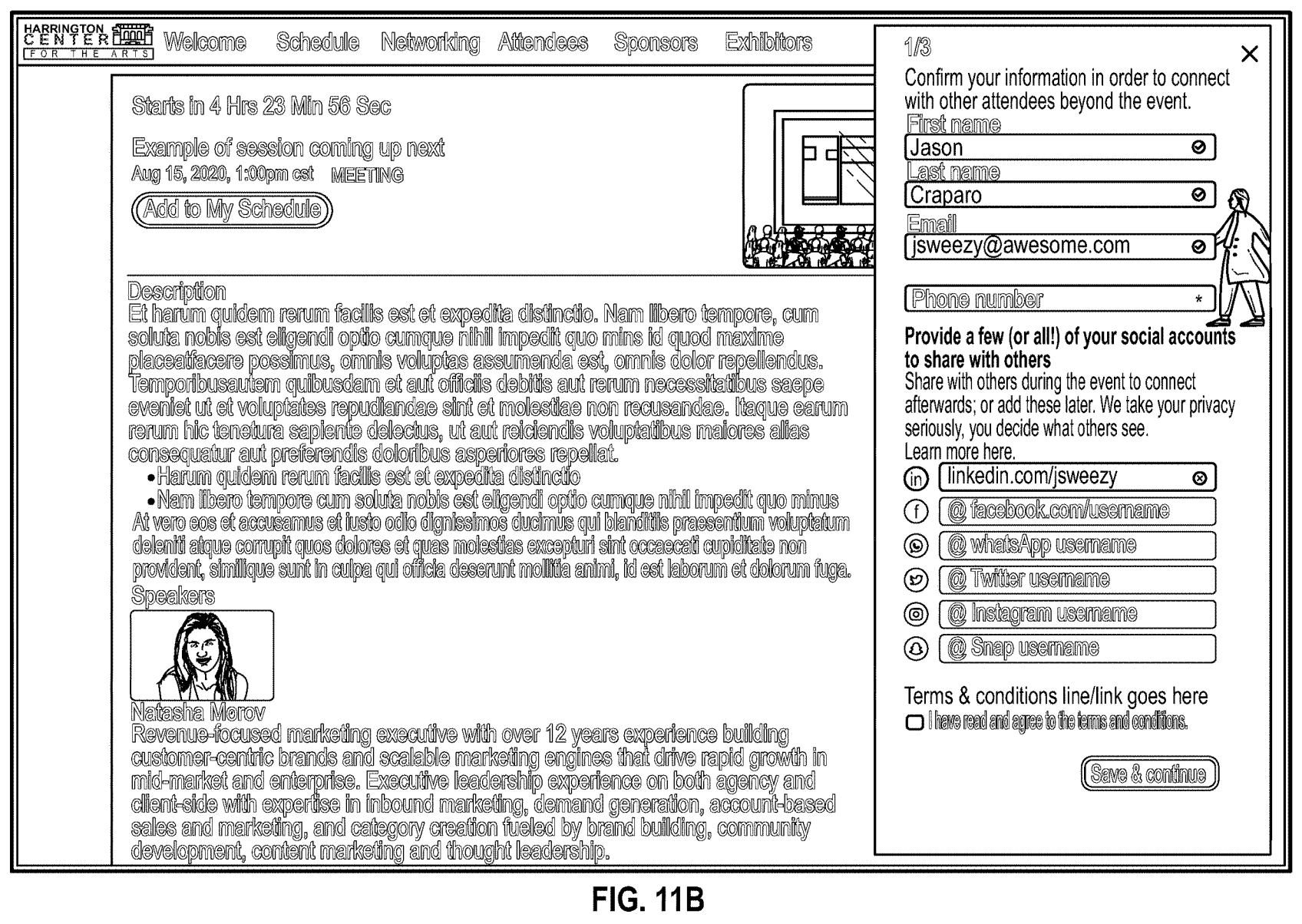

In response to the user activating the "add to my schedule" control or a "register for this event" control, the example registration user interface illustrated in FIG. 11B is presented. The user interface may include fields configured to receive the user's first and last names, email address, and phone number (e.g., mobile phone number of a phone configured to receive text messages). A list of social networking platforms may be provided. The user interface may be configured to receive a user selection of one or more of the listed social networking platforms to share during the online event (e.g., to enable other attendees to connect with the user (e.g., during or after the event). Corresponding fields are provided via which the user can enter a link to a given social network page of the user. Optionally, the user may be able to select such social networking platforms at a later time (e.g., before, during or after the online event) via a corresponding user interface.

Figure 11C:
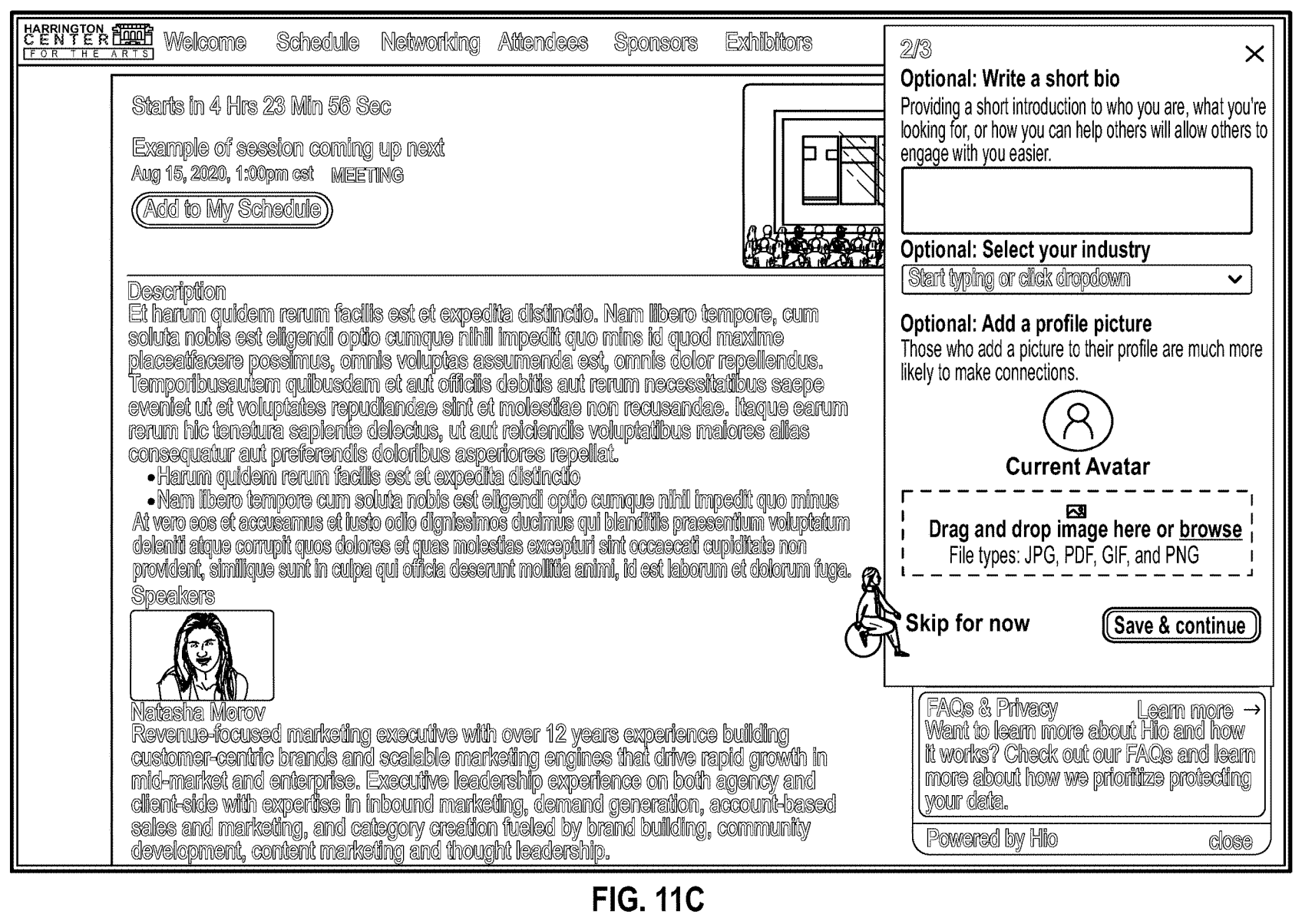

FIG. 11C includes fields configured to receive a user biography from the user, a field configured to receive a profile photograph or avatar selection from the user, and a drop down menu of predefined industries via which the user cans select an industry the user is engaged in. Optionally, a field is provided via which the user can type in an industry type, which is received by a search engine which identifies matching industries, and returns search results comprising the matching industries, ranked in accordance with the closeness of the match. Optionally, the search engine may perform an incremental search, where, as the user is typing search term characters the search engine identifies matches in real time and present search results, where the search results may be modified with each character entered by the user.

Figure 11D:

FIG. 11D illustrates an example user interface via which the user can select one or more predefined interests to be associated with the user. Optionally, the interests may be categorized (e.g., arts & culture, consulting, cooking, etc.), where in response to the user selecting category, corresponding interests that fall under the category may be displayed. In addition, a new tag control is provided via the user can add a user-defined tag. A save control is provided via which the user can save the interest selections.

Optionally, in order to authenticate the user, a code may be transmitted to the user's phone number or email address. The user then needs to enter the correct code into a code field in order to enable one or more features (e.g., registration to the event, the ability to chat with other attendees, etc.).

As discussed above, the system may enable a user to quickly and accurately specify which features discussed herein are activated or deactivated and to configure the operations of features. The system may then automatically generate code enabling/disabling and configuring the features accordingly. The generated code may then be embedded on the website/webpage and provided and execute the features accordingly via a customized widget (also referred to herein as access detection and communication code). The disclosed technology may advantageously reduce the amount of computer process, memory, and network resources that would otherwise be necessary if each website operator had to develop their own widget.

Example user interface that will now be described enable the user to create a widget for the user's website, including the configuration, branding, features layout, and chat channels, and well as to define collaborators.

Figure 12A:
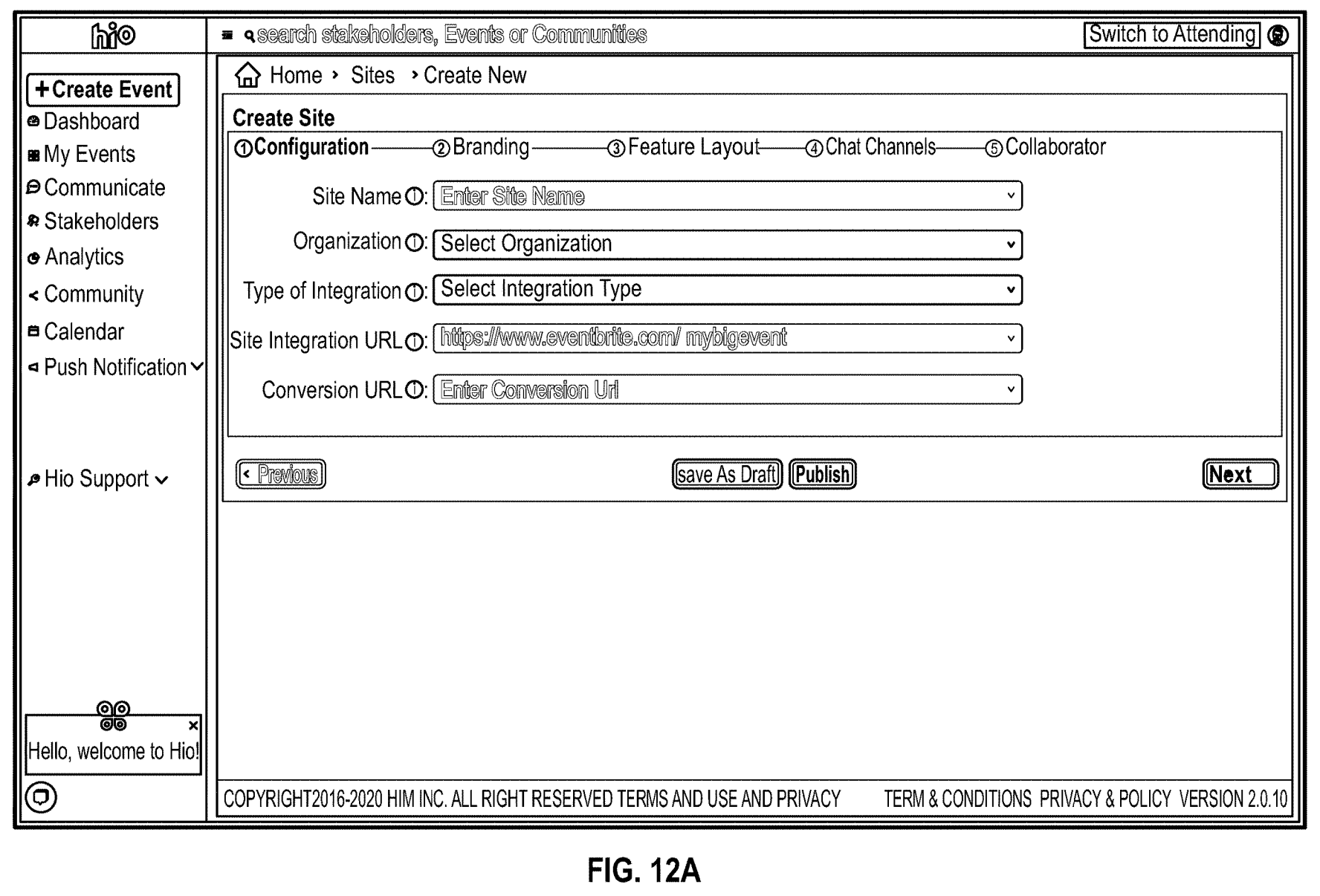

Referring to FIG. 12A, an example user interface indicates the current access detection and communication widget customization stage (e.g., configuration, branding, features layout, chat channels, collaborators). Such stage indication may be updated to reflect the current stage in the other user interfaces described below. FIG. 12A includes fields enabling the user to specify configuration parameters for the access detection and communication widget. Fields are provided configured to receive from the user a site name, an organization selection, an integration type, a site integration URL, and a conversion URL. A conversion URL may be subsequent URL that a site visitor may end up landing on/navigating to. Such a conversion URL may be categorized as a successful "conversion" (e.g., based on a site publisher categorization criteria). For example, a successful conversion may be a successful signup to a newsletter, the entrance to or exit by a user of a shopping checkout process, the addition of an item to an online shopping cart, the viewing of an internal blog site, and/or the like. Controls are provided via which the user can save the user entries as a draft or to publish the user entries so that they may be implemented as a access detection and communication code widget. Activating a next control may cause the example branding user interface illustrated in FIG. 12B to be presented.

Figure 12B:
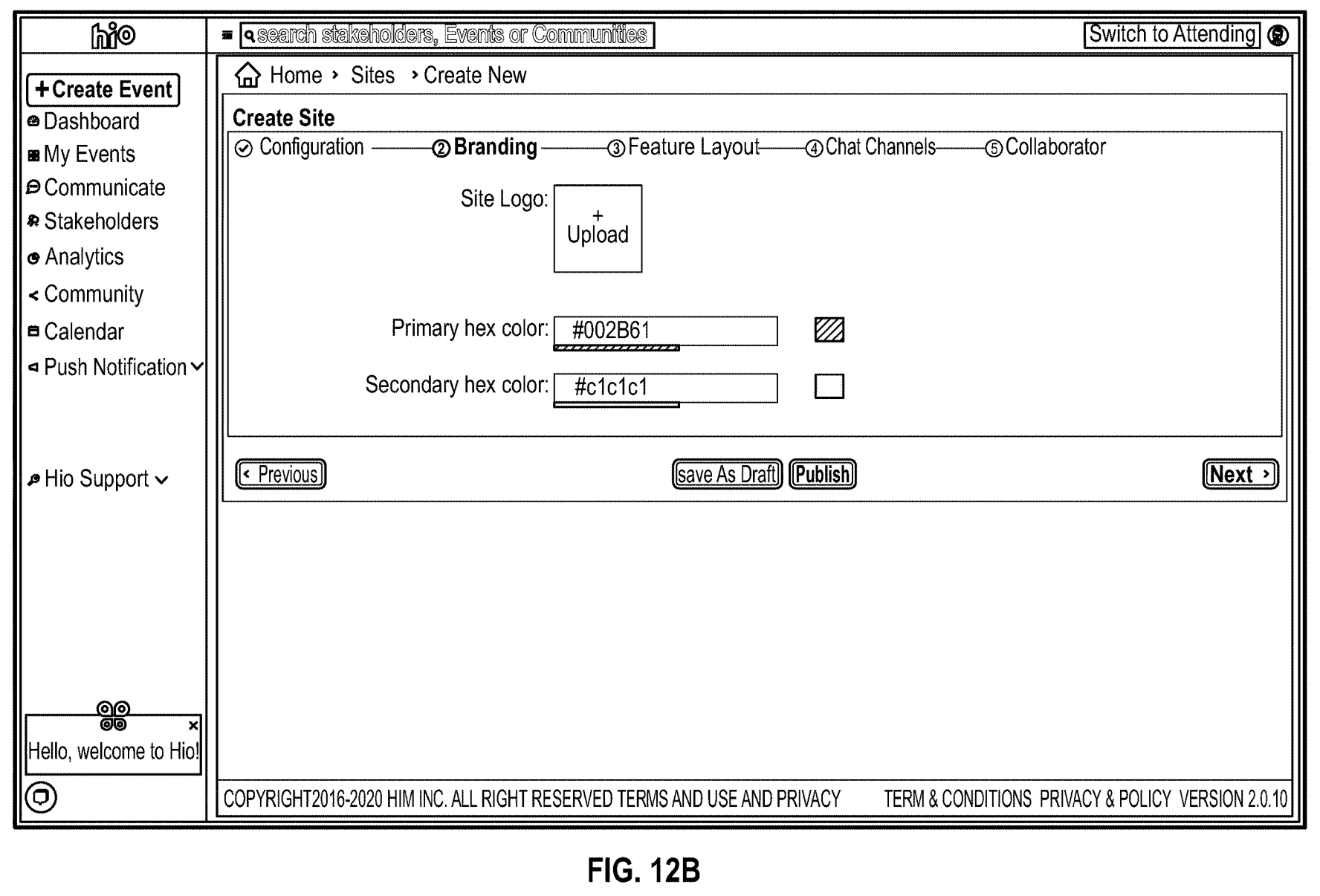

Referring to FIG. 12B, a control is provided via which the user can upload a site logo to be added to the access detection and communication code widget. A field is provided via which the user can specify a primary color (e.g., via a primary hex color value). A field is provided via which the user can specify a secondary color (e.g., via a secondary hex color value). Activating a next control may cause the example feature layout user interface illustrated in FIG. 12C to be presented.

Figure 12C:
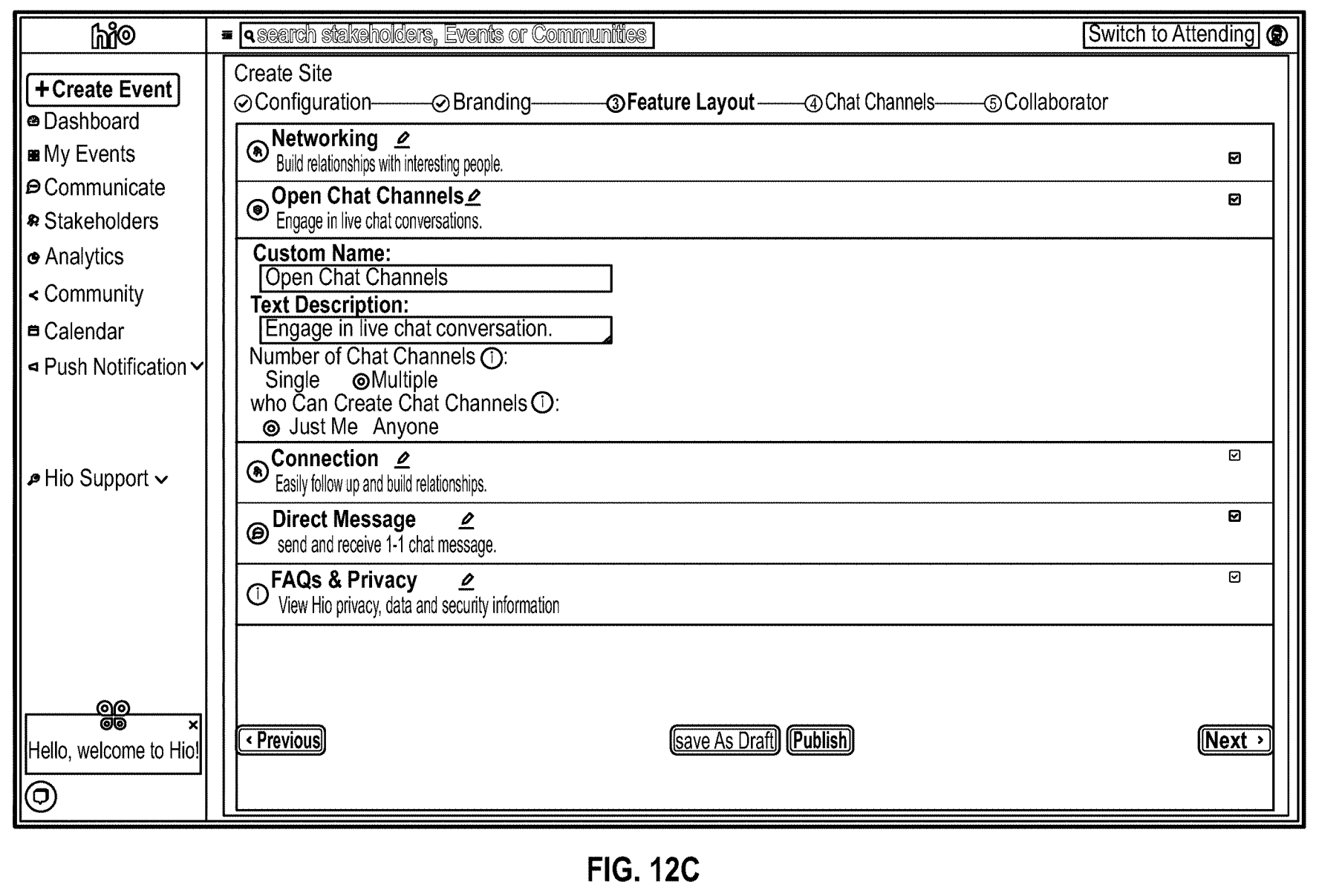

Referring to FIG. 12C, a control is provided via which the user can enable or disable the networking features described herein that enable users to build relationships with other users via online communications and content sharing (where if a feature is disabled, the corresponding module interface may not be displayed via the user interfaces described herein). A control is provided via which the user can enable or disable chat channels via which users can engage in live communications with each other. A field is provided configured to receive a custom name for a chat channel (which may be presented to users when viewing a list of chat channels). A field is provided configured to receive a text description of the chat channel (which may be presented to users when viewing a list of chat channels). A field is provided via which the user can specify whether a single chat channel or multiple chat channels are to be opened. A field is provided via which the user can specify whether only the user can create chat channels for the website (accessible via the access detection and communication code widget) or whether anyone can create chat channels for the website. A control is provided via which the user can enable or disable the ability of users to make connections. A control is provided via which the user can enable or disable direct messages. A control is provided via which the user can enable or disable the presentation of the FAQs & Privacy module. Activating a next control may cause the example chat channels user interface illustrated in FIG. 12D to be presented.

Figure 12D:
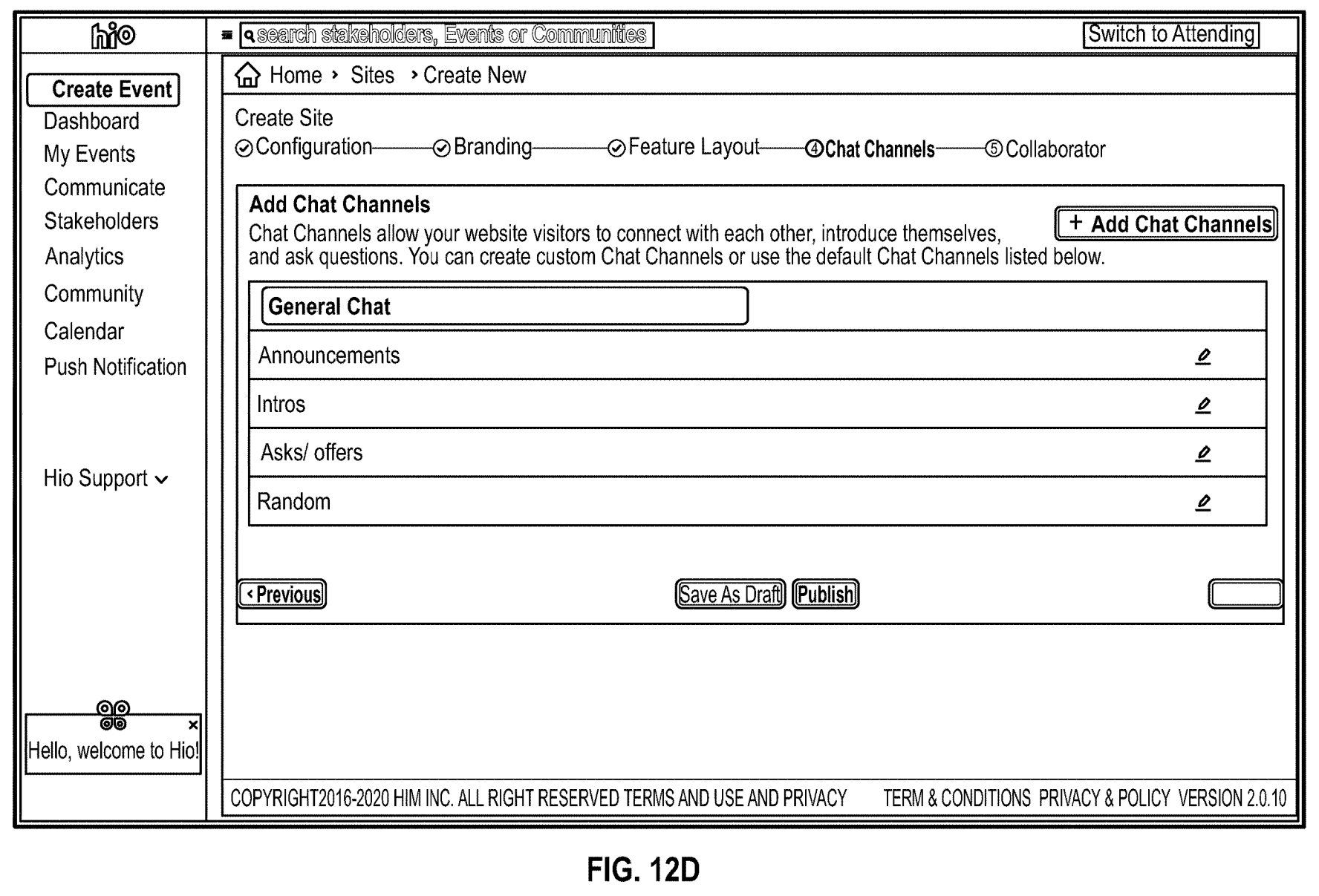

Referring to FIG. 12D, the example chat channels user interface enables one or more chat channels to be added to the access detection and communication code widget (where users can communicate via the channels, introduce themselves, ask questions, or connect). The user interface enables the user to define custom chat channels and/or add predefined channels, such as general chat, announcements, introductions, asks/offers, random, etc. Delete controls are provided that enables the user to delete a corresponding channel. Activating a next control may cause the example collaborations user interface illustrated in FIG. 12E to be presented.

Figure 12E:
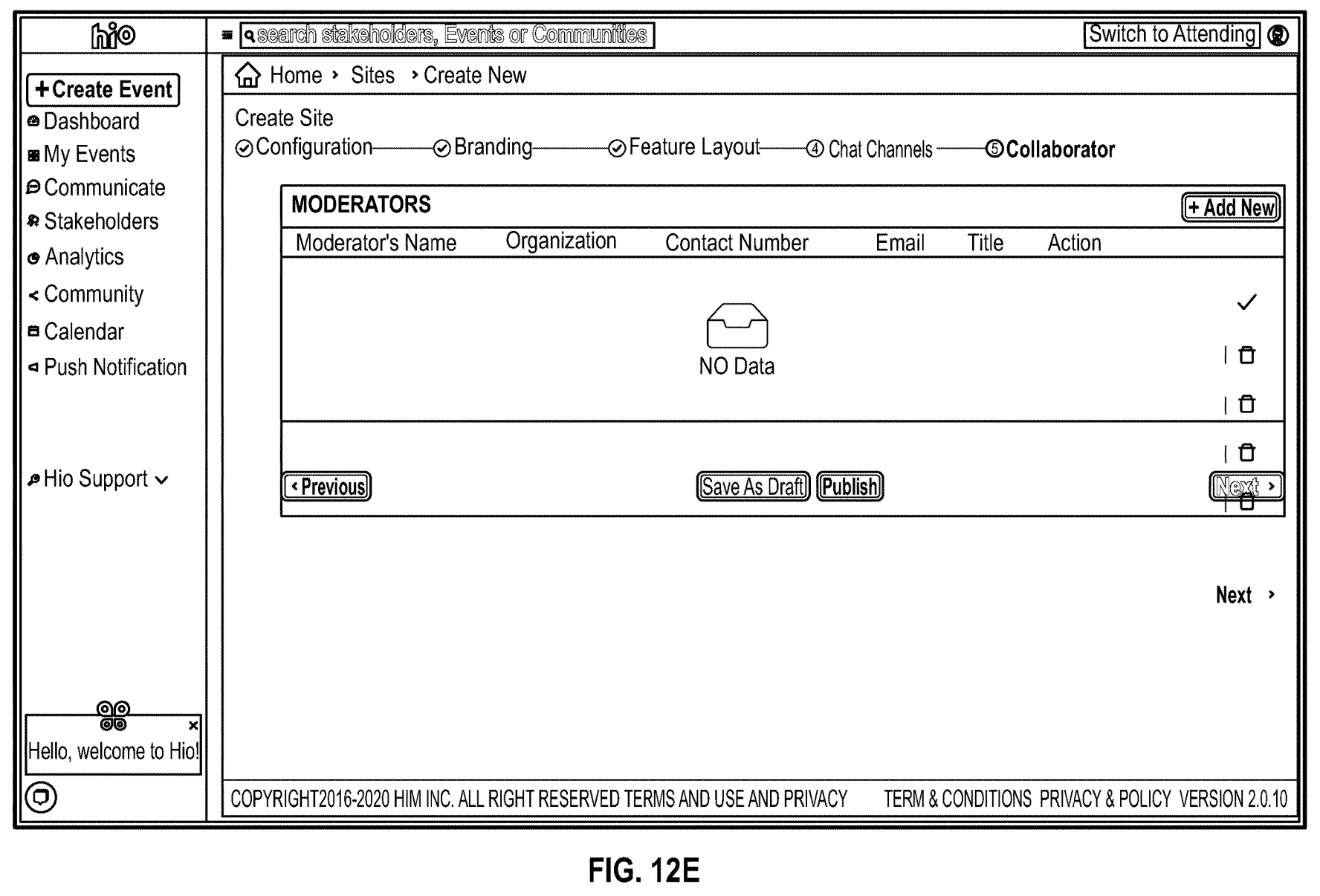

Referring to FIG. 12E, the example collaborator user interface enables the user to specify authorized chat channel/forum moderators. Fields are provided configured to receive a moderator name, organization, contact phone number, contact email, title, and action. For example, an action associated with a moderator/collaborator may be an invitation to the widget (e.g., via email and/or text message), where the moderator may be granted special permissions enabling the moderator to join a discussion as a moderator, to flag content, to engage on the brand's behalf, and/or to assist in configuring the widget itself.

Figure 13:
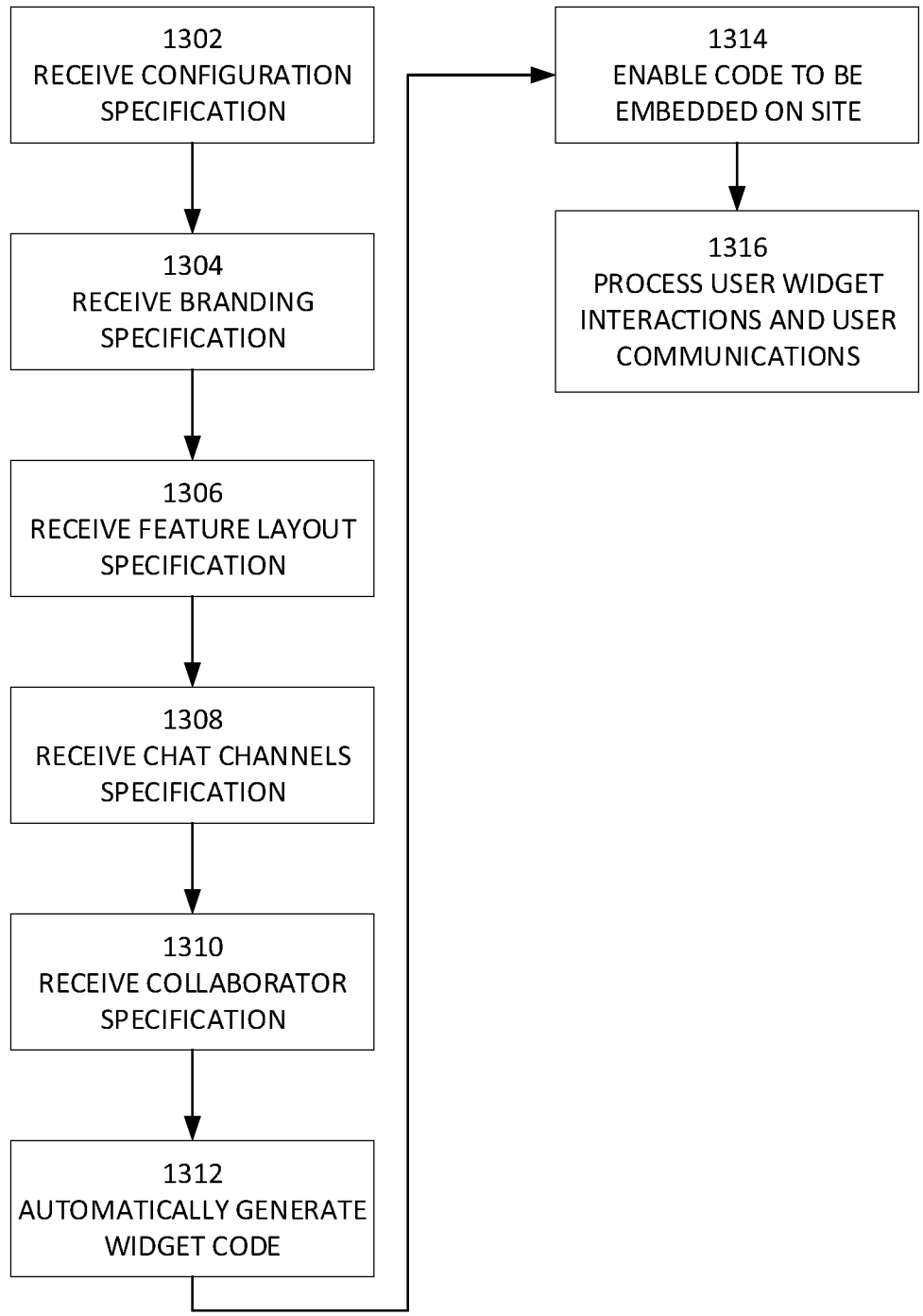
FIG. 13 illustrates an example process for defining and automatically generating a communication widget.

FIG. 13 illustrates an example process for defining and automatically generating a communication access detection and communication code widget (without requiring manual coding), and enabling the communication access detection and communication code widget to provide functions and features described herein. At block 1302, an access detection and communication code widget configuration specification is received from a user device (e.g., via the user interface illustrated in FIG. 12A). For example, the configuration specification may include site name, organization, integration type, site integration URL, and a conversion URL. As discussed elsewhere herein, the URL(s) (and/or other site identifiers) may be transmitted to the multimedia communication system to identify the website being visited by a user accessing the widget.

At block 1304, a branding specification is received from a user device (e.g., via the user interface illustrated in FIG. 12B). For example, the branding specification may include site logo(s), primary color, and/or secondary colors.

At block 1306, a feature layout specification is received from a user device (e.g., via the user interface illustrated in FIG. 12C). For example, the feature layout specification may include the configuration (e.g., enabling or disabling) of chat channels via which users can engage in live communications with each other, chat channel name (which may be presented to users when viewing a list of chat channels), chat channel description (which may be presented to users when viewing a list of chat channels), whether one or more than one chat channels are to be opened, who is permitted to create chat channels, the configuration of connections, the configuration of direct messages, and/or the configuration of a FAQs & Privacy module.

At block 1308, a chat channels specification is received from a user device (e.g., via the user interface illustrated in FIG. 12D). For example, the chat channels specification may include an identification of one or more custom or pre-defined channels to be added to the access detection and communication code widget (where users can communicate via the channels, introduce themselves, ask questions, connect, and/or the like).

At block 1310, a collaborator specification is received from a user device (e.g., via the user interface illustrated in FIG. 12E). For example, the collaborator specification may include an identification of one or more moderator names, organizations, contact phone numbers, contact emails, titles, and/or actions.

At block 1312, in response to a user activation of a corresponding control, the system may automatically generate corresponding access detection and communication widget code, without requiring a user to manually write the code. The code may optionally be in the form of JavaScript.

At block 1314, the access detection and communication widget code is provided to a website operator which may embed the code in a website's webpage. For example, optionally similar operational access detection and communication code may be embedded in different webpages of different websites operated by different, unrelated entities (although the code may be modified for each website in accordance with the configuration process described above and to include a unique identifier associated with the website) and may optionally provide a functionally common or similar interface with respect to the different websites (although each website may optionally have its own branding and may disable or enable certain functions via the process described herein).

At block 1316, the process detects users accessing the website via the embedded widget code, may identify such users, may enable such users to direct message each other, may enable users to post to or read selected chat forums, may enable users to connect to each other, and may provide other functions and services described herein.

Thus, systems and methods are described herein that enable users concurrently accessing network resources to communicate and share content, securely and selectively.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A communication system configured to enable users to communicate with each other, the communication system comprising:
a network interface;
at least one processing device operable to:
detect, via data received from a first user device over a network using the network interface, when a first user is accessing via a first browser a third party website operated a first entity different than an entity operating the communication system;
detect, via data received from a second user device using the network interface, when a second user is accessing via a second browser the third party website concurrently with the first user accessing the third party website;
transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device;
transmit data to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, cause, at least in part, a communication channel to be established between the first user device and the second user device and enable the first user and the second user to communicate using the communication channel established between the first user device and the second user device;

detect, via data received from a third user device using the network interface, when a third user is accessing via a third browser a second website operated a second entity different than the entity operating the communication system and different than the first entity;

detect, via data received from a fourth user device using the network interface, when a fourth user is accessing via a fourth browser the second website concurrently with the third user accessing the second website;

transmit data to the third user device configured to cause, at least in part, an interface to be displayed on the third user device indicating that the fourth user is currently accessing the second website and enabling the third user to initiate, via a third communication control, a transmission of a text, image, and/or video communication to the fourth user device;

transmit data to the fourth user device configured to cause, at least in part, an interface to be displayed on the fourth user device indicating that the third user is currently accessing the second website and enabling the fourth user to initiate a transmission of a text, image, and/or video communication to the third user device; and at least partly in response to the third user activating the third communication control, cause, at least in part, a communication channel to be established between the third user device and the fourth user device and enable the third user and the fourth user to communicate using the communication channel established between the third user device and the fourth user device, wherein the communication system is further configured to:

generate code configured to be installed on a least a first webpage of the third party website, the code comprising a unique identifier associated with the third party website, wherein in response to the first user accessing a webpage of the third party website, the code causes a message to be transmitted to the communication system, the message including the unique identifier associated with the third party website;

at least partly in response to receiving the message including the unique identifier associated with the third party website, causing widget code to be provided to the first user device, the widget code configured to cause the interface to be displayed on the first user device indicating that the second user is currently accessing the third party website and enabling the first user to initiate, via the first communication control, a transmission of a text, image, and/or video communication to the second user device.

2. The communication system as defined in claim 1, wherein detecting, via data received from the first user device over the network using the network interface, when the first user is accessing the third party website, further comprises receiving a resource locator from the first user device corresponding to the third party website, and wherein detecting, via data received from the second user device over the network using the network interface, that the second user is currently accessing the third party website, further comprises receiving a resource locator from the second user device corresponding to the third party website.

3. The communication system as defined in claim 1, wherein the communication system is further configured to:
transmit data to the first user device configured to cause, at least in part, an interface to be displayed on the first user device identifying a plurality of other users that are accessing the third party website concurrently with the first user device;
provide an interface via which the first user can select two or more of the plurality of other users that are accessing the third party website concurrently with the first user device and establish a group communication session with the two or more of the plurality of other users that are accessing the third party website concurrently with the first user device.

4. The communication system as defined in claim 1, wherein the communication system is further configured to:
enable the third party website to cause the interface to be displayed on the first user device indicating that the second user is currently accessing the third party website and enabling the first user to initiate, via the first communication control, a transmission of a text, image, and/or video communication to the second user device.

5. The communication system as defined in claim 1, wherein the communication system is further configured to:
determine if the second user is a connection of the first user;
at least partly in response to determining that the second user is a connection of the first user:
include at least one identifier of the second user in a set of connected users displayed to the first user;
at least partly in response to detecting that the first user is pointing at the at least one identifier of the second user, access a private profile associated with the second user; and
cause the private profile associated with the second user to be presented via the first user device.

6. The communication system as defined in claim 1, wherein the communication system is further configured to:
identify connections of the first user that are currently accessing at least a first network resource;
identify connections of the first user that were accessing at least the first network resource within a threshold period of time and are not currently accessing the at least the first network resource; and
populate a user interface with an identification of connections of the first user that are currently accessing at least a first network resource and with an identification of connections of the first user that were accessing at least the first network resource within a threshold period of time and are not currently accessing the at least the first network resource.

7. A communication system configured to enable users to communicate with each other, the communication system comprising:
a network interface;
at least one processing device operable to:
detect, via data received from a first user device over a network using the network interface, when a first user is accessing via a first browser a third party website operated a first entity different than an entity operating the communication system;

detect, via data received from a second user device using the network interface, when a second user is accessing via a second browser the third party website concurrently with the first user accessing the third party website;

transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device;

transmit data to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, cause, at least in part, a communication channel to be established between the first user device and the second user device and enable the first user and the second user to communicate using the communication channel established between the first user device and the second user device;

detect, via data received from a third user device using the network interface, when a third user is accessing via a third browser a second website operated a second entity different than the entity operating the communication system and different than the first entity;

detect, via data received from a fourth user device using the network interface, when a fourth user is accessing via a fourth browser the second website concurrently with the third user accessing the second website;

transmit data to the third user device configured to cause, at least in part, an interface to be displayed on the third user device indicating that the fourth user is currently accessing the second website and enabling the third user to initiate, via a third communication control, a transmission of a text, image, and/or video communication to the fourth user device;

transmit data to the fourth user device configured to cause, at least in part, an interface to be displayed on the fourth user device indicating that the third user is currently accessing the second website and enabling the fourth user to initiate a transmission of a text, image, and/or video communication to the third user device;

at least partly in response to the third user activating the third communication control, cause, at least in part, a communication channel to be established between the third user device and the fourth user device and enable the third user and the fourth user to communicate using the communication channel established between the third user device and the fourth user device; and receive from an administrator user device:
a configuration specification,
a branding specification, and
a chat channels specification; and automatically generate access detection and communication widget code configured to be installed on a least a first webpage of the third party website, the access detection and communication widget code configured to detect when a given user is accessing the third party website, enable the given user to communicate with at least one other user accessing the third party website via direct messaging, and enable the given user to post to one or more forums.

8. A communication system configured to enable users to communicate with each other, the communication system comprising:

a network interface;
at least one processing device operable to:
detect, via data received from a first user device over a network using the network interface, when a first user is accessing via a first browser a third party website operated a first entity different than an entity operating the communication system;

detect, via data received from a second user device using the network interface, when a second user is accessing via a second browser the third party website concurrently with the first user accessing the third party website;

transmit data to the first user device and enable a browser extension installed from a browser extension library to cause an interface to be displayed on the first user device indicating that the second user is currently accessing the third party website and enabling the first user to initiate, via a first communication control, a transmission of a text, image, and/or video communication to the second user device;

transmit data to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, cause, at least in part, a communication channel to be established between the first user device and the second user device and enable the first user and the second user to communicate using the communication channel established between the first user device and the second user device;

detect, via data received from a third user device using the network interface, when a third user is accessing via a third browser a second website operated a second entity different than the entity operating the communication system and different than the first entity;

detect, via data received from a fourth user device using the network interface, when a fourth user is accessing via a fourth browser the second website concurrently with the third user accessing the second website;

transmit data to the third user device configured to cause, at least in part, an interface to be displayed on the third user device indicating that the fourth user is currently accessing the second website and enabling the third user to initiate, via a third communication control, a transmission of a text, image, and/or video communication to the fourth user device;

transmit data to the fourth user device configured to cause, at least in part, an interface to be displayed on the fourth user device indicating that the third user is currently accessing the second website and enabling the fourth user to initiate a transmission of a text, image, and/or video communication to the third user device;

at least partly in response to the third user activating the third communication control, cause, at least in part, a communication channel to be established between the third user device and the fourth user device and enable the third user and the fourth user to communicate using the communication channel established between the third user device and the fourth user device.

9. A communication system configured to enable users to communicate with each other, the communication system comprising:

a network interface;

at least one processing device operable to:

detect, via data received from a first user device over a network using the network interface, when a first user is accessing via a first browser a third party website operated a first entity different than an entity operating the communication system;

detect, via data received from a second user device using the network interface, when a second user is accessing via a second browser the third party website concurrently with the first user accessing the third party website;

transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device;

transmit data to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, cause, at least in part, a communication channel to be established between the first user device and the second user device and enable the first user and the second user to communicate using the communication channel established between the first user device and the second user device;

detect, via data received from a third user device using the network interface, when a third user is accessing via a third browser a second website operated a second entity different than the entity operating the communication system and different than the first entity;

detect, via data received from a fourth user device using the network interface, when a fourth user is accessing via a fourth browser the second website concurrently with the third user accessing the second website;

transmit data to the third user device configured to cause, at least in part, an interface to be displayed on the third user device indicating that the fourth user is currently accessing the second website and enabling the third user to initiate, via a third communication control, a transmission of a text, image, and/or video communication to the fourth user device;

transmit data to the fourth user device configured to cause, at least in part, an interface to be displayed on the fourth user device indicating that the third user is currently accessing the second website and enabling the fourth user to initiate a transmission of a text, image, and/or video communication to the third user device;

at least partly in response to the third user activating the third communication control, cause, at least in part, a communication channel to be established between the third user device and the fourth user device and enable the third user and the fourth user to communicate using the communication channel established between the third user device and the fourth user device;

identify a future online event;

identify a timing of the future online event;

populate an event user interface with a description of the future online event and timing of the future online event, the event user interface comprising a control that enables initiation of a registration of the future online event; and at least partly in response to a user registering for the future online event, enable the user to electronically communicate with other users registered for the future online event prior to occurrence of the future online event.

10. A computerized method, the method comprising:

detecting at a computer system, via data received from a first user device over a network, when a first user is accessing via a first browser a third party website operated a first entity different than an entity operating the computer system;

detecting using the computer system, via data received from a second user device over the network, when a second user is accessing via a second browser the third party website concurrently with the first user accessing the third party website;

transmitting data using the computer system to the first user device configured to cause, at least in part, an interface to be displayed on the first user device indicating that the second user is currently accessing the third party website and enabling the first user to initiate, via a first communication control, a transmission of a text, image, and/or video communication to the second user device;

transmitting data using the computer system to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, enabling the first user and the second user to electronically communicate over the network;

providing code configured to be installed on a least a first webpage of the third party website, the code comprising a unique identifier associated with the third party website, wherein in response to the first user accessing a webpage of the third party website, the code causes a message to be transmitted to the computer system, the message including the unique identifier associated with the third party website; and at least partly in response to receiving the message including the unique identifier associated with the third party website, causing widget code to be provided to the first user device, the widget code configured to cause the interface to be displayed on the first user device indicating that the second user is currently accessing the third party website and enabling the first user to initiate, via the first communication control, a transmission of a text, image, and/or video communication to the second user device.

11. The method as defined in claim 10, wherein detecting, via data received from the first user device over the network, when the first user is accessing the third party website, further comprises receiving a resource locator from the first user device corresponding to the third party website, and wherein detecting, via data received from the second user device over the network, that the second user is currently accessing the third party website, further comprises receiving a resource locator from the second user device corresponding to the third party website.

12. The method as defined in claim 10, the method further comprising:

transmitting data to the first user device configured to cause, at least in part, an interface to be displayed on the first user device identifying a plurality of other users that are accessing the third party website concurrently with the first user device;

enabling an interface to be displayed on the first user device via which the first user can select two or more of the plurality of other users that are accessing the third party website concurrently with the first user device and establish a group communication session with the two or more of the plurality of other users that are accessing the third party website concurrently with the first user device.

13. The method as defined in claim 10, the method further comprising:

enabling the third party website to cause the interface to be displayed on the first user device indicating that the second user is currently accessing the third party website and enabling the first user to initiate, via the first communication control, a transmission of a text, image, and/or video communication to the second user device.

14. The method as defined in claim 10, the method further comprising:

determining if the second user is a connection of the first user;

at least partly in response to determining that the second user is a connection of the first user:

including at least one identifier of the second user in a set of connected users displayed to the first user;

at least partly in response to detecting that the first user is pointing at the at least one identifier of the second user, accessing private profile data associated with the second user; and enabling the private profile data associated with the second user to be presented via the first user device.

15. The method as defined in claim 10, the method further comprising:

identifying connections of the first user that are currently accessing at least a first network resource;

identifying connections of the first user that were accessing at least the first network resource within a threshold period of time and are not currently accessing the at least the first network resource; and populating a user interface with an identification of connections of the first user that are currently accessing at least a first network resource and with an identification of connections of the first user that were accessing at least the first network resource within a threshold period of time and are not currently accessing the at least the first network resource.

16. The method as defined in claim 10, the method further comprising:

A computerized method, the method comprising:

detecting at a computer system, via data received from a first user device over a network, when a first user is accessing via a first browser a third party website operated a first entity different than an entity operating the computer system;

detecting using the computer system, via data received from a second user device over the network, when a second user is accessing via a second browser the third party website concurrently with the first user accessing the third party website;

transmitting data using the computer system to the first user device configured to cause, at least in part, an interface to be displayed on the first user device indicating that the second user is currently accessing the third party website and enabling the first user to initiate, via a first communication control, a transmission of a text, image, and/or video communication to the second user device;

transmitting data using the computer system to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, enabling the first user and the second user to electronically communicate over the network;

identifying a future online event;

identifying a timing of the future online event;

populating an event user interface with a description of the future online event and timing of the future online event, the event user interface comprising a control that enables initiation of a registration of the future online event; and at least partly in response to a user registering for the future online event, enabling the user to electronically communicate with other users registered for the future online event prior to occurrence of the future online event.

17. A computerized method, the method comprising:

detecting at a computer system, via data received from a first user device over a network, when a first user is accessing via a first browser a third party website operated a first entity different than an entity operating the computer system;

detecting using the computer system, via data received from a second user device over the network, when a second user is accessing via a second browser the third party website concurrently with the first user accessing the third party website;

transmitting data using the computer system to the first user device configured to cause, at least in part, an interface to be displayed on the first user device indicating that the second user is currently accessing the third party website and enabling the first user to initiate, via a first communication control, a transmission of a text, image, and/or video communication to the second user device;

transmitting data using the computer system to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, enabling the first user and the second user to electronically communicate over the network;

receiving from an administrator user device:
a configuration specification,
a branding specification, and
a chat channels specification;

automatically generating access detection and communication widget code configured to be installed on a least a first webpage of the third party website, the access detection and communication widget code configured to detect when a given user is accessing the third party website, enable the given user to communicate with at least one other user accessing the third party website via direct messaging, and enable the given user to post to one or more forums.

18. A computerized method, the method comprising:
detecting at a computer system, via data received from a first user device over a network, when a first user is accessing via a first browser a third party website operated a first entity different than an entity operating the computer system;

detecting using the computer system, via data received from a second user device over the network, when a second user is accessing via a second browser the third party website concurrently with the first user accessing the third party website;

transmitting data using the computer system to the first user device enabling a browser extension installed from a browser extension library to cause an interface to be displayed on the first user device indicating that the second user is currently accessing the third party website and enabling the first user to initiate, via a first communication control, a transmission of a text, image, and/or video communication to the second user device;

transmitting data using the computer system to the second user device configured to cause, at least in part, an interface to be displayed on the second user device indicating that the first user is currently accessing the third party website and enabling the second user to initiate a transmission of a text, image, and/or video communication to the first user device;

at least partly in response to the first user activating the first communication control, enabling the first user and the second user to electronically communicate over the network.

19. Non-transitory computer readable memory having program instructions stored thereon that when executed by a computer system device cause the computer system to performing operations comprising:
detect, via data received from a first user device, when a first user is accessing, via a first browser, a third party website;

detect, via data received from a second user device, when a second user is accessing via a second browser the third party website concurrently with the first user accessing the third party website;

transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device;

transmit data to the second user device configured to cause, at least in part, an interface to be displayed on the second user device indicating that the first user is currently accessing the third party website and enabling the second user to initiate a transmission of a text, image, and/or video communication to the first user device; and at least partly in response to the first user activating the first communication control, enable the first user and the second user to electronically communicate;

provide code configured to be installed on a least a first webpage of the third party website, the code comprising a unique identifier associated with the third party website, wherein in response to the first user accessing a webpage of the third party website, the code causes a message to be transmitted to a remote communication system, the message including the unique identifier associated with the third party website;

at least partly in response to receiving the message including the unique identifier associated with the third party website, enable widget code to be provided to the first user device, the widget code configured to cause the interface to be displayed on the first user device indicating that the second user is currently accessing the third party website and enabling the first user to initiate, via the first communication control, a transmission of a text, image, and/or video communication to the second user device.

20. The non-transitory computer readable memory as defined in claim 19, wherein detecting, via data received from the first user device over a network, when the first user is accessing the third party website, further comprises receiving a resource locator from the first user device corresponding to the third party website, and wherein detecting, via data received from the second user device over the network, that the second user is currently accessing the third party website, further comprises receiving a resource locator from the second user device corresponding to the third party website.

21. The non-transitory computer readable memory as defined in claim 19, the operations further comprising:
transmit data to the first user device configured to cause, at least in part, an interface to be displayed on the first user device identifying a plurality of other users that are accessing the third party website concurrently with the first user device;

enable an interface to be displayed on the first user device via which the first user can select two or more of the plurality of other users that are accessing the third party website concurrently with the first user device and establish a group communication session with the two or more of the plurality of other users that are accessing the third party website concurrently with the first user device.

22. The non-transitory computer readable memory as defined in claim 19, the operations further comprising:
Non-transitory computer readable memory having program instructions stored thereon that when executed by a computer system device cause the computer system to performing operations comprising:
detect, via data received from a first user device, when a first user is accessing, via a first browser, a third party website;
detect, via data received from a second user device, when a second user is accessing via a second browser the third party website concurrently with the first user accessing the third party website;
transmit data to the first user device and enable a browser extension installed from a browser extension library to cause an interface to be displayed on the first user device indicating that the second user is currently accessing the third party website and enabling the first user to initiate, via a first communication control, a transmission of a text, image, and/or video communication to the second user device;
transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device;
transmit data to the second user device configured to cause, at least in part, an interface to be displayed on the second user device indicating that the first user is currently accessing the third party website and enabling the second user to initiate a transmission of a text, image, and/or video communication to the first user device; and
at least partly in response to the first user activating the first communication control, enable the first user and the second user to electronically communicate.

23. The non-transitory computer readable memory as defined in claim 19, the operations further comprising:
enable the third party website to cause the interface to be displayed on the first user device indicating that the second user is currently accessing the third party website and enabling the first user to initiate, via the first communication control, a transmission of a text, image, and/or video communication to the second user device.

24. The non-transitory computer readable memory as defined in claim 19, the operations further comprising:
determine if the second user is a connection of the first user;
at least partly in response to determining that the second user is a connection of the first user:
include at least one identifier of the second user in a set of connected users displayed to the first user;
at least partly in response to detecting that the first user is pointing at the at least one identifier of the second user, accessing private profile data associated with the second user; and
enable the private profile data associated with the second user to be presented via the first user device.

25. The non-transitory computer readable memory as defined in claim 19, the operations further comprising:
identify connections of the first user that are currently accessing at least a first network resource;
identify connections of the first user that were accessing at least the first network resource within a threshold period of time and are not currently accessing the at least the first network resource; and
populate a user interface with an identification of connections of the first user that are currently accessing at least a first network resource and with an identification of connections of the first user that were accessing at least the first network resource within a threshold period of time and are not currently accessing the at least the first network resource.

26. Non-transitory computer readable memory having program instructions stored thereon that when executed by a computer system device cause the computer system to performing operations comprising:
detect, via data received from a first user device, when a first user is accessing, via a first browser, a third party website;
detect, via data received from a second user device, when a second user is accessing via a second browser the third party website concurrently with the first user accessing the third party website;
transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device;
transmit data to the second user device configured to cause, at least in part, an interface to be displayed on the second user device indicating that the first user is currently accessing the third party website and enabling the second user to initiate a transmission of a text, image, and/or video communication to the first user device; and
at least partly in response to the first user activating the first communication control, enable the first user and the second user to electronically communicate;
receive from an administrator user device:
a configuration specification,
a branding specification, and
a chat channels specification;
automatically generate access detection and communication widget code configured to be installed on a least a first webpage of the third party website, the access detection and communication widget code configured to detect when a given user is accessing the third party website, enable the given user to communicate with at least one other user accessing the third party website via direct messaging, and enable the given user to post to one or more forums.

27. Non-transitory computer readable memory having program instructions stored thereon that when executed by a computer system device cause the computer system to performing operations comprising:
detect, via data received from a first user device, when a first user is accessing, via a first browser, a third party website;
detect, via data received from a second user device, when a second user is accessing via a second browser the third party website concurrently with the first user accessing the third party website;
transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device;
transmit data to the second user device configured to cause, at least in part, an interface to be displayed on the second user device indicating that the first user is currently accessing the third party website and enabling the second user to initiate a transmission of a text, image, and/or video communication to the first user device; and
at least partly in response to the first user activating the first communication control, enable the first user and the second user to electronically communicate;
identify a future online event;
identify a timing of the future online event;
populate an event user interface with a description of the future online event and timing of the future online event, the event user interface comprising a control that enables initiation of a registration of the future online event; and
at least partly in response to a user registering for the future online event, enable the user to electronically communicate with other users registered for the future online event prior to occurrence of the future online event.

* * * * *

UNITED STATES PATENT AND TRADEMARK OFFICE
CERTIFICATE OF CORRECTION

PATENT NO. : 11,201,900 B1
APPLICATION NO. : 17/178934
DATED : December 14, 2021
INVENTOR(S) : Jason Tyler Craparo Page 1 of 1

It is certified that error appears in the above-identified patent and that said Letters Patent is hereby corrected as shown below:

In the Specification

On Column 5, Line 24, Delete "the a" and insert -- the --.

In the Claims

On Column 27, Line 44, In Claim 1, delete "a least" and insert -- at least --.

On Column 30, Lines 2-3, In Claim 7, delete "a least" and insert -- at least --.

On Column 32, Line 62, In Claim 10, delete "a least" and insert -- at least --.

On Column 35, Line 23, In Claim 17, delete "a least" and insert -- at least --.

On Column 36, Line 23, In Claim 19, delete "a least" and insert -- at least --.

On Column 38, Line 45, In Claim 26, delete "a least" and insert -- at least --.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*